United States Patent [19]

Descovich et al.

[11] 4,163,142

[45] Jul. 31, 1979

[54] METHOD AND APPARATUS FOR ASSEMBLING RINGS

[75] Inventors: Theodore Descovich, Mahwah; Jack F. Smith, Kenilworth; Edward D. Riordan, South Somerville, all of N.J.

[73] Assignee: Avon Products, Inc., New York, N.Y.

[21] Appl. No.: 768,615

[22] Filed: Feb. 14, 1977

[51] Int. Cl.² .......................................... B23K 11/02
[52] U.S. Cl. .................................. 219/79; 29/160.6; 29/705; 29/710; 29/792; 29/795; 219/91.1
[58] Field of Search ................ 219/79, 80, 86.24, 91.1, 219/103; 73/88 B; 29/160.6, 705, 709, 710, 783, 785, 787, 791, 792, 795

[56] References Cited

U.S. PATENT DOCUMENTS

| | | | |
|---|---|---|---|
| 2,554,982 | 5/1951 | Hartley et al. | 29/710 |
| 2,995,810 | 8/1961 | Wilson et al. | 29/785 |
| 3,376,736 | 4/1968 | Emery, Jr. | 73/88 B |
| 3,417,220 | 12/1968 | Merchant | 219/79 |
| 3,473,213 | 10/1969 | Brown | 29/705 |
| 3,531,618 | 9/1970 | Merchant | 219/103 |
| 3,724,265 | 4/1973 | La Valle | 73/88 B |
| 3,802,052 | 4/1974 | Andler et al. | 29/710 |
| 4,048,687 | 9/1977 | Kato et al. | 29/705 |

*Primary Examiner*—E. A. Goldberg
*Assistant Examiner*—Clifford C. Shaw
*Attorney, Agent, or Firm*—Pennie & Edmonds

[57] ABSTRACT

An apparatus for use in continuously assembling joinable ring shanks and ring settings into a corresponding unitary jewelry type ring comprising supporting means; advancing means operatively connected to the supporting means including at least one work holding means which removably receives a ring setting and ring shank for successively and incrementally advancing the work holding means, as well as ring shank and setting, from at least a loading station to a plurality of discrete working stations, including at least a ring shank testing station, and a bonding station, ring shank testing means located at the ring shank testing station for accurately testing for the presence and correct alignment of the ring shank with respect to the corresponding ring setting in the work holding means; and bonding means situated at the bonding station for selectively bonding the aligned jewelry ring. The method for use in automatically continuously and selectively bonding joinable first members and second members into a corresponding unitary member embodies the steps of testing for the presence and correct alignment of a first member with respect to a corresponding second member, and selectively bonding the aligned first member to the second member to thereby form the unitary member.

57 Claims, 50 Drawing Figures

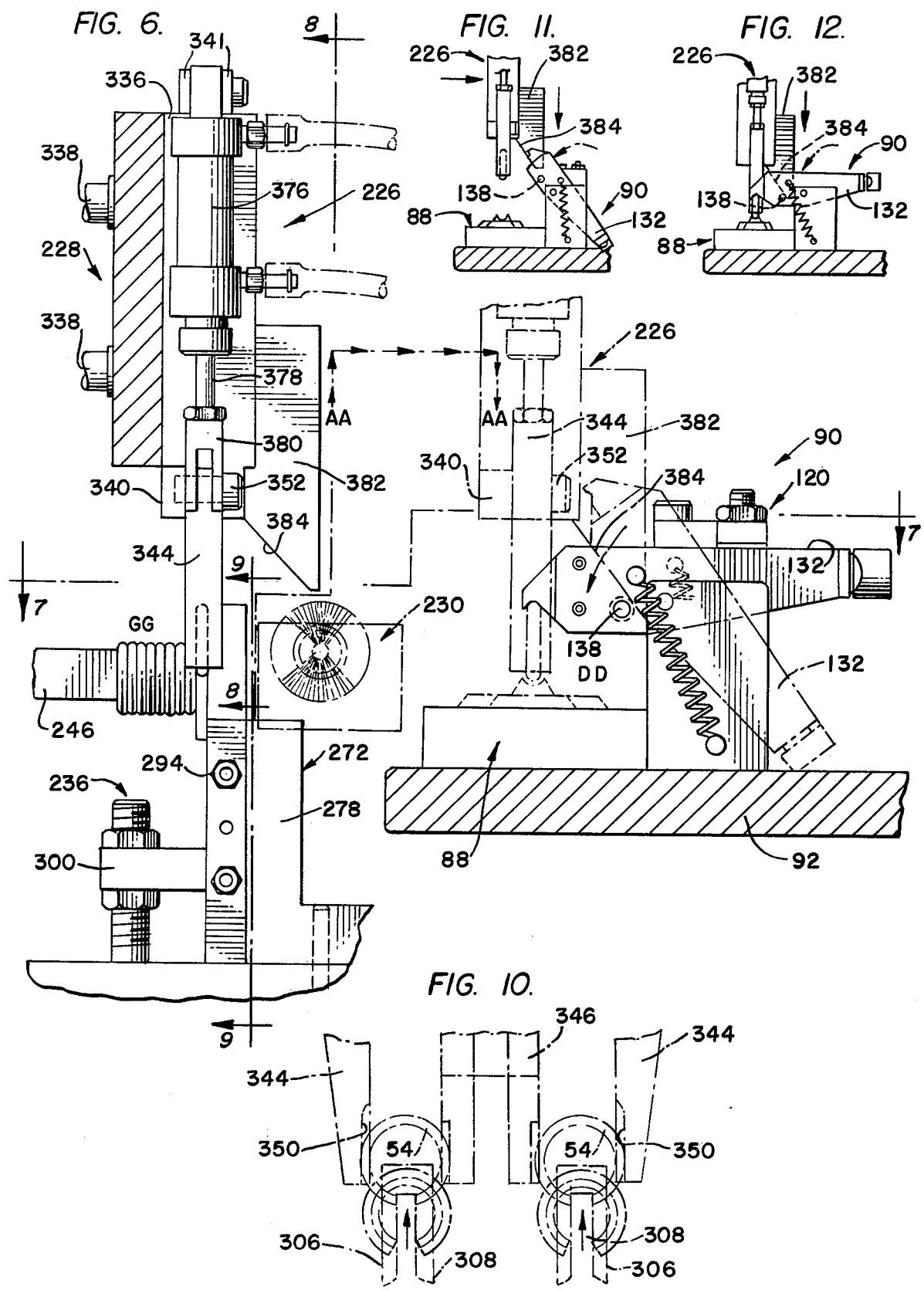

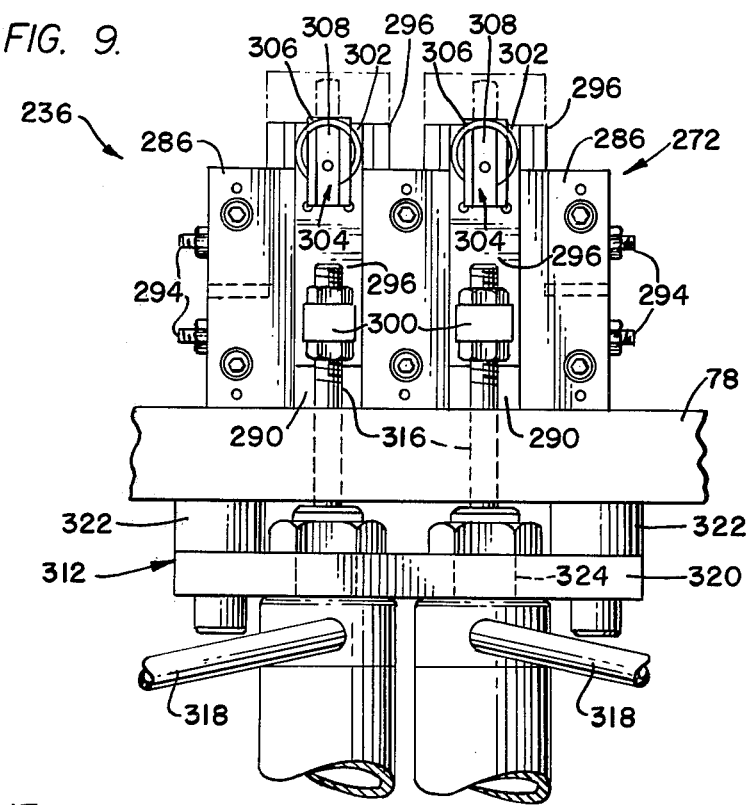
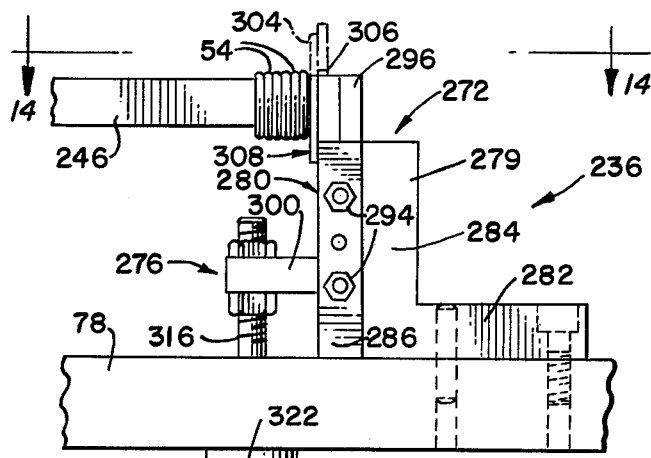
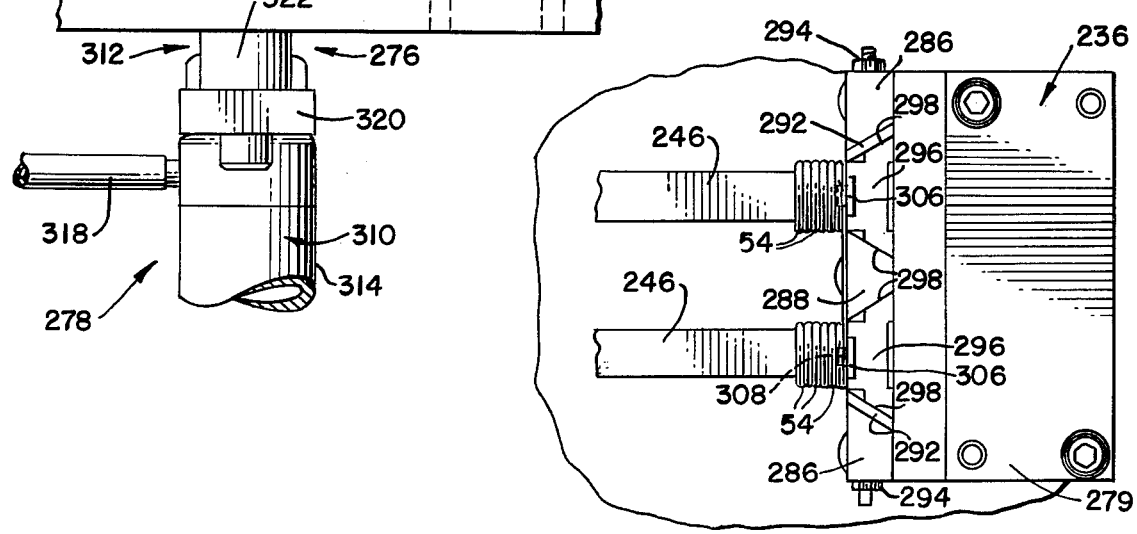

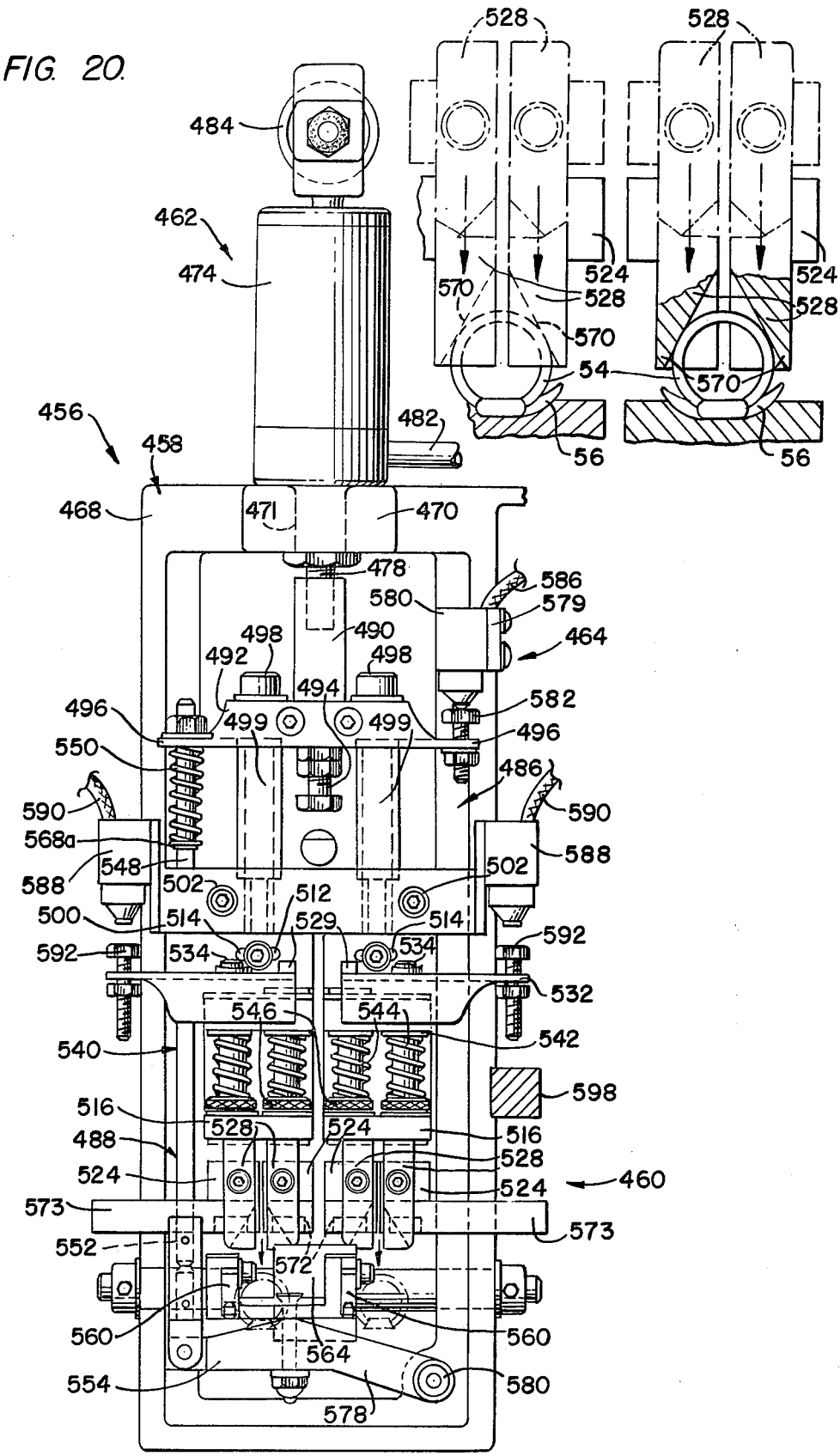

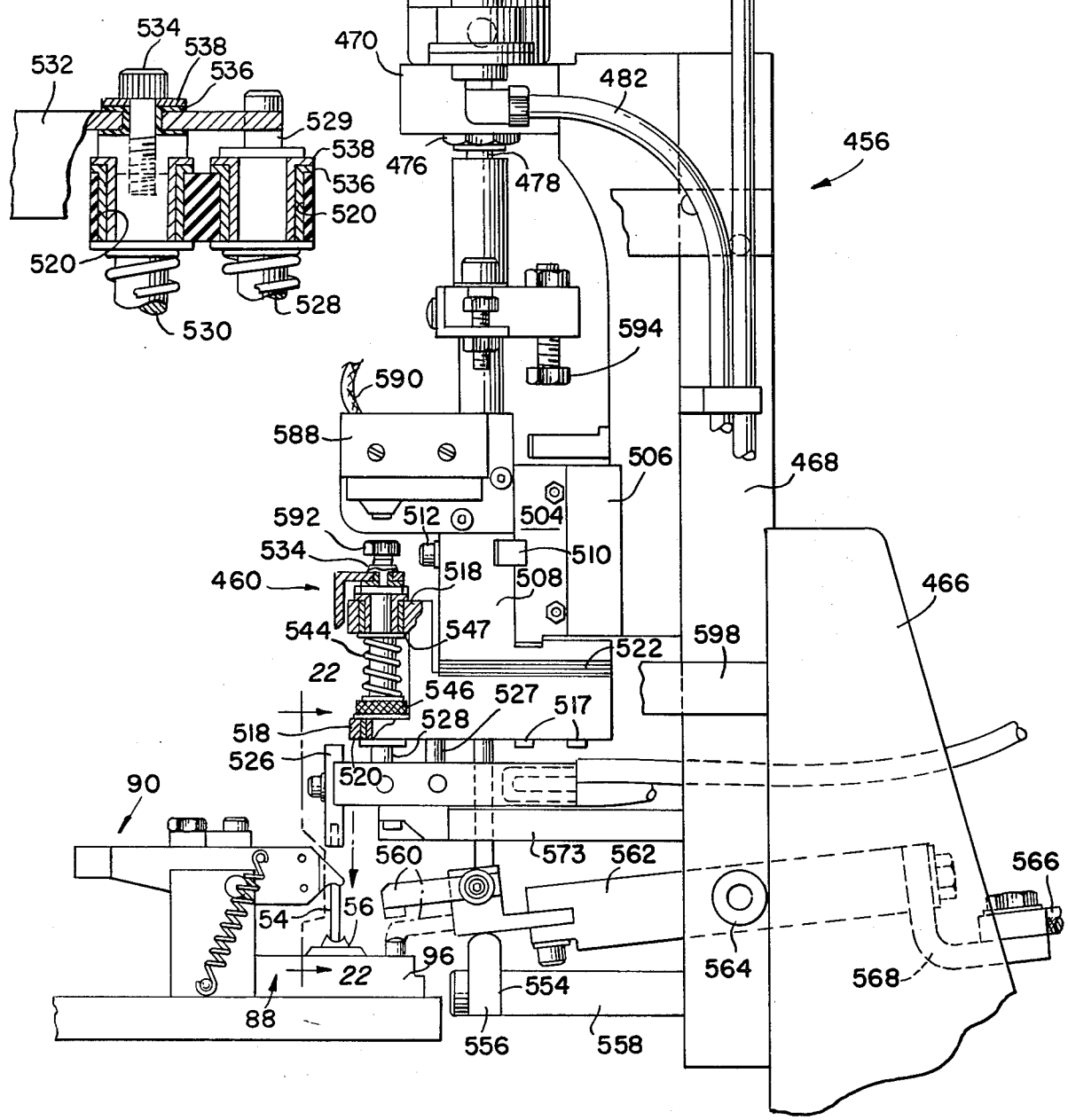

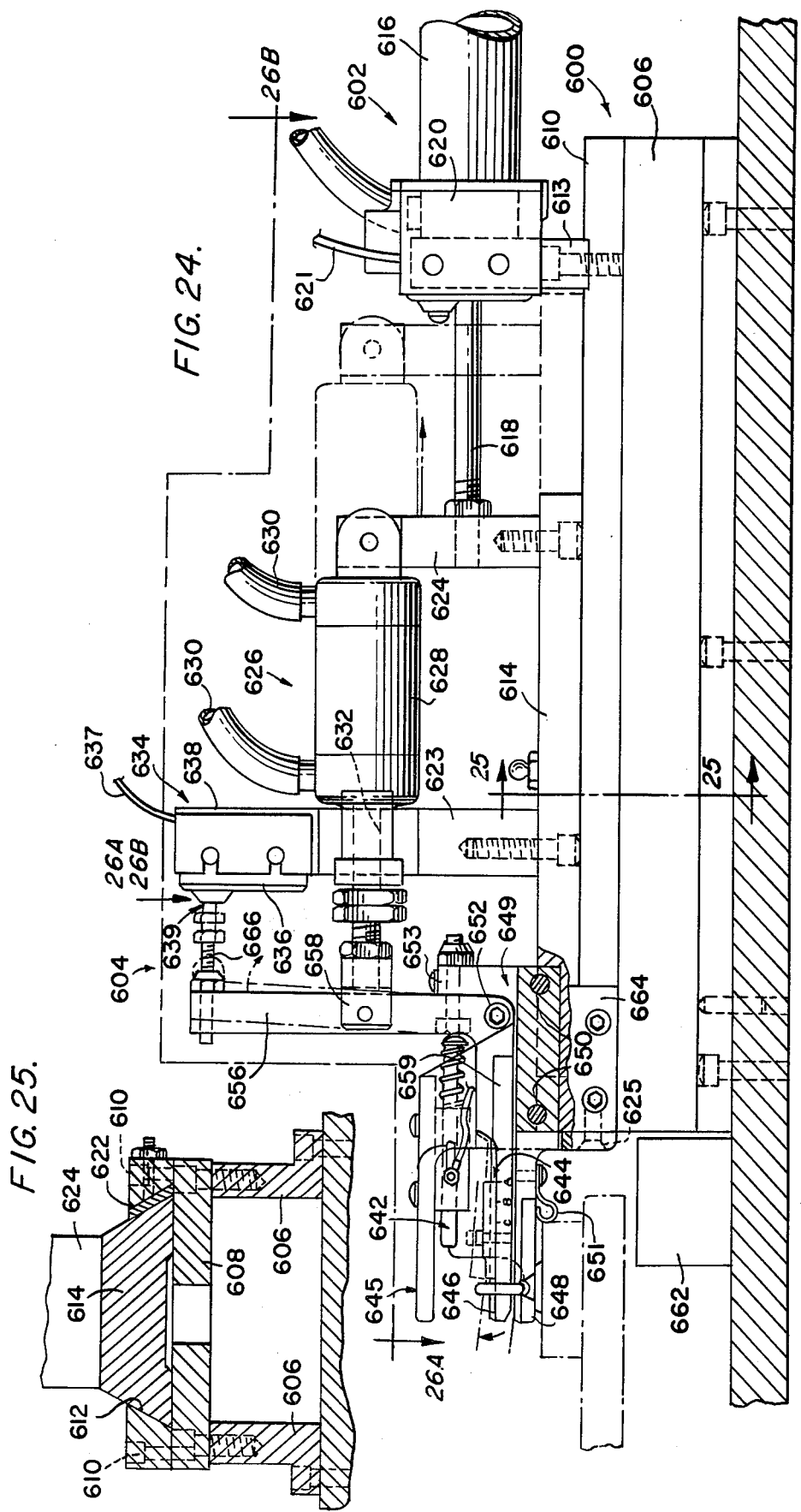

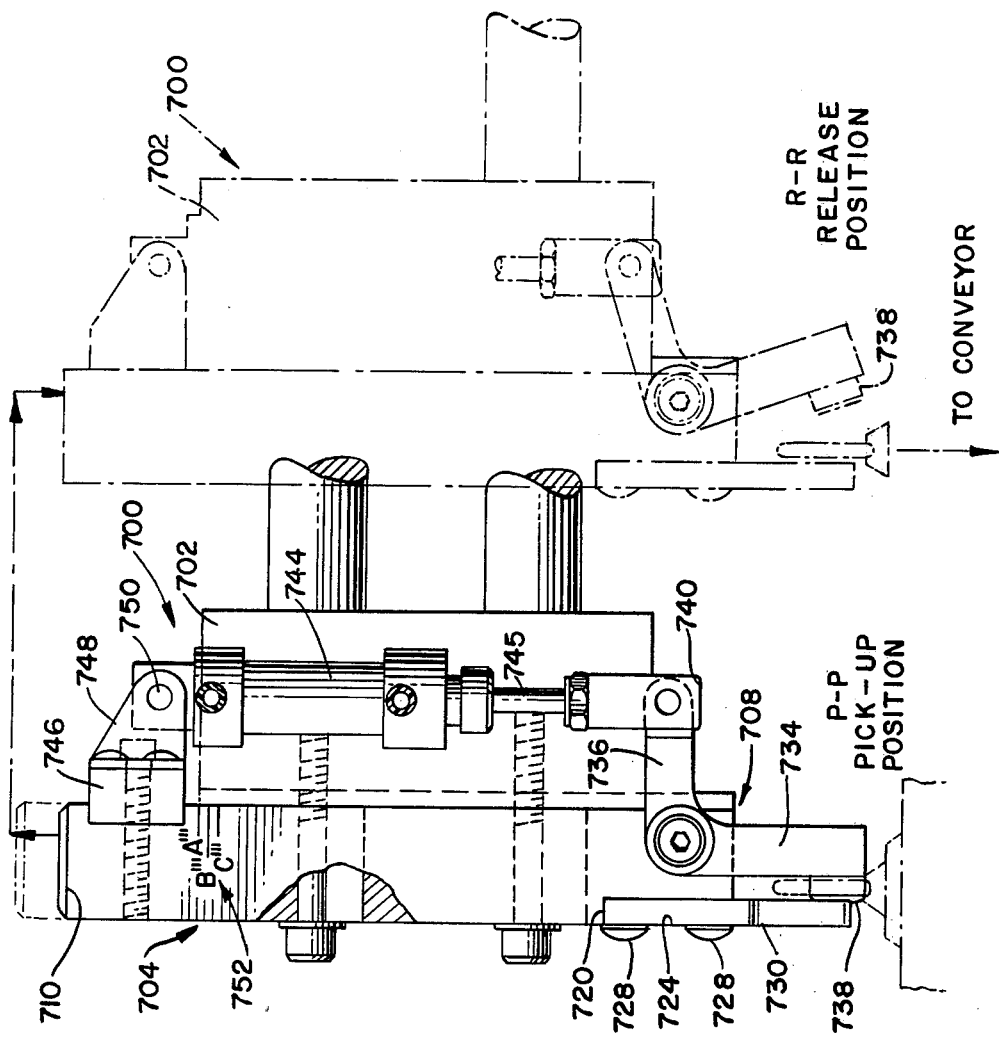
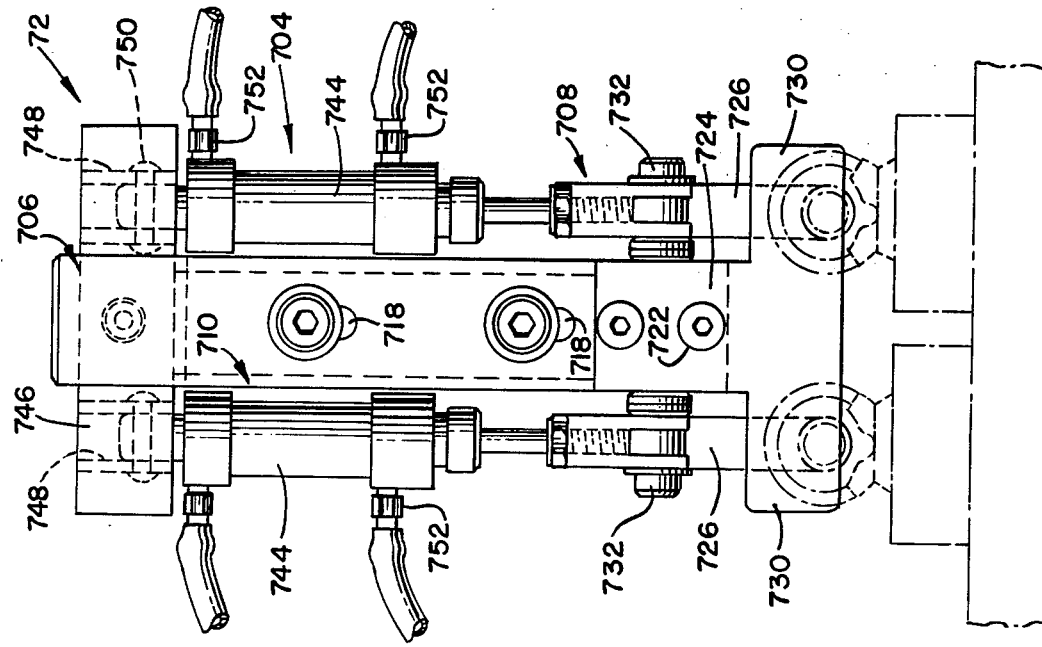

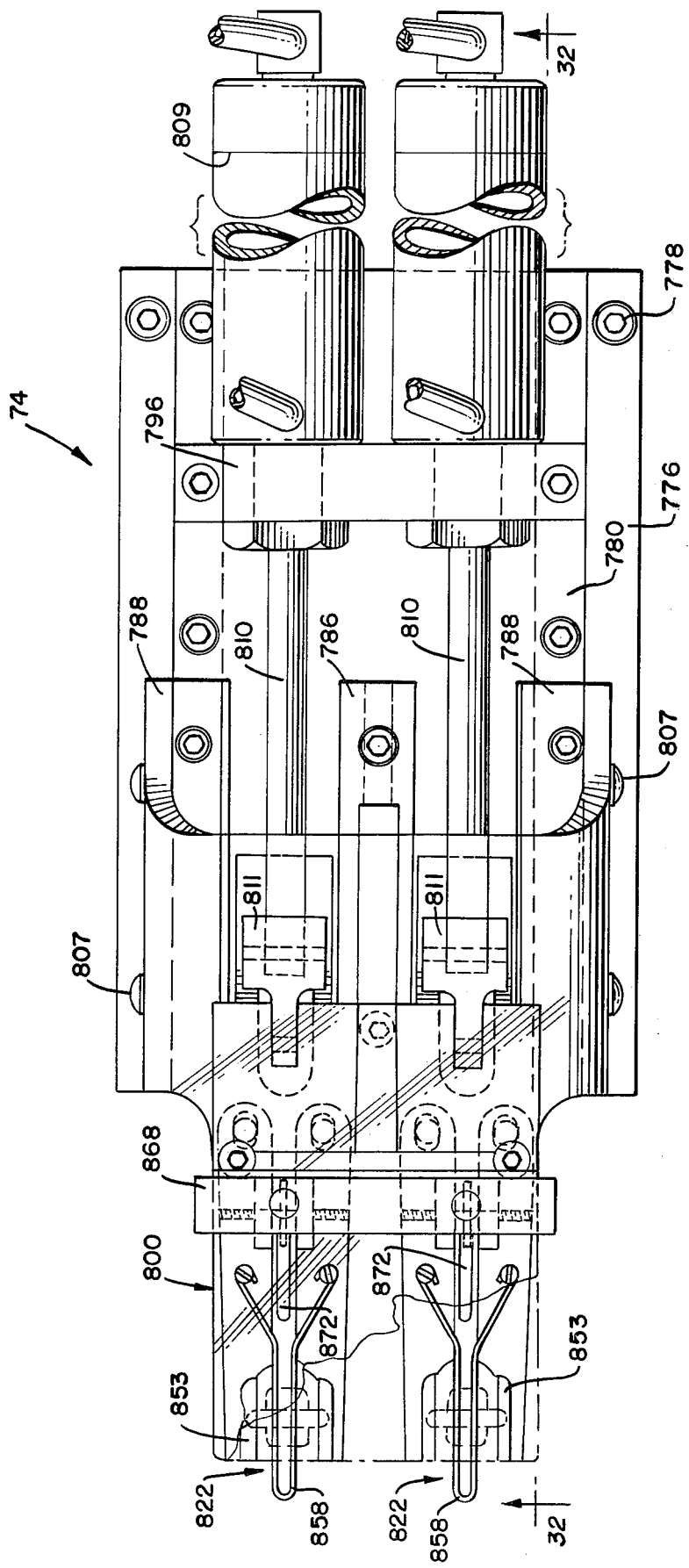

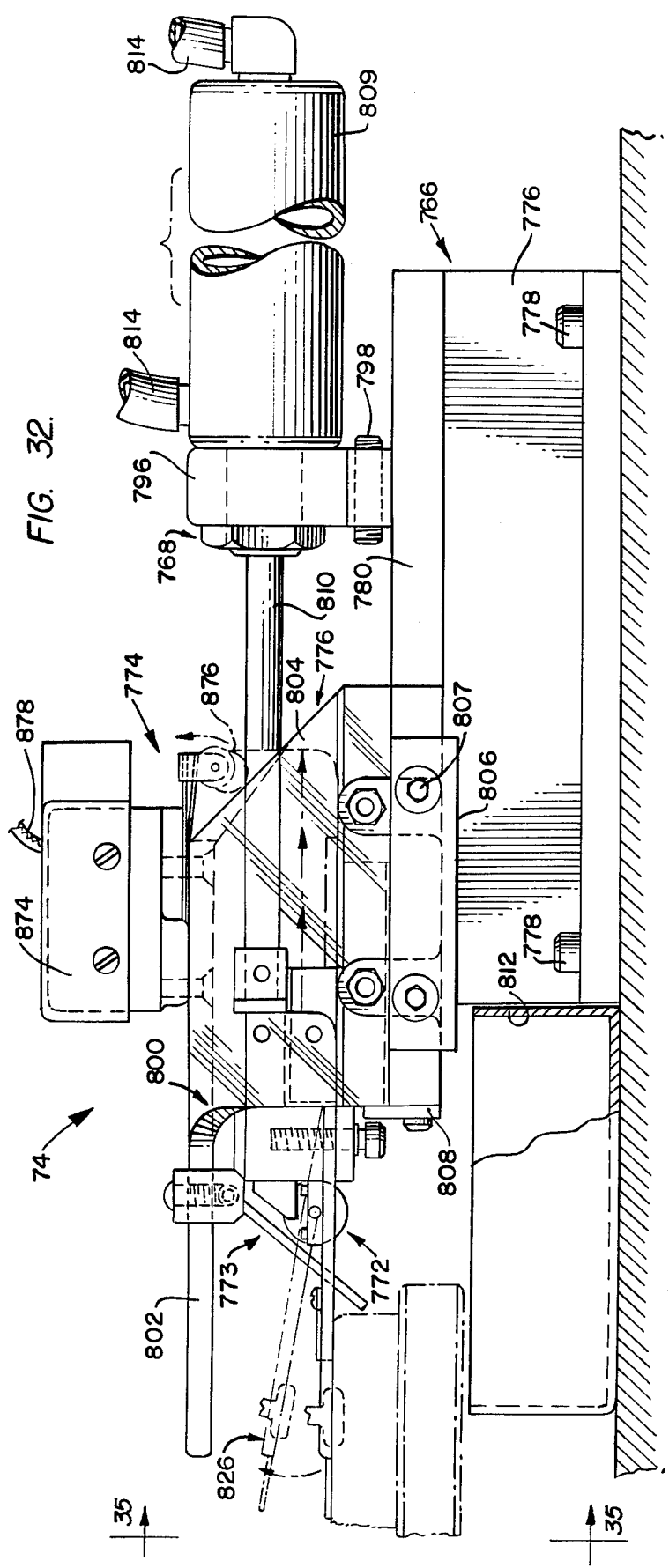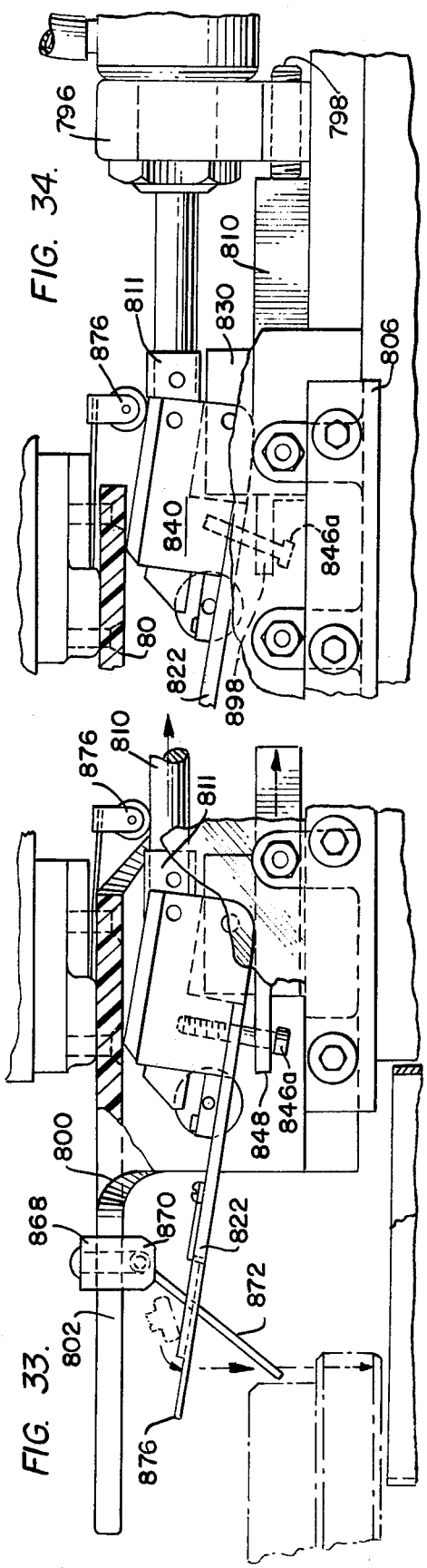

METHOD AND APPARATUS FOR ASSEMBLING RINGS

BACKGROUND OF THE INVENTION

1. Field of the Invention

This particular invention generally pertains to the assembling of jewelry type products or the like. More specifically, it is directed to a novel and improved method and apparatus for automatically and continuously assembling joinable ring shanks and ring settings into a corresponding unitary jewelry type ring wherein the ring shank is bonded to the ring setting.

2. Description of the Prior Art

It has been long known how to manufacture jewelry type rings. Heretofore in the jewelry making industry and, in particular, the jewelry ring field, such rings have been traditionally manually constructed. While such a manual process may prove successful for a limited quantity of rings it does not, on the other hand, prove economical for large quantities. Besides the inability of producing large quantities of rings economically, the manual approach suffers from other significant drawbacks. One conventional shortcoming is the fact that manually produced rings generally lack a uniformity in the construction resulting from the assembling process as a result of the nature of a manual process. It should be understood that consistency in the assembling process varies from worker to worker. Accordingly, uniformity of the finished product cannot be maintained, especially over a prolonged production period. Other significant disadvantages result from the fact that the currently employed manual techniques are labor consuming and time consuming not to mention relatively expensive.

In general, known techniques fail to provide an automatic and continuous method and apparatus for testing for ring shank alignment on a corresponding ring setting and then selectively bonding the shank to the setting in response to a shank being properly aligned with the setting.

Moreover, known prior art techniques fail to provide either a method or apparatus which can automatically and continuously place and align the ring shanks to the ring settings in a fashion which satisfactorily permits such to be done in production line work.

Further, known techniques also fail to provide either a highly satisfactory method or apparatus whereby there is a continuous and automatic testing for the presence and accurate alignment of various sized ring shanks to corresponding ring settings is followed by selectively bonding those ring shanks and settings which have been found to be properly aligned.

Additionally, other common approaches which have in general been undertaken for assembling jewelry ring components fail to provide simple and reliable techniques for continuously and automatically applying bonding agent material to selected portions of the ring shanks or ring settings prior to joining and bonding of the shanks and settings.

In addition, known prior art methods for assembling ring shanks to corresponding ring settings, do not continuously and selectively mechanically test the joints of the bonded ring by applying tensile forces to such bonded joints to determine the bond strength, or for that matter, automatically and selectively remove the successfully tensile tested ring shanks and settings and selectively eject the unsuccessful bonded ring shanks and settings.

It will be appreciated from a consideration of the foregoing that mechanisms and methods do not presently exist which automatically, continuously and selectively place and releasably hold ring shanks to corresponding ring settings, apply bonding agent material to the shanks and/or settings, test for the presence and correct alignment of ring settings and shanks, bond the shanks and settings together, test the bonded ring shanks and settings, remove the satisfactorily bonded shanks and settings, and reject the unsuccessfully bonded shanks and settings.

SUMMARY OF THE INVENTION

Accordingly, it is an object of the instant invention to overcome the aforementioned disadvantages generally associated with conventional manual methods and apparatuses utilized for assembling jewelry products, particularly jewelry type rings, by providing a novel and improved apparatus and method which automatically, continuously and selectively places and releasably holds ring shanks of varying sizes to ring settings, bonds the shanks and settings together, tests the bond of ring shanks to settings, removes the satisfactorily bonded shanks and settings and rejects the unsatisfactorily bonded shanks and settings.

In pursuance of the foregoing object and others, an apparatus made in accordance with the present invention essentially, as hereinafter described, comprises supporting means; advancing means operatively connected to the supporting means including at least one work holding means which removably receives a ring setting and shank and which incrementally advances the work holding means as well as ring shank and setting from at least a loading station to a plurality of discrete working stations including at least a ring and shank testing station and a bonding station, shank testing means being positioned at the shank testing station for accurately testing for the presence and correct alignment of the ring shank with respect to the corresponding ring setting in the work holding means; and bonding means situated at the bonding station for selectively bonding the ring shank to the ring setting to thereby form an integral jewelry ring.

Another embodiment of the apparatus of the present invention comprises supporting means and advancing means operatively connected to the supporting means including at least one work holding means for removably receiving and holding a ring setting and a corresponding ring shank on the respective ring setting therefor, the advancing means being operable for successively and incrementally advancing the work holding means with the setting and shank from at least a loading station to a plurality of discrete working stations including, at least, a ring setting testing station, ring shank placing station, ring shank testing station, bonding station, bond testing station, good parts removing station, and bad parts ejecting station. The noted embodiment contemplates ring setting testing means located at the ring setting testing station for accurately testing the presence and alignment of the ring setting in the work holding means. Also envisioned is ring shank placing means situated at the ring shank placing station and being selectively operable for placing individual ring shanks of various sizes onto corresponding ring settings in the work holding means and for automatically holding the ring shank which is placed on the ring setting.

Ring shank presence and alignment testing means positioned at the ring shank presence and alignment testing station tests for the presence and alignment of the ring shank with respect to the ring setting. In this particular embodiment, at the bonding station, bonding means are located for selectively bonding those properly aligned ring shanks to ring settings to form a corresponding unitary ring. Also contemplated by this invention is bonding testing means situated at the bonding testing station for testing the strength of the bond by applying mechanical forces to the bonded joints. The present invention further envisions good parts removing means located at the good parts removing station for selectively removing the bonded ring shanks and settings from the work holding means which have been satisfactorily tested by the bonding testing means. The apparatus further, embodies bad parts ejecting means, positioned at the ejecting station, for selectively removing from the work holding means the ring shanks and settings which have been indicated as being unsatisfactorily bonded.

In a preferred embodiment of this invention, the apparatus comprises supporting means and advancing means operatively connected to the supporting means including at least one work holding means for removably receiving and holding a ring setting and a corresponding ring shank on the respective ring setting therefor, the advancing means being operable for successively and incrementally advancing the work holding means with the setting and shank from at least a loading station to a plurality of discrete working stations including, at least, a bonding material applicating station, ring shank placing station, bonding station, bond testing station, good parts removing station, and bad parts ejecting station. The noted preferred embodiment contemplates bonding material applicating means located at the bonding material applicating station for accurately dispensing predetermined amounts of bonding material on the ring setting held by the work holding means. Also envisioned is ring shank placing means situated at the ring shank placing station and is selectively operable for placing individual ring shanks of various sizes onto corresponding ring settings in the work holding means and for automatically holding the ring shank which is placed on the ring setting. In this preferred embodiment, bonding means is situated at the bonding station for bonding the ring shanks to ring settings to form a corresponding unitary ring. Also contemplated is bonding testing means. Such testing means are situated at the bonding testing station for testing the strength of the bond by applying mechanical forces to the bonded joints. Further envisioned by this embodiment is good parts removing means located at the good parts removing station for selectively removing the bonded ring shanks and settings from the work holding means which have been satisfactorily tested by the bonding testing means. Such apparatus further includes bad parts ejecting means which is positioned at the ejecting station for selectively removing from the work holding means those ring shanks and settings which have been indicated as being unsatisfactorily bonded.

A method contemplated by this invention is for use in automatically, continuously and selectively bonding a joinable first members to corresponding second members to form unitary members and the like. Such method basically comprises the steps of testing for the presence and alignment of the first member with respect to the appropriate second member and selectively bonding the aligned first member to the second member to thereby form the unitary member.

In one embodiment of a method of the present invention such method automatically and continuously forms unitary members from corresponding and joinable first and second members. Basically the method comprises the steps of placing a respective first member onto a stationary work holding nest which is carried by a movable member at a loading station; successively advancing the first member from a loading station to a first member testing station, whereat the presence and alignment of the ring setting in the respective work holding nest is tested; successively advancing the first member from the first member testing station to a second member placing station, whereat individual ones of second members of various sizes are placed onto appropriate first members; successively advancing the assembled first and second members from the second member placing station to a second member testing station, whereat the presence and proper alignment of the second member with respect to its respective first member is tested; successively advancing the aligned first and second members from the second member testing station to a bonding station whereat the aligned first and second members are bonded together through the application of heat to thereby produce a unitary formed member; successively advancing the bonded unitary member from the bonding station to a bond testing station, whereat the bonded unitary member is tested for determining whether or not the bonded joint between the first and second members is satisfactory; successively advancing the tested unitary member from the bond testing station to a good parts removal station, whereat the bonded unitary members which have been successfully tested are removed from the work holding nest; and successively advancing those bonded first and second members which have been improperly bonded or unbonded first members from the good parts removing station to a bad parts ejecting station, whereat defectively bonded first and second members or non-bonded first members are ejected from the work holding nest.

A preferred embodiment of such method continuously forms unitary members from corresponding and joinable first and second members. Basically the method comprises the steps of placing a respective first member onto a stationary work holding nest which is carried by a movable member at a loading station; successively advancing the first member from a loading station, whereat bonding material is dispensed onto the ring setting held in the respective work holding nest; successively advancing the first member from the bonding member dispensing station to a second member placing station, whereat individual ones of second members of various sizes are placed onto appropriate first members; successively advancing the assembled first and second members from the second member placing station to a bonding station whereat the first and second members are bonded together through the application of heat to thereby produce a unitary formed member; successively advancing the bonded unitary member from the bonding station to a bond testing station, whereat the bonded unitary member is tested for determining whether or not the bonded joint between the first and second members is satisfactory; successively advancing the tested unitary member from the bond testing station to a good parts removal station, whereat the bonded unitary members which have been successfully tested are removed from the work holding nest; and successively advancing those bonded first and second members which have been improperly bonded or unbonded first members from the good parts removing station to a bad parts ejecting station, whereat defectively bonded first and second members or nonbonded first members are ejected from the work holding nest.

The present invention overcomes the numerous disadvantages associated with heretofore approaches for assembling rings in a reliable manner.

BRIEF DESCRIPTION OF THE DRAWINGS

The above, as well as other objects, features and advantages of the instant invention will be readily understood upon reading a detailed description thereof, when viewed in conjunction with the accompanying drawings, wherein like reference numerals serve to indicate like structure throughout the several views.

FIG. 6 is a fragmentary side elevational view, partly in section, illustrating the ring shank placing apparatus in the process of picking up a ring shank from a ring shank lifting apparatus and depositing the same on a ring setting positioned in a work holding nest;

FIG. 9 is a view taken substantially along the line 9—9 appearing in FIG. 6 looking in the direction of the arrows and illustrating the ring shank lifting apparatus which is positioned at the ring shank lifting station for purposes of cooperating with the components depicted in FIG. 8 so as to grasp a ring shank;

FIG. 10 is an enlarged fragmentary view, in phantom lines, illustrating the cooperation between the ring shank placing apparatus and the ring shank lifting apparatus as the ring shanks are in the process of being lifted from the ring shanks lifting apparatus;

FIG. 11 is a fragmentary side elevational view illustrating the operative relationship between the ring shank placing apparatus and the work holding device prior to the ring shank placing apparatus actuating the ring shank holding device for holding the ring shanks to the ring settings;

FIG. 12 is a view similar to FIG. 11 but, however, illustrating the ring shank holding device positively engaging a ring shank for firmly holding it to the ring setting subsequent to the ring shank placing apparatus camming the ring shank holding device to its holding position;

FIG. 13 is a fragmentary side elevational view illustrating in further detail other components forming the ring shank lifting apparatus;

FIG. 14 is a fragmentary plan view taken substantially along the line 14—14 appearing in FIG. 13 looking in the direction of the arrows and illustrating the interrelationship between the ring shank feed assembly and ring shank lifting apparatus of the present invention;

FIG. 20 is a side elevational view illustrating some of the structural components which form the spot welding apparatus of the present invention;

FIG. 21 is an end elevational view of the spot welding apparatus as shown in FIG. 20 depicting even more detail thereof;

FIG. 22 is a fragmentary view, partly in phantom lines, illustrating the engagement between pairs of heating electrodes and respective ring shanks during a typical welding operation;

FIG. 23 is an enlarged fragmentary view depicting in detail certain of the components forming the spot welding apparatus;

FIG. 24 is a side elevational view, partly in section, illustrating the bond testing apparatus of the present invention which serves to test the integrity and strength of each of the respective bonded joints between the ring shanks and settings subsequent to bonding by applying tensile forces thereto;

FIG. 25 is a cross-sectional view taken substantially along section line 25—25 appearing in FIG. 24 looking in the direction of the arrows and illustrating the dovetail guide arrangement which permits the testing apparatus to longitudinally reciprocate in response to actuation thereof;

FIG. 29 is a front elevational view illustrating structural aspects of the good parts removing apparatus which embodies the principles of the present invention;

FIG. 30 is a side elevational view of the good parts removing apparatus shown in FIG. 29 in various positions during movement from lifting the ring from the nest, as depicted by the solid lines, to a ring releasing position, as denoted by the phantom lines;

FIG. 31 is a plan view illustrating the bad parts ejecting apparatus embodying the principles of the instant invention which ejects defectively bonded ring shanks and settings or unbonded settings from the work holding nest;

FIG. 32 is a side elevational view taken substantially along the line 32—32 appearing in FIG. 31 illustrating in somewhat greater detail other structural components which form the bad parts ejecting apparatus that serves to lift unbonded ring settings or defectively bonded ring settings and shanks from work holder nests and deposit the same in a receptacle;

FIG. 33 is a fragmentary side elevational view, partly in section, illustrating in more detail the ejecting apparatus of the present invention shown removing a ring setting from a work holding nest;

FIG. 34 is a view somewhat similar to FIG. 33 but, however, illustrating the operation of the components in a retracted position;

DETAILED DESCRIPTION

Figure 1:
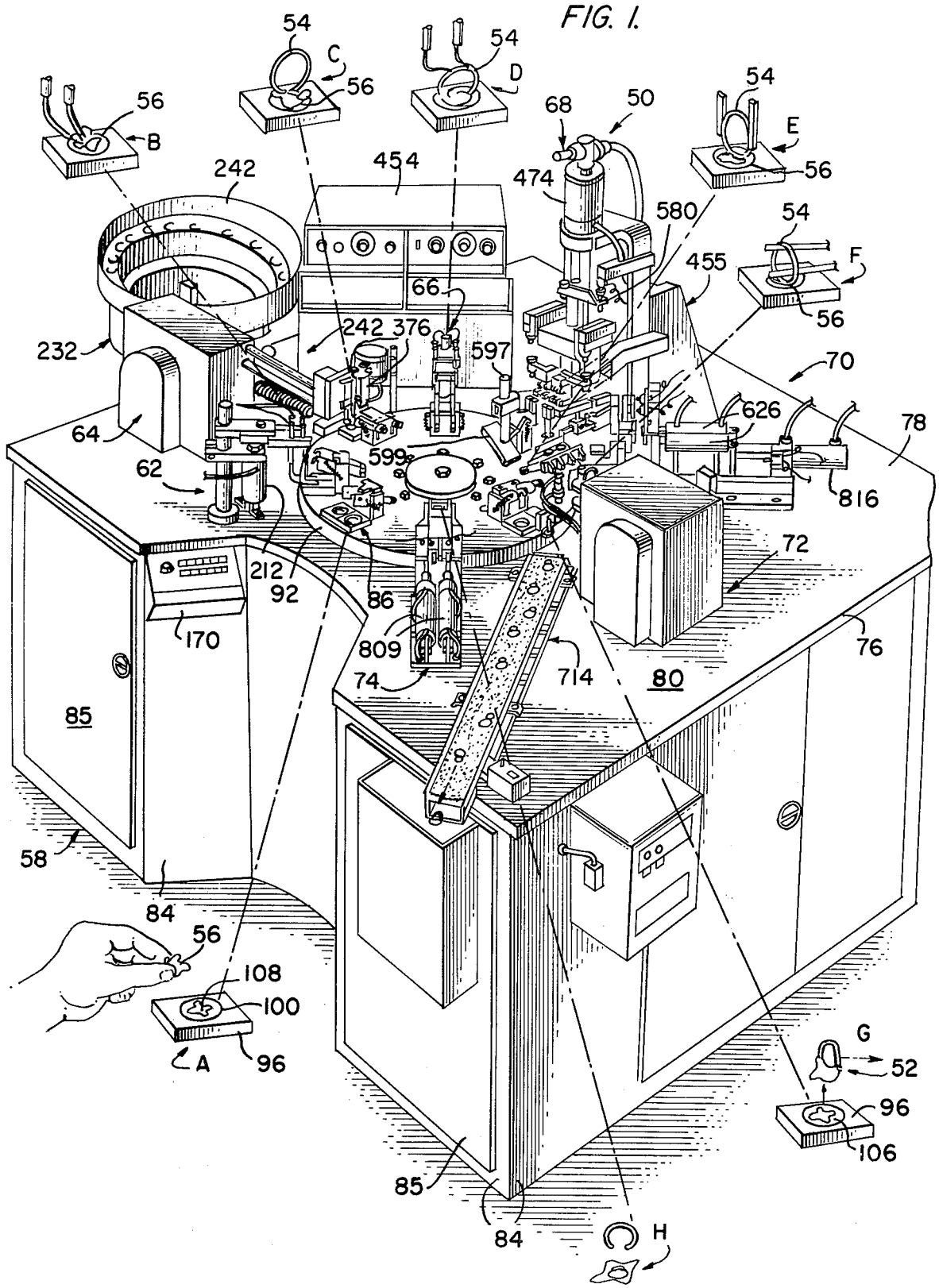
FIG. 1 is a perspective view illustrating a novel and improved ring assembling apparatus embodying the principles of this invention.
Figure 2:
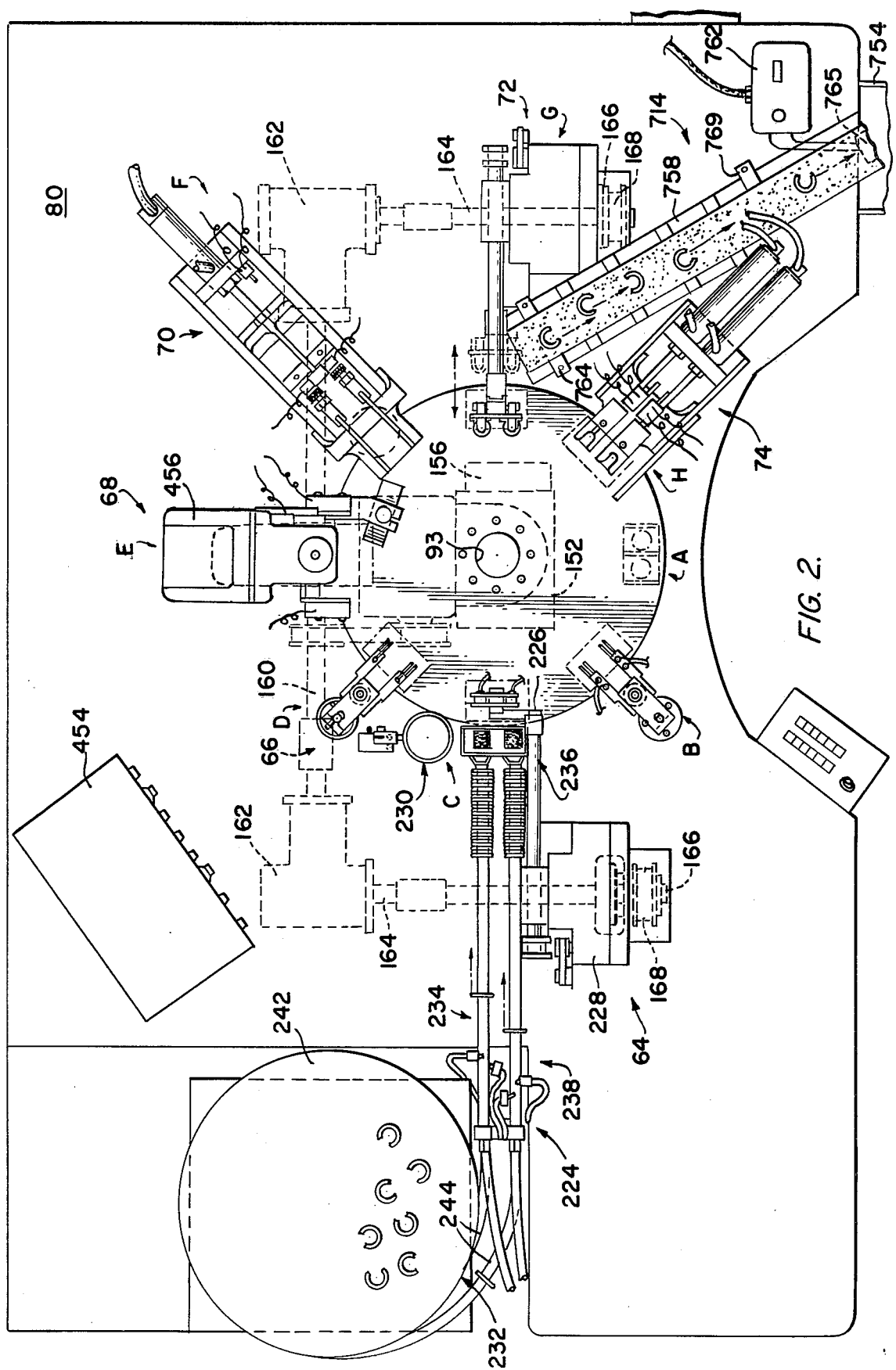
FIG. 2 is a plan view of the ring assembling apparatus depicted in FIG. 1, with certain components removed for the sake of clarity in illustrating the present invention.
Figure 3:
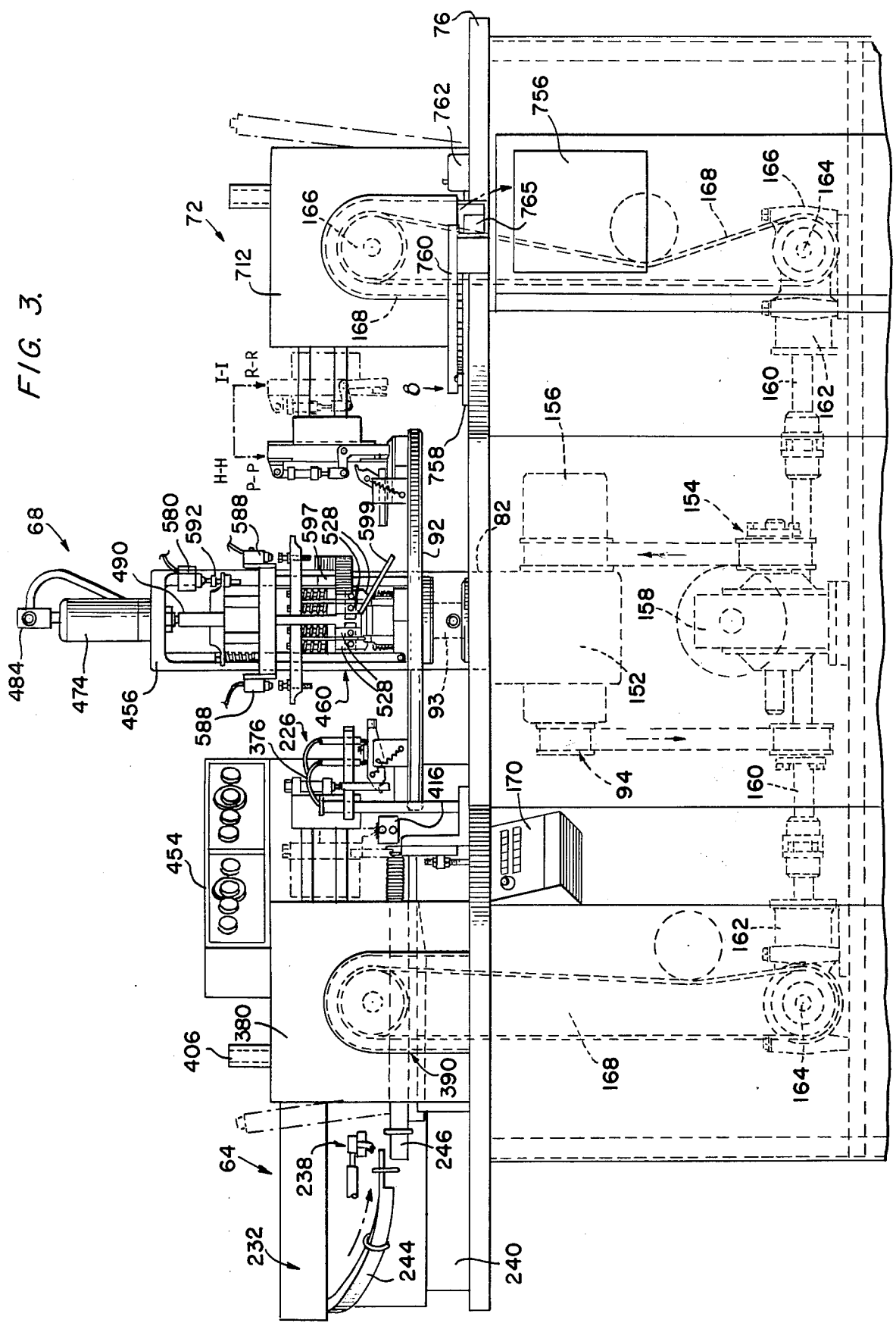
FIG. 3 is a side elevational view of the ring assembling apparatus as illustrated in FIGS. 1 and 2, depicting in even more detail components forming the ring assembling apparatus of this invention, as well as having certain components removed for sake of clarity in illustrating the present invention.

Referring now to the drawings and, specifically, to FIGS. 1 to 3 there is perhaps best viewed the novel and improved ring assembling apparatus of the present invention being generally designated by reference numeral 50. In the preferred embodiment, ring assembling apparatus 50 is particularly adapted for use in the rapid, automatic and continuous assembling of jewelry type finger rings 52, which may include various sized conventional ring shanks 54, and any appropriate ring setting 56 therefor. Although the succeeding description of this preferred embodiment is essentially directed to an apparatus for assembling jewelry type rings 52 which are adapted for wearing on the fingers, it should be emphasized that it is clearly within the theory and practice of this invention that other types of jewelry rings, such as necklaces, bracelets, and earrings can be assembled if comprised of joinable components. Of course, it will be further understood that it is entirely within the spirit and scope of this invention that other integrally united articles comprised of joinable components can also be suitably assembled.

Ring assembling apparatus 50 of the illustrated embodiment includes apparatus supporting means 58, advancing means 60, ring setting testing means 62, ring shank placing means 64, ring shank testing means 66, bonding means 68, bond testing means 70, good parts removing means 72, and bad parts ejecting means 74.

With continued reference to FIGS. 1 to 3 the apparatus supporting means 58 is defined by a conventional form of desk type work table unit 76. Work table unit 76 is appropriately dimensioned to provide for a compact and conventional arrangement enabling an operator to easily and selectively operate ring assembling apparatus 50. This specific desk unit 76 includes a generally flat and relatively sturdy mounting support table 78 having work surface 80 and a centrally located opening 82 formed through support table 78. Opening 82 serves, in a manner to be described, to accommodate a portion of the advancing means 60 for allowing the latter to incrementally rotate through a complete revolution. In addition, support table 78, as is clearly depicted in FIGS. 1 to 3 and as will be presently explained, has operatively connected thereto advancing means 60, ring setting testing means 62, ring shank placing means 64, ring shank testing means 66, bonding means 68, bond testing means 70, good parts removing means 72, and bad parts ejecting means 74. Work table unit 76 also includes side panels 84 and suitable upright supports (not shown) which, in a known manner, supports the mounting support table 78. The side panels 84 of table unit 76 may also be formed so as to have at convenient locations hinged access doors 85 which permit access to the other structural assemblies of the present invention. The materials for the construction of the work table unit 76 may be made of any appropriate kind which possesses properties such as rigidity, durability, and the ability to withstand repeated loads and stresses without subsequent failure. It should be pointed out that although the drawings disclose one particular type of configuration for the work table unit 76, such is to be taken for purposes of illustration and not to be considered a limitation, since other forms of construction are envisioned within the scope of this invention.

Advancing means 60 is seen to include work holding means 86 which includes ring setting holding means 88, shank holding means 90, turret wheel 92, and intermittent driving means 94 (FIG. 3).

Principally referring to the turret wheel 92, it is defined by a generally circular disc. Intermittent driving means 94, in a manner to be subsequently elaborated upon, is operatively connected to the turret wheel 92 and positively incrementally advances the latter to a plurality of discrete positions. Top surface of turret wheel 92 has a plurality of circumferentially spaced sets of identical work holding means 86 connected thereto. Each set of work holding means 86 includes a pair of closely juxtaposed ring setting holding means 88 and corresponding shank holding means 90. Turret wheel 92, as noted, is successively and incrementally advanced, whereby each set of work holding means 86 travels from at least loading station A, to a plurality of working stations including ring setting testing station B, ring shank placing station C, ring shank testing station D, bonding station E, bond testing station F, good parts removing station G, and bad parts ejecting station H. Each set of work holding means 86 is circumferentially spaced so that whenever a respective one is situated at one particular station, the other sets are correspondingly aligned at the other respective work performing stations.

Each of the respective pairs of ring setting holding means 88 is similar in construction to the others. The purpose of having pairs of ring setting holding means 88 utilized at each of the stations is to provide for a relatively greater rate of production for ring assembling apparatus 50. Of course, the present invention contemplates that other suitable numbers of setting holding means 88 may be used to provide for a particular desired output rate.

Figure 17:
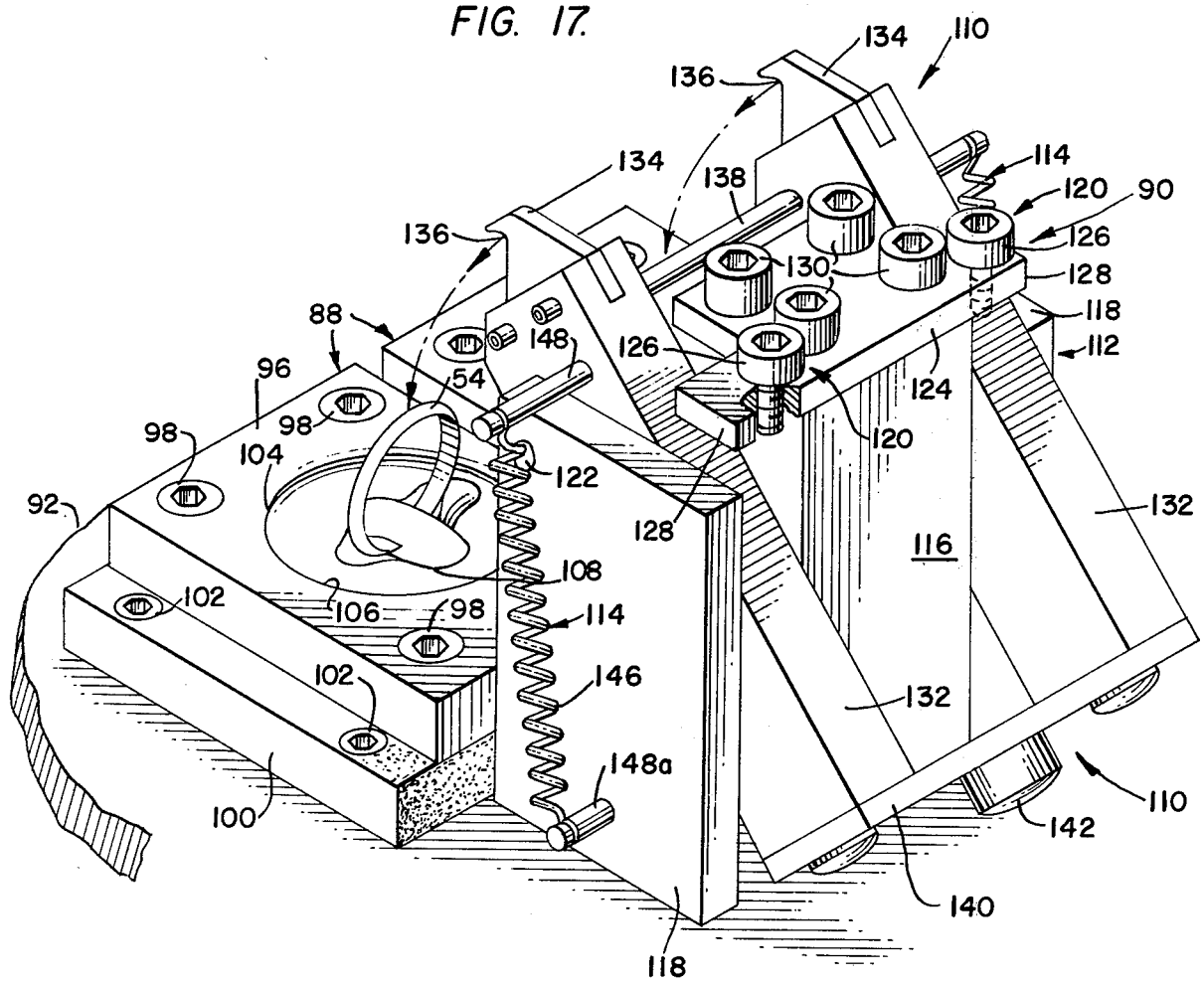
FIG. 17 is an enlarged perspective view illustrating an embodiment of the shank holding device of this invention.

Individual ones of the ring setting holding means 88 are more clearly shown in FIGS. 1 and 17. Since both are identical only one will be described. As depicted, ring setting holding means includes a tray member 96 fixed as by insulating type cap screws 98 to insulation member 100 and turret wheel 92. The insulation block 100 is appropriately secured to turret wheel 92 by any insulating type of cap screws 98 at the opposite ends thereof. The insulation block 100 may be extended beneath both trays 96. The basic purpose served by such insulation block 100 is to prevent electrical current from passing to the turret wheel 92 during the various operations in which the ring shanks 54 and settings 56 are subject to electrical current. Such tray 96 may have any configuration but, in the embodiment being shown is generally rectangular. Also, the tray 96 is made of any appropriate metal and is formed with a central cylindrical recess 104 formed in the top surface thereof. Recess 104 removably receives a cylindrical molded nest member 106 which itself defines any suitable configured cavity 108 for snugly and removably receiving a corresponding ring setting 56. The nest member 106 is fabricated from any appropriate material which serves to retain its dimensions during the ring assembling process. It will be understood that cavity 108 is formed with an impression which is substantially complementary to the particular design on the ring setting 56. Since the nest 106 is removable, it will be recognized that other nests having different cavity configurations for correspondingly different shaped ring settings may be used. The cavity 108 should also be constructed so as to have the impression rather precisely formed. By having nest member 106 with a precisely formed cavity 108 whatever tendency exists for the ring shanks and settings 54 and 56, respectively, to drift during the operations performed thereon is virtually eliminated. Additionally, this preciseness furthers the formation of a plurality of finger ring members 52 which have been more consistently and uniformly worked upon. Hence, satisfactory production line work is advantageously achieved. In addition to the foregoing, such fit ensures and enhances proper operation on the settings and shanks at stations B to H. To properly place each of the ring settings 56 into the setting holding means 88 at loading station A, an operator will very easily and conveniently place a ring setting 56 into the cavity 108. While the preceding description is directed to the manual insertion of settings 56 into the nest cavities 108 the present invention recognizes that such feeding and insertion may be done mechanically as well as automatically.

With continued reference to FIG. 17, shank holding means 90 is best depicted. Essentially, shank holding means 90, in a manner to be described, is appropriately actuated to selectively engage a pair of ring shanks 54 so as to firmly hold such shanks in a stationary position for enabling the bonding operation to be performed.

Figure 28:
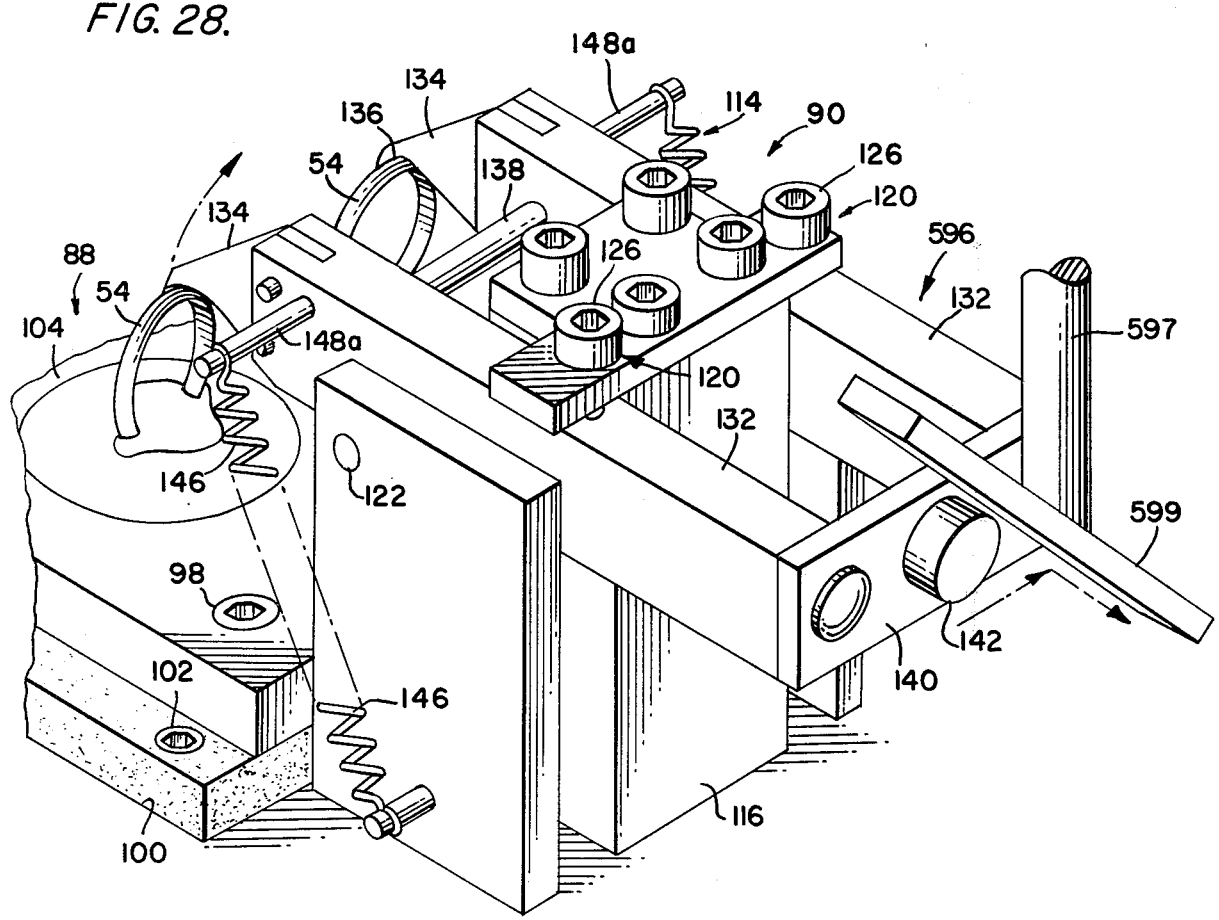
FIG. 28 is a perspective view demonstrating the operative interrelationship between the shank holding device and camming arm situated at the spot welding apparatus.
Figure 26A:
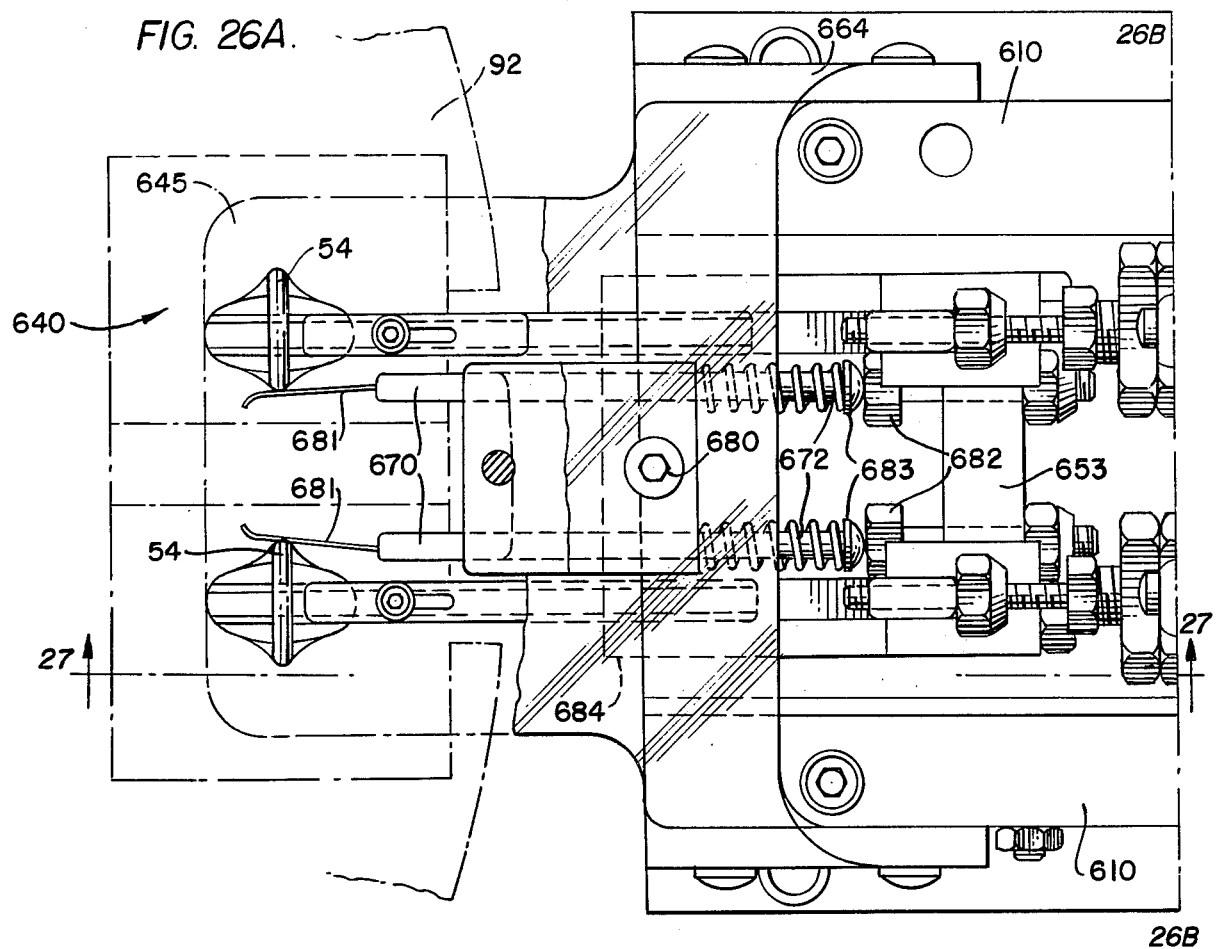
FIGS. 26A and 26B are plan views taken substantially along respective lines 26A—26A and 26B—26B appearing in FIG. 24 looking in the direction of the arrows and illustrating in somewhat greater detail additional components which form the bond testing apparatus of this present invention.

Shank holding means 90 basically includes a pair of pivotal shank holding arm means 110, support bracket means 112, and pivot biasing means 114. Arms 110 are pivotally connected to the support bracket means 112 and are selectively pivotally movable between a generally inclined, non-engaging position as shown in FIG. 17, to a generally horizontal shank engaging position, as shown in FIG. 28. Whenever the arms 110 are in their horizontal position they serve to contact the shanks 54. The biasing means 114, as will be shortly described, serves to yieldably maintain the pivotal arms 110 in either their engaging or disengaging positions.

Bracket means 112 is seen to be defined by central post member 116, bracket end plates 118 and pivot adjusting means 120. Central post 116 is conventionally affixed to and extends upwardly from turret wheel 92. As shown it is positioned adjacent and radially inwardly from the pair of trays 96. Each pair of trays 96 has associated therewith a corresponding central post 116. End plates 118 are also securely fastened to turret wheel 92 and spaced adjacent opposite sides of central post 116. Pivot pin 122 pivotally interconnects respective ones of the pivotal arm means 110 to and between the corresponding end plates 118 and central post 116.

Pivoting adjusting means 120 includes top plate 124 and adjustable stop bolts 126. Plate member 124 is relatively flat and has two protruding portions 128. Also top plate 124 is directly connected to the top of central post 116 by threaded bolts 130. The adjustable bolts 126 are threaddedly connected to suitably formed apertures in the protruding portions 128 and function to contact the top surfaces of pivotal arm means 110, whenever the latter are in their generally horizontal position. Accordingly, bolts 126 can selectively define the uppermost horizontal positions the arms 110 can attain, such as shown in FIG. 28. It will, therefore, be understood that through appropriate manipulation of adjustable bolts 126, the height of pivotal arm means 110 above trays 96 can be easily adjusted for various sizes of ring shanks. By virtue of the foregoing adjustment arrangement ring shank holding means 90 enables ring apparatus 50 to have added versatility.

Now referring to the pair of pivoting arm means 110, each one of the pair is defined by an elongated arm 132. The arms 132 are pivotally movable between the shank engaging and disengaging positions, previously observed. Secured at the forward end of each arm 132 is a shank engaging member 134. Shank engaging member 134 has an arcuate curved surface 136 which is generally complementary to the curved surface of the shanks 54. In this manner, member 134 can more firmly hold the shanks to their appropriate ring settings 56. The present invention contemplates that shank engaging members 134 be comprised of an electrically insulating fiber material or the like, for purposes of insulating the remainder of the shank holding means 90 from electric current which might pass from the shanks 54.

A camming means or rod 138 is fixedly connected to and between the forward end of the pivot arm members 132 as denoted in FIG. 17. Such camming rod 138 serves to enable pivot arms 132 to be swung downwardly from their inclined, non-engaging position as indicated in FIG. 17, to their engaging positions as illustrated in FIG. 28. As afterwards more fully explained camming rod 138 is actuated to be downwardly displaced in response to actuation by shank placing means 64, such that the shank engaging members 134 firmly contact the tops of the shanks 54. Pivoting arm means 110 further includes backing plate 140 which is fastened to and between the rearward ends of the arm members 132. Generally, centrally and rearwardly protruding from backing plate 140 is a camming member 142. Camming member 142 serves a dual purpose in the sense that it contacts the top surface of turret wheel 92 to limit the upward pivotal movement of arms 132, such as depicted in FIG. 17, and also serves to enable the pivotal arms 132 to pivot from their generally horizontal position (FIG. 28) to their generally upwardly tilted position (FIG. 17) as the pivotal arms 132 on turret wheel are in transit from the welding station E to bond testing station F.

As mentioned above, shank holding means 90 includes a pair of pivot biasing means 114. In the embodiment being described pivot biasing means 114 includes a coil spring 146 and a pair of pins 148 and 148a. Top pin 148 is affixed to an outward side of pivot arm 132, whereas the lower pin 148a extends outwardly from the side of end plate 118. As shown spring member 146 is suitably interconnected between pins 148 and 148a. By this arrangement, the arms 132 are under a constant yieldable biasing force.

Now with particular reference to FIGS. 11 and 12 in conjunction with FIGS. 17 and 28. In accordance with the present invention whenever top post pin 148 is positioned on the outward side of a vertical plane which extends through pivot pin 122, the associated pivotal arm 132 (FIG. 12), then under the biasing of spring 146 the arms 132 will be firmly retained in its generally horizontal position. Also, in accordance with this invention whenever top post pin 148 is situated rearwardly of pivot pin 122 the biasing action of spring 146 will normally maintain such pivot arm 132 in its inclined position.

The foregoing arrangement is very effective for ensuring that the shank holding means 90 contacts and securely holds the ring shanks 54 to respective ring settings 56 which are held by ring nest members 106. Additionally, it ensures that the pivot arms 132 yieldably maintain an inclined position for purposes of preventing the pivot arms 132 from inadvertently being downwardly displaced from their raised position to their generally horizontal holding position. As previously described, an operator at the loading station A, simply places the ring settings 56 into the appropriate cavities 108 of nest members 106. As will be mentioned, turret wheel 92 is incrementally advanced, by driving means 94 to station B.

Specifically referring to FIGS. 2 and 3, there is, perhaps best illustrated a conventional type of advancing means 60 of the instant invention which, as noted, essentially comprises turret wheel 92 and incremental driving means 94. Driving means 94 is mechanically connected to work table unit 76 and drivingly connected, in any conventional fashion, to turret wheel 92, as by shaft 93 (FIG. 2). As a result, turret wheel 92 is movable in response to displacement of driving means 94 for purposes afterwards made evident. Generally, though the turret wheel 92 and driving means 94 of this embodiment are conventional and, therefore, brief reference will be made to the present system for purposes of illustration but not for limitation.

Now, with reference to the incremental driving means 94, such is seen to include an indexing mechanism or means generally indicated by reference numeral 152, and motion producing and transmitting system 154. It will be appreciated that the components forming the indexing mechanism 152 including a rotation stopping device such as a clutch are made of conventional material, and are constructed and assembled in known fashion. Such indexing mechanism 152 may be housed within and supported, in any convenient fashion, by mounting support table. Indexing mechanism 152 essentially serves to drive the turret wheel 92, in a step-by-step manner so that each pair of work holding means 86 is successively and consecutively advanced to respective ones of the working stations A to H. Of course, other equivalent incremental motion producing mechanisms may be employed within the spirit of this invention so long as they provide successive and positive incremental rotational advancement to turret wheel 92. As will be subsequently discussed the indexing mechanism will be operatively connected to limit switches that will serve to prevent its operation should difficulties arise in the operation of the ring assembling station.

In connection with the motion producing and transmitting means 154, such is diagrammatically illustrated in FIGS. 2 and 3. It is seen to be comprised of torque limiting means 156, drive motor and reducer unit 158, main transmission drive shaft 160, angle gear devices 162, secondary drive shafts 164, pulleys 166, and drive belts 168. Likewise, with respect to the motion producing and transmitting means 154 of this embodiment, it is comprised of conventional components and, therefore, brief reference will be made thereto for purposes of illustration but not limitation since other drive arrangements can be used. Any suitable type of torque limiting means 156 may be used which is operatively coupled in a known fashion between the drive motor 158 and the indexing mechanism 152 for purposes of releasing the drive from the indexing mechanism whenever the latter experiences a predetermined torque overload. Consequently, the likelihood of damage to the indexing mechanism 152 as well as turret wheel 92 is greatly reduced or eliminated. Drive motor and reducer unit 158 is a standard form of arrangement which is mechanicaly operatively connected, in any known manner, to both the indexing mechanism 152 and main driving shaft 160 for simultaneously driving both. It will be appreciated that the indexing mechanism 152 in response to being driven acts to index the turret wheel 92 in a step-by-step manner to a plurality of positions. On ther other hand, main driving shaft 160 serves to continuously drivingly rotate secondary drive shafts 164, through well-known types of angle gear units 162 which are appropriately connected to apparatus supporting means 58. As more clearly noted in FIG. 2, one secondary driving shaft 164 is mechanically coupled to a pulley 166 and belt 168 associated operatively with good parts removing means 72. Accordingly, since secondary driving shaft 164 is being continuously driven by motor and reducer unit 158 the good parts removing means is likewise continuously operated in a manner which will be afterwards mentioned. The other angle gear unit 162 enables the other secondary driving shaft 164 to be continuously driven. As noted, this latter secondary shaft 164 has pulley 166 attached thereto which serves to drivingly rotate a driving pulley 166 mechanically connected, in a known manner, to ring shank placing means 64 through belt pulley 168. Accordingly, the ring shank placing means is continuously driven for reasons subsequently made evident.

While the foregoing description essentially describes one form of driving and transmission means 154, it should be emphasized that it is entirely within the spirit and scope of this particular invention that other types of driving and transmission arrangements may be employed for purposes of driving the indexing mechanism 152 and both the ring shank placing means 64 and good parts removing means 72 so each can be operated in a manner consistent with the instant invention.

A conventional type of control box 170 is appropriately operatively connected to ring assembling apparatus 50 in a manner not forming part of this invention and may appropriately enable control of operation of advancing means 60, ring setting testing means 62, shank placing means 64, shank testing means 66, bonding means 68, bond testing means 70, good parts removing means 72, and bad parts ejecting means 74.

From the aforementioned description it will be understood that in response to actuation of indexing mechanism 152 the turret wheel 92, holding nest members 106 which carry the ring settings 56, is incrementally advanced from the loading station A to the testing station B. During this particular action, empty nest members 106 situated at station H are simultaneously and incrementally advanced from ejecting station H to loading station A. By the foregoing the nests 106 can be suitably reloaded with ring settings. Although it is disclosed that an operator places the ring settings 56 onto corresponding nest members 106, the present invention contemplates that suitable mechanical devices may be employed for such purposes without departing from the spirit and scope of this invention.

RING SETTING TESTING MEANS

At the ring setting testing station B, the ring setting testing means 62 is actuated so as to enable a determination of whether or not there is a presence or absence, or misalignment of ring settings 56 in the nest member 106. Briefly, hereinafter described, ring setting testing means 62 essentially comprises first support means 172, probe holding means 174, probing means 176, and testing actuating means 178.

Figure 4:
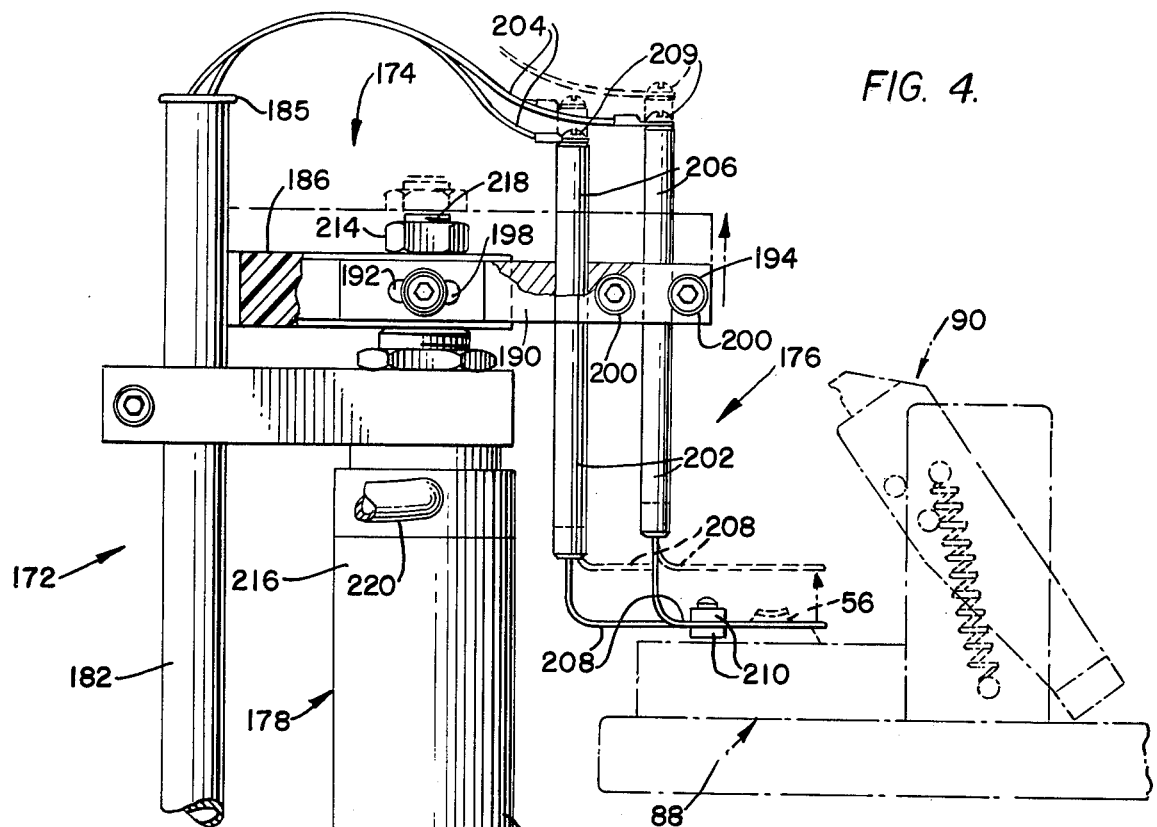
FIG. 4 is a side elevational view, partly in section, of a ring setting testing device shown testing a stationary ring setting retained by a work holding nest.
Figure 4A:
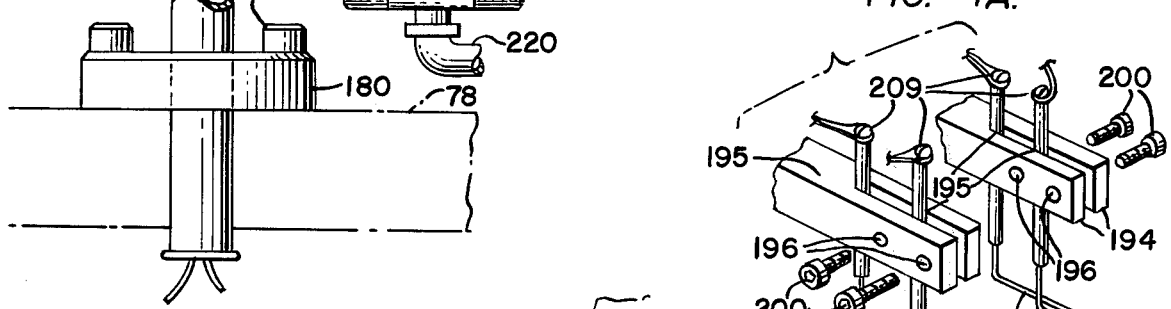
FIG. 4A is a fragmentary view illustrating in somewhat greater detail the arrangement of electrical probes of the ring setting testing device.
Figure 5:
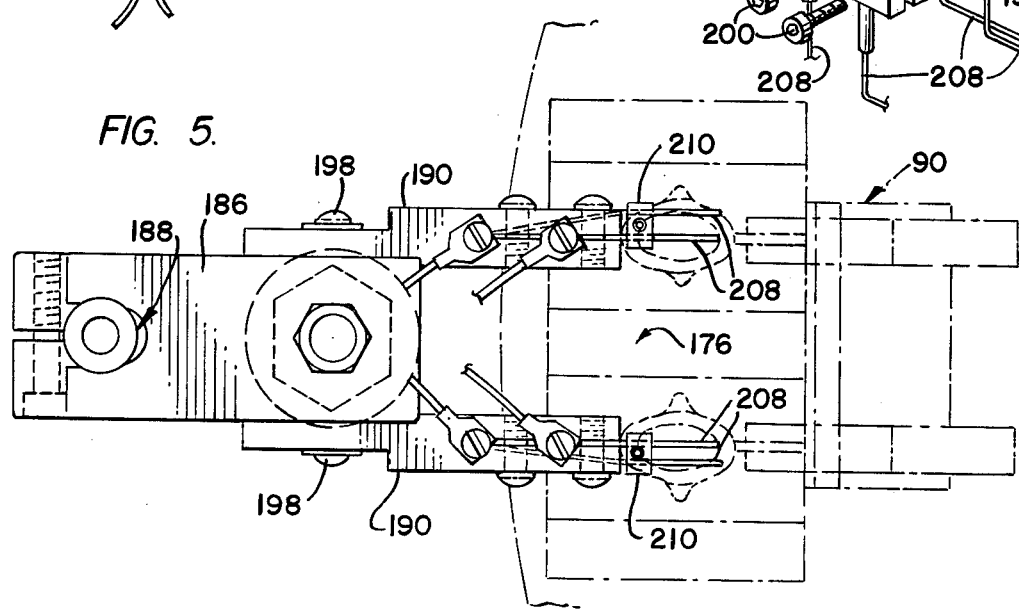
FIG. 5 is a plan view of the ring setting testing device as more clearly shown in FIG. 4.

In regard to first supporting means 172, reference is made to FIGS. 4 and 5 wherein it is seen to include probe base member 180, and elongated support tube 182. The probe base 180 has a central opening and is fastened by bolts 184 or the like to mounting support table 78. Support tube 182 extends through both the central opening in the probe base 180, and an appropriate opening in mounting support table 78. The upper end of support tube 182 has a bushing 185 fitted therein.

With respect to probe holding means 174 it is movable between an upper or inoperative position indicated by the phantom lines in FIG. 4, and a lower or operative testing position, represented by the solid lines depicted in FIG. 4. As will be observed, whenever holding means 174 is in its lowermost or operative position, probing means 176 is operatively arranged to contact the ring settings 56 for purposes mentioned presently. Probe holding means 174 is defined by a longitudinally elongated probe holding device 186 having a recess 188 which enables the holding device 186 to vertically reciprocate along at least a portion of the axial extent of guide support tube 182. The top of the probe holding device 186 may contact bushing 185 and in this manner serve to limit uncontrolled upward movement thereof. In addition, probe holding means 174 includes a pair of elongated probe insulating members 190. Each probe insulating member 190 has an elongated slot 192, and split forward ends 194 having arcuate cut-outs 195 and pairs of openings 196. Conventional cap screws 198 extend through elongated slots 192 and threadedly cooperate with respective threaded transverse bores (not shown) in the probe holding device 186. By virtue of this arrangement, probe insulating members 190 are detachably fastened to the sides of probe holder device 186. Accordingly, insulating members 190 move in unison with the holding device 186. Elongated slots 192, of course, function to permit longitudinal adjustment of the position of probing means 176. Split ends 194 of probe insulating members 190 protrude outwardly in the direction of turret wheel 92. A pair of removably threaded cap screws 200 are rearwardly fastened to openings 196 between respective split ends 194 to hold such probing means 176 in any desired position.

With particular reference to the probing means 176, such essentially includes a pair of well-known and suitable probing units 202 and lead wires 204 associated with each probing unit 202. Each probing unit 202 has a body 206 with a generally cylindrical configuration being fabricated from any suitable material and has a downwardly protruding probe finger 208. Since, such probing units 202 do not form an aspect of this invention, a detailed description of their construction and operation will be dispensed with. However, to better understand their operation in the context of this invention, only those aspects which are deemed pertinent will be mentioned. The terminal wires or probe fingers 208 extend downwardly vertically and have their free ends positioned in a generally horizontal plane. By reason of this arrangement they enable contact with the ring settings 56 held in nest member 106 as depicted in FIG. 4. To maintain electrical separation between probe fingers 208, and to avoid uncontrolled vibrations of their free ends, a pair of upper and lower clamp members 210, preferably, fabricated from electrically insulating material, are suitably joined together as by a threaded screw or the like.

The free ends of probe fingers 208 are spaced apart and adapted to be oriented in the particular position illustrated in FIG. 5 for purposes of providing an electrical continuity check for the presence and misalignment of ring settings. It will be appreciated, of course, that should for one reason or another, a ring setting 56 not be present in a nest member 106, finger probes 208 will not contact the setting 56. Also, if, for instance, the ring settings 56 are seriously misaligned in nests 106, both the finger probes 208 associated with each probe unit 202 will not contact them.

The lead wires 204 are connected from respective terminals 209 formed on the top of body members 206 and extend downwardly through probe support tube 182 so as to avoided having such lead wires being damaged or otherwise hindering the successful operation of ring setting testing means 62. Lead wires 204 are appropriately electrically connected, in a known manner, to a suitable and conventional type of commercially available memory system or means 900. As will be mentioned, the memory system or means 900 in general terms serves the purpose of remembering whether or not products which have been tested are "good" or "bad", as such products successively advance along a predetermined path of travel. Memory means 900 also functions to actuate particular devices at preselected locations along such path so as to thereby selectively work upon the good or bad products.

Figure 37:
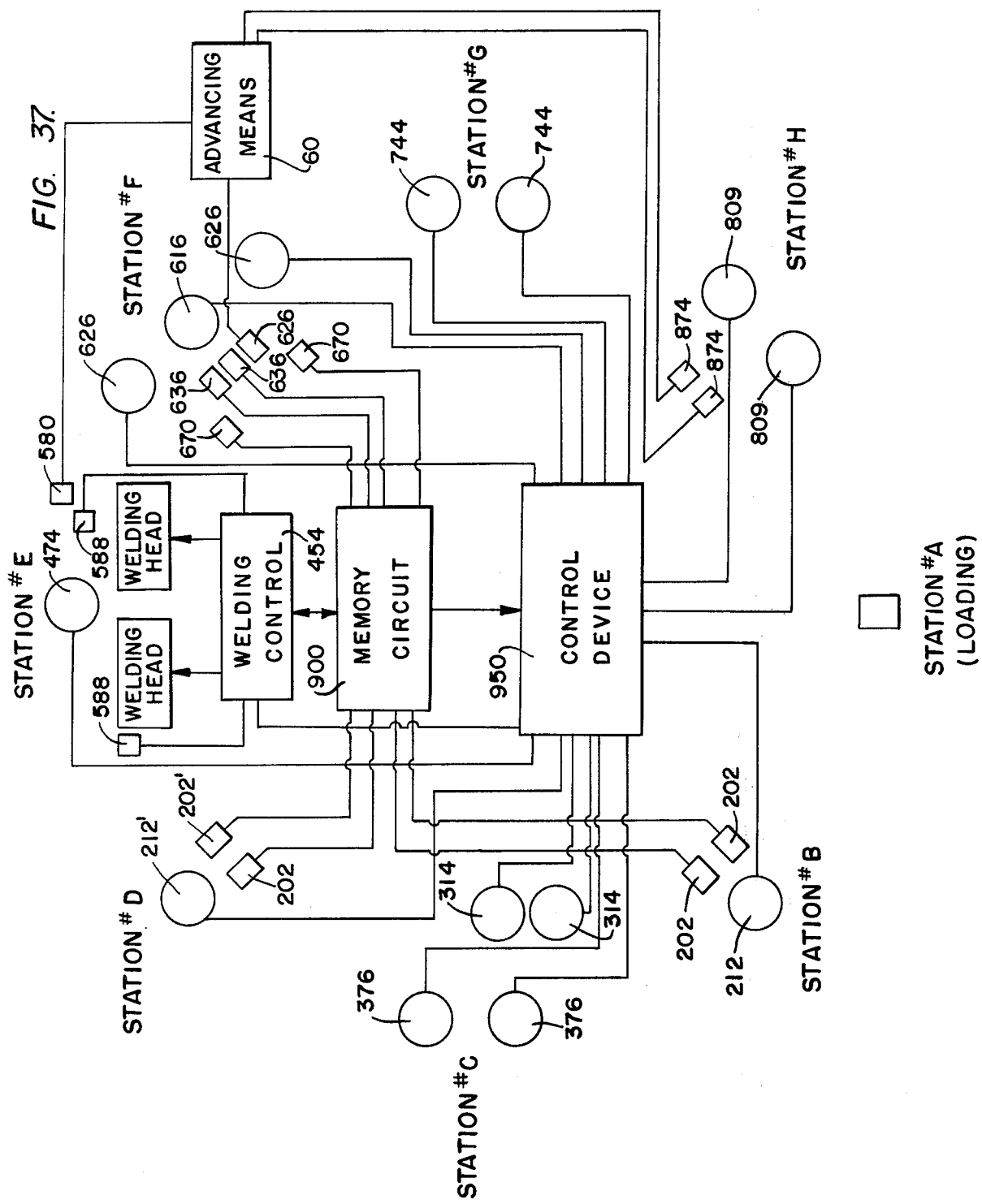
FIG. 37 is a schematic view illustrating in block diagram form the essential connections between the micro switches, fluid motors, welding apparatus, memory circuit and control means of the instant invention.

In regard to testing actuating means 178, it is comprised of motor actuating means 212. The present invention envisions that motor actuating means 212 is comprised of a conventional double-acting type of fluid motor 216 which includes a vertically reciprocal piston rod 218 suitably positioned through a central opening in holding device 186 and being secured as by locking nut 214 to probe holding device 186. By this particular arrangement, probe holding device 186 is vertically positionable between its operative and inoperative positions in response to selective energization of fluid motor 216. Motor actuating means 212 also includes fluid supply lines 220 connected by conventional fittings or the like to operate ends of the fluid motor 216. By virtue of this arrangement, fluid can, in a known manner, be selectively introduced and exhausted from the fluid motor 216. As a result, selective extension and retraction of piston rod 218 can occur so as to attain the desired movement of probing units 202. Fluid supply lines 220 are also connected at their opposite ends to control means 950 (FIG. 37). As will be afterwards explained, control means 950 serves the function of controlling the sequence fluid motor 216 extends and retracts piston rod 218. In the present embodiment, fluid motor 216 will be energized to move the probing means 176 from its inoperative position downwardly to the operative position, whenever the turret wheel 92 is indexed such that a pair of nests 106 is situated at the ring setting testing station B.

It is to be understood, that while the present invention envisions that testing actuating means 178 is defined by a fluid motor, an electrically energizable solenoid device or the like, may also be effectively used without departing from the spirit and scope of this invention.

As indicated earlier, whenever finger probes 208 are in their operative position the ring setting functions to effectively electrically connect the two finger probes 208. It will be understood, of course, that ring settings 56 are made of a conductive material which can at least conduct electricity. The probe units 202 supply electric current to probe fingers 208 and if both are electrically connected together through a ring setting 56 or the like then the pair of probe units function in a conventional fashion to transmit a signal indicative of this condition. Consequently, the output signal which is generated is indicative of the fact that a ring setting 56 has, indeed, been properly inserted and retained in the nest member 106 as well as properly aligned. It is intended, of course, that such output signal be transmitted to the memory means 900 for purposes of tracking the corresponding ring setting 56 as it successively advances to testing station B to shank placing station C. Conversely, should a ring setting 56 not be present or at least not properly positioned, then the probe fingers 208 will both not contact such setting. As a result, the probe units 202 will cooperate in known fashion, with memory means 900 so that the memory means has detected a badly positioned setting.

At this particular point, it should be mentioned that the memory or monitoring means 900 is operatively connected to the turret wheel 92 and probing means 176 such that an output signal indicative of a ring setting 56 not being present would be transmitted by the probing means as a bad signal. The bad signal will simultaneously keep track of a particular nest member 106, as the latter is successively advanced to other positions. It is envisioned that such bad signal be stored and sequentially advanced and transmitted so as to not actuate the ring shank placing means 64 associated with that particular work holding nest 106 at station C.

Alternatively, of course, while electrical probes 202 have been described in connection with this particular embodiment, it is contemplated that other equivalent testing assemblies may be suitably utilized to the extent that they enable adequate indication of presence and absence of ring settings 56 in ring nests 106, as well as provide indications of setting misalignment. An example of such an equivalent system may include photocells or other testing arrangements.

While the preceding description was given with respect to the ring setting testing means 62, at station B, a similar type probing means 176' may be situated at the ring shank testing station D for the purposes of determining whether or not a particular ring shank 54 is properly aligned with respect to the ring setting 56 in the nest member 106. After having the testing operation performed at the ring setting testing station B by ring setting testing means 62, the indexing mechanism 152 is operated to successively rotate the turret wheel 92, an additional incremental step. Accordingly, each pair of work holding nests 106 circumferentially spaced on turret wheel 92 is advanced to the next operating station. As a consequence thereof, the particular pair of work holding nests 106 at station B, are advanced to the ring shank placing station C.

RING SHANK PLACING MEANS

Referring to the illustrated embodiment, ring shank placing means 64 is shown to basically be defined by ring shank supplying means 224, ring shank carriage means 226, motion translating means 228, and flux applying means 230.

Again referring to FIGS. 1 to 3, taken along with FIGS. 6 to 12 and 19 shank supply means 224 is perhaps more clearly depicted. As denoted, ring shank supplying means 224 embodies vibrating parts feeder apparatus 232, shank feeding means 234, shank lifting means 236, and shank feeding control means 238. Vibrating parts feeder 232 is a conventional type which serves to consecutively dispense individual ring shanks 54. Other types of individual items which may be joined together, as contemplated by the instant invention, can also be dispensed. The components forming vibrating parts feeder 232 are made of conventional material and are constructed and assembled in known fashion. Accordingly, a detailed description of its operation and structure will be dispensed with. To better understand, however, the operation of vibrating parts feeder 232 in connection with this invention only those aspects necessary for an understanding thereof in relation to this embodiment will be set forth.

Primarily, parts feeder 232 includes a support stand 240 and a vibrating bowl 242 which contains and enables the dispensing of a plurality of ring shanks 54. Particularly, referring to FIG. 19, the parts feeder 232 utilized in accordance with this invention is adapted to include dual-inclined exit guide ramps 244 having elongated overlapping terminal ends 245 which are suitably connected to bowl 242. Such guide ramps 244 descend to and operatively cooperate with the shank feeder means 234 in a manner to be more precisely described. In typical fashion, individual ring shanks 54 in consecutive succession gradually travel downwardly along each of the exit ramps 244. As observed the individual shanks 54 straddle respective ones of the ramps 244. It, of course, will be appreciated that ring shanks 54 on ramps 244 will thereafter descend toward the shank feeder means 234. Different sizes of ring shanks can be fed from the bowl 242, since the guide ramps 244 are appropriately dimensioned for such purposes.

Now referring to shank feeder means 234, it is seen to include a pair of generally elongated parallel, spaced apart and sloping track members 246. Track members 246 may be secured, in any conventional manner, to mounting support table 78 or other appropriate support device through suitable and conventional supporting bracket arrangements. Since the manner of securing the track members 246 does not form an aspect of this invention a detailed description as to such mode of securement is dispensed with. However, whatever form of securing is adopted it should be such that track members 246 are suitably positioned at the third or ring shank placing station C. Also, as depicted, each of the inclined track members 246 is aligned to cooperate with a corresponding exit ramp 244. Overlapping ends 245 extend over rearward end portions of the track members 246. Consequently, shanks 54 after leaving respective ramps 244 drop off overlapping edges 245 onto corresponding track members 246. Also, through the preceding arrangement ring shanks 54 will similarly straddle track members 246 in the same manner as exit ramps 244. As indicated, the track members 246 are inclined in such a fashion that they gradually slope toward shank lifting means 236. By reason of the incline, shanks 54 are able to more easily advance, unaided, towards the shank lifting means 236. In accordance with the present invention, track members 246 are of suitable length so that a convenient supply of ring shanks 54 may be accumulated thereon. As a consequence thereof, a ready supply of ring shanks 54 is provided. The opposite ends of track members 246 are situated adjacent the shank lifting means 236 as shown in FIGS. 2, 3 and 6.

Figure 19:
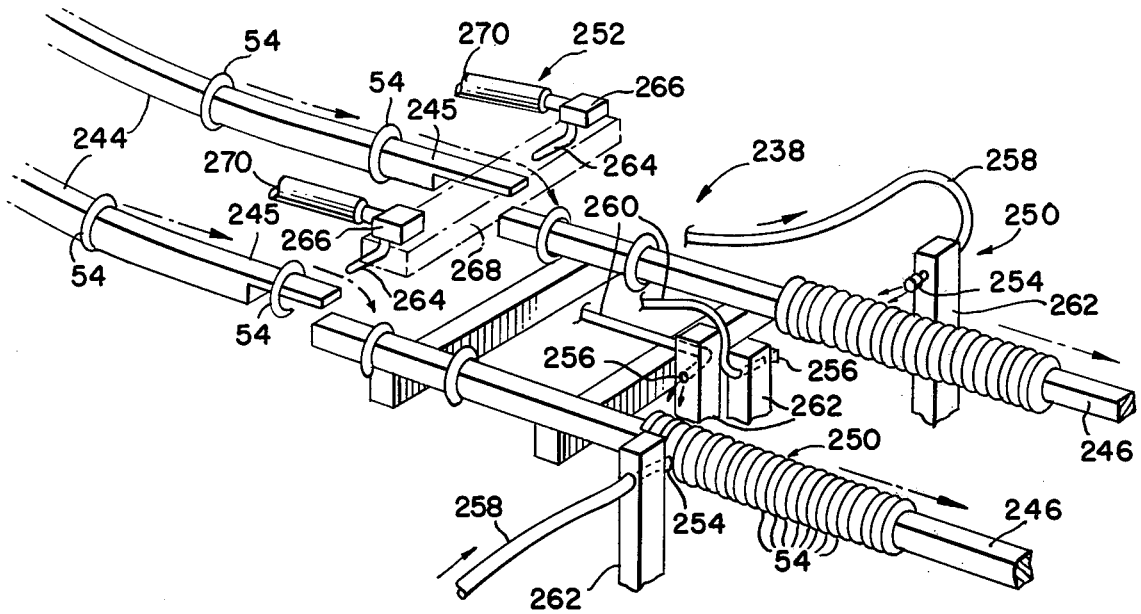
FIG. 19 is a diagrammatic view taken of a portion of the ring shank feed assembly apparatus.

Situated intermediate the vibrating bowl 242 and track members 246 is the shank control means 238 of the present embodiment, as perhaps best illustrated in FIGS. 2, 3 and 19. Such shank control means 238 primarily serves the purpose of limiting undesired accumulation of ring shanks 54 on each of the dual track members 246. Therefore, dual track members 246 will not have an excessive amount of ring shanks 54 accumulated thereon. This arrangement tends to avoid having the shanks become subsequently dislodged or otherwise improperly interfere with desired feeding. Moreover, there is less of a likelihood that the assembling apparatus 50 would become cluttered with unused ring shanks 54. It will, therefore, be appreciated that shank control means 238 provides for a more efficient utilization of each of the individual ring shanks 54.

In the present invention shank control means 238 basically comprises a pair of sensing means 250 and arresting means 252. Each sensing means 250 is associated with respective ones of the track members 246. Respective ones of the arresting means 252 is operatively connected to each of the sensing means 250 for purposes of preventing the dispensing of ring shanks 54 from the exit ramps 244 to individual track members 246 whenever the track members have a sufficient quantity thereon.

In the illustrated embodiment, sensing means 250 is defined by a conventional type of fluidic switch device of known construction and operation. Therefore, a detailed description as to its construction and operation is not believed necessary for a complete understanding of this invention. However, to better understand the operation of sensing means 250 in the context of this embodiment, only those portions thereof necessary for such understanding will be discussed. Inasmuch as both sensing means 250 are associated with individual track members 246 and are similar in construction and fundamental operation, only one will be described.

Sensing means 250 includes emitting and sensing nozzles 254 and 256, respectively, supply and return lines 258 and 260, respectively, and upright support posts 262. Particularly referring to FIG. 19, the emitting nozzles 254 and sensing nozzles 256 are situated on opposite sides of each track member 246 and are respectively supported by posts 262. Posts 262 may be mechanically connected to the apparatus supporting means 58 in any appropriate fashion. The emitting nozzle 254 serves to direct a continuous stream of pressurized fluid to sensing nozzle 256 across track members 246, and correspondingly in the path of movement of ring shanks 54. Fluid supply line 258 is suitably fluidically connected to emitting nozzle 254 for continuously supplying a stream of fluid, preferably air, under pressure. Supply line 258 is fluidically connected to any appropriate and conventional control device and source of fluid (not shown).

The sensing nozzle 256 is supported by and protrudes from another one of upright posts 262. Sensing nozzle 256 is connected to the fluid return line 260, and basically functions to sense the presence or absence of the continuous stream of pressurized air which is emitted from emitting nozzle 254. Return line 260 enables the sensed continuous stream of air to return to the control device (not shown).

In operation whenever the number of ring shanks 54 accumulates on track member 246 such that they block the path of the pressurized air stream from reaching the sensing nozzle 256 then, of course, the sensing nozzle 256 will no longer sense such stream. In known fashion, the control device of this conventional type fluidic sensing means 250 is operable to actuate the arresting means 252 for purposes presently mentioned. Mention, of course, should be made that once the path of pressurized fluid emanates from emitting nozzle 254 and is free to resume its normal uninterrupted path to sensing nozzle 256 whereby sensing nozzle 256 senses such stream, arresting means 252, in a known manner, is deactivated. The arresting means 252 used in conjunction with sensing means 250 is generally well-known in this particular field. As depicted in FIG. 19, arresting means 252, includes a pair of discharge nozzles 264 which downwardly extend from respective nozzle housings 266. Each one of the discharge nozzles 264 is situated over one end 245 of corresponding exit ramp 244. Each nozzle housing 266 is supported by and fastened to a stationary cross-piece member 268 which is generally indicated in phantom lines. Cross-piece 268 is appropriately mechanically attached, in any suitable fashion, to apparatus supporting means 58 so as to maintain discharge nozzles 264 in their indicated positions above ramp ends. Delivery tubes 270 are in fluid communication with the discharge nozzles 264 and serve to deliver a continuous stream of pressurized air from a source of pressurized air or the like is well-known but not shown. Accordingly, in a well-known manner pressurized air is discharged from discharge nozzles 264 in response to actuation thereof by the sensing means 250. Such actuation results, as previously indicated, whenever ring shanks 54 block the flow of air from the emitting nozzles 254 to the sensing nozzles 256, such as shown in FIG. 19. The stream of air discharged from nozzles 264 is directed at the exit ramps 244. It is sufficient in magnitude to effectively prevent further discharge of ring shanks 54 from exit ramps 244.

It will also be understood that resumption of the shank dispensing from the ramps 244 occurs whenever the arresting means 252 is deactuated. Deactuation results, in a conventional manner, whenever sensing nozzles 256 are once again able to sense the air stream emitted from nozzles 254. It will, of course, be evident that the foregoing resumption will occur whenever the ring shanks 54 no longer obstruct the path of discharged air normally flowing between emitting and sensing nozzles 254 and 256, respectively. Moreover, it should also be mentioned that the normal passage of ring shanks 54 between emitting and sensing nozzles 254 and 256, respectively, will not be for a time sufficient to deactuate arresting means 252.

Referring to FIGS. 2, 3, 6, 7, 9, 13 and 14 there is best depicted the shank lifting means 236. Such lifting means 236 is primarily arranged to raise selective ones of the ring shanks 54 from corresponding tracks 246 so as they may be grasped and lifted by shank carriage means 226, in a manner to be described. Shank lifting means 236 includes housing means 272, pusher means 276 and pusher actuating means 278.

Housing means 272 includes slide mounting bracket 279 and dovetail guide means 280. As noted in FIGS. 13 and 14 mounting bracket 279 has one horizontal leg 282 affixed to the top side of mounting supporting table 78 by fastening bolts and pins or the like, and upright leg 284 in a manner to be described, cooperates with dovetail guide means 280.

Specifically, referring to the guide means 280, it is essentially comprised of a pair of outer guide housing members 286 and central guide member 288. Outer guides 286 have tapered side walls, as denoted in FIG. 14 and are affixed to upright leg 284 by cap screws or the like. Central guide member 288 has diverging tapered side walls and is also rigidly secured to leg 284 intermediate outer guides 286.

As more clearly shown in FIGS. 9 and 14, the foregoing arrangement defines generally elongated and parallel channels 290 within which pusher means 276 reciprocates in up and down directions. As noted, in FIG. 14 each channel 290 has a gib removably connected with the inwardly tapered sidewalls of the outer guide member 286 by conventional threaded members 294.

In connection with pusher means 276, as shown in FIGS. 6, 9 and 13 it is seen to include a pair of elongated discrete pusher slides 296 having tapered sidewalls 298 which are complementary to and slidably fit within channels 290. A pusher arm 300 laterally protrudes from each pusher slide 296 and has a threaded opening (not shown) which permits it to be fixedly secured to pusher actuating means 278. In a manner to be subsequently made evident through this form of connection, the pusher slides 296 are movable in response to displacement of pusher actuating means 278.

Respective ones of the slides 296 have rectangular cut-outs 302 formed in their uppermost portions which receive ring shank carriage inserts 304. Inserts 304 are secured to pusher slides 296 in any conventional manner, and are formed by a backing plate 306 and a shank pusher member 308. Shank pusher member 308 protrudes forwardly from backing plate 306 and is relatively narrower in width than the backing plate. As depicted, pusher member 308 has a top curved end disposed somewhat below the top of backing plate 306, such as shown in FIGS. 9 and 13.

By this particular structural arrangement, ring shanks 54 are easily supported by the shank pusher member 308 such as shown in FIG. 10. In addition, shank pusher member 308 has a thickness which is adapted to support a single ring shank 54. As a consequence thereof, whenever the pusher member 308 is elevated, it will raise a single ring shank. Accordingly, only a single ring shank 54 will be grasped by a shank carriage means 226. Towards the end of ensuring that a single shank 54 is elevated, the present invention arranges the shank pusher member 308 axially adjacent respective ends of the track members 246 by a distance which only accommodates a single ring shank. Actuating means 278 is envisioned to be selectively actuatable so as to raise and lower pusher slides 296 between operative and inoperative positions. In this manner the respective ring shanks 54 can be lifted. In the inoperative position, pusher slides 296 are in their lowermost position, such as indicated more clearly in FIG. 13. In this particular position, the shank pusher members 308 are situated so that their tops are disposed in such a manner that individual ring shanks 54 will be able to come to rest thereon after travelling off the ends of the track members 246. On the other hand, whenever the pusher slides 296 are in the operative position, such as shown by the phantom lines in FIGS. 9, 10 and 13, ring shanks 54 are lifted so as to be easily grasped by ring shank carriage means 226, in a fashion to be afterwards made clear.

By virtue of backing plate 306 and shank pusher member 308 being so spaced from the end of track members 246 the movement of the ring shanks 54 will be arrested since the shanks engage the shank pusher member 308 and the backing plate 306.

In regard to pusher actuating means 278, it is defined by energizable motor means 310, and motor mounting means 312. Motor means 310 includes a pair of suitable double-acting fluid motors of the category previously described having a vertically positionable actuating rod 316 and fluid supply/exhaust lines 318. Actuating rod 316 is threadedly affixed to pusher arm 300 and reciprocally extends through mounting support table 78. By this particular arrangement, pusher slides 296 are correspondingly movable in unison with vertical displacement of actuating rods 316 between their operative and inoperative positions. Fluid lines 318, of course, are connected to control means 950 which include a suitable source (not shown) of pressurized fluid. Fluid motors 314 are appropriately energized and deenergized in response to selective actuation and deactuation by valve control means 950. Thus, individual fluid motors 314 are operated by valve control means. Operation of valve control means 950 is dependent on actuation by monitoring means 900. In particular, if either or both the ring probes 202 indicate the presence, absence or misalignment of a ring setting 56, monitoring means 900 will serve to keep track of the particular type of signal generated by the probe means 202. Should, for instance, a ring setting 56 be properly mounted in any one or both of the pair of nest members 106, monitoring means 900, in conventional fashion, will enable such signal to operate the fluid motor 314 corresponding to the probe 202 whenever the turret wheel 92 advances the nest members 106 to the ring shank placing station C. Upon energization of fluid motor 314 pusher slides 296 will rise. Consequently, ring shanks 54 or pusher member 308 will conjointly be vertically displaced. On the other hand, for example, should probe means 202 indicate, through a conventional type signal, the absence or misalignment of a particular ring setting 56, monitoring means 900 will not actuate the corresponding fluid motor 314 associated with the probe which indicates the absence or misalignment of ring setting 56. Thus, whenever the turret wheel 92 advances the nest members 106 from the ring setting testing station B to the ring shank placing station C that particular fluid motor associated with the bad nest will not be operated.

Although the preceding description of motor means 310 is directed to a fluid motor 314, it is certainly within the spirit and scope of this invention that other types of selectively energizable motors, such as solenoid motors, can be used, provided they function in an equivalent fashion.

With reference to the motor mounting means 312, it will be observed that such is depicted as essentially including mounting plate 320 and a pair of spacer members 322. Mounting plate 320 is secured beneath the mounting support surface 78 by a pair of threaded bolts or the like. Such plate 320 has a pair of central openings 324 which enable detachable cooperation with the fluid motors 314. Consequently, the fluid motors can be held in a stationary position. Spacer members 322 are interposed between the mounting plate 320 and underneath surface of mounting support table 78. By virtue of the thickness of spacer members 322, the magnitude of displacement of pusher slides 296 is accurately controlled. Thus, the correct height of ring shank 54 for grasping by the shank carriage means 226 can be readily accomplished.

Figure 8:
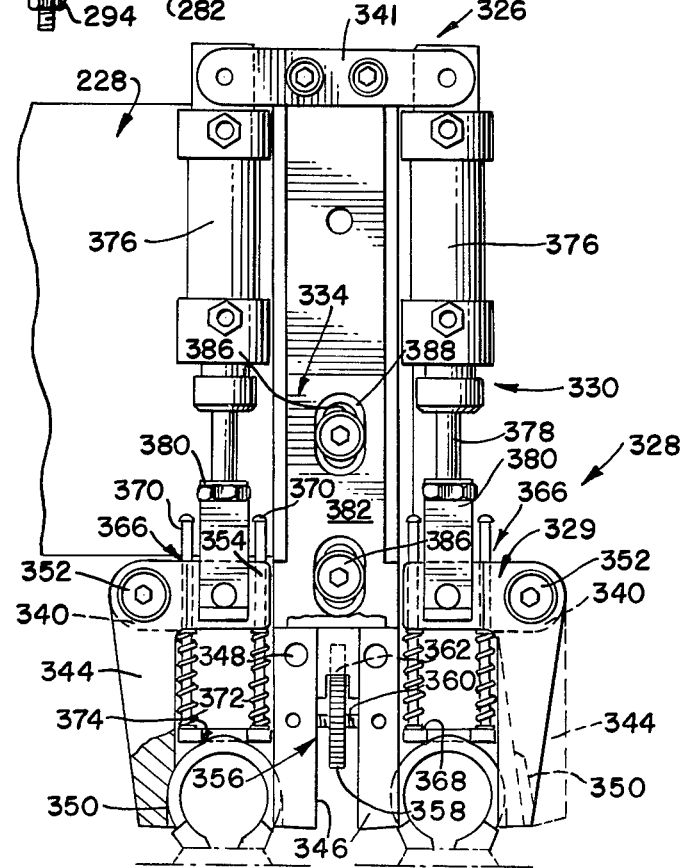
FIG. 8 is a fragmentary front elevational view taken substantially along the line 8—8 appearing in FIG. 6 looking in the direction of the arrows and illustrating in somewhat greater detail the arrangement of components which form a portion of the ring shank placing apparatus.

In connection with shank carriage means 226 reference is made to FIGS. 6 and 8. Essentially shank carriage means 226 serves to selectively grasp individual ring shanks 54 from shank pusher slides 296, at a grasping station GG, such as shown by the solid lines in FIG. 6, and carry them to a depositing station DD depicted by the phantom lines in FIG. 6. At depositing station DD, shank carriage means 226 deposits the shanks onto corresponding ring settings 56 which are appropriately held by the nest members 106. In a manner to be presently set forth in the succeeding description of the present invention, shank carriage means 226 operatively cooperates with a conventional type of translating apparatus 228 for advancing the shank carriage means 226 between the grasping and depositing position.

With continued reference to FIGS. 6 and 8 shank carriage means 226, includes base means 326, grasping means 328 having a pair of jaw means 329, jaw actuating means 330, stripper means 366 and camming means 334.

Base means 326 includes a generally rectangular support base plate 336 which is fixedly attached, in a suitable manner, as by threaded fasteners or the like, to a portion of translating means 228. Thus, base plate 336 moves in unison with the translating means 228 through a particular predetermined path of movement defined by the latter. Such path of movement will be hereinafter described in more detail and can be shown by the arrows AA in FIG. 6. Also, base means 326 includes mounting block 337 secured to the front end thereof by cap screws 338 or the like. Extending from the lower end of block 337 are a pair of lateral pivot support arms 340 and connected to the upper end a cross-piece 341 with bifurcated ends.

Regarding jaw means 329 of the illustrated embodiment each is contemplated to be operatively associated with respective ones of pusher slides 296 at the grasping station GG and a corresponding nest member 106 at the depositing station DD. Further, each jaw means 329 is identical in construction and operation. Consequently, only one will be described in detail. The jaw means 329 has a pair of first and second relatively pivotal members 344 and 346. Jaw member 346 is actuated for pivotal movement toward and away from jaw member 344. Jaw member 344 is generally elongated and is pivotally connected to mounting block 337 by pivot pin 348 as denoted in FIG. 8. It should be pointed out that a portion of camming means 334 has been removed for purposes of more clearly illustrating the foregoing connection. Whenever jaw member 346 is actuated for pivotal movement toward first jaw member 344, it moves to a grasping position. This is depicted by the solid lines in FIG. 8. Whenever jaw member 346 is moved away from first jaw member 344, it moves to a releasing position, as indicated by phantom lines in FIG. 8. Arcuate cut-outs 350 are preferably formed at the lower extremities of both jaws 344 and 346. Cut-outs 350 are shaped to generally conform to the outer configurations of the ring shanks 54. Accordingly, the shanks can be relatively tightly grasped, retained and deposited at appropriate preselected occasions. The jaw member 346 is pivotally connected as at 352 to the outer end of the lateral support arms 340, and has a horizontal section of reduced segment 354. Whenever jaw member 346 is in the grasping position, ring shank 54 on pusher slides 296 is firmly grasped and retained thereby for subsequent carriage to nest member 106. Conversely, whenever jaw member 346 is in the releasing position, a ring shank 54 may be appropriately released. This latter action, normally occurs whenever the jaw means 329 deposits the ring shank 54 onto the appropriate ring setting 56 held in nest 106.

Shank carriage means 226 may also include shank adjusting means 356 which in the present embodiment is defined by a center wheel type adjustment, such as found on contemporary drafting compasses. Adjusting means 356 includes a rotatable center-wheel 358 having a serrated peripheral surface affixed to rotatable shaft 360 having appropriately threaded ends which are appropriately internally threadedly fastened to respective ones of the jaw members 344 and 346. Adjusting means 356 also includes a well known form of spring biased detent device 362 which functions to releasably retain center-wheel 358 in any particular position. By virtue of the foregoing, adjusting means 356, depending on the direction of rotation of rotatable adjustment center-wheel 358 and shaft 360, will appropriately conjointly move jaws 344 towards or away from the opposing jaw members 346. As a consequence thereof, the distance between cut-outs 350 is correspondingly varied. It will, of course, be appreciated that through the foregoing adjustment means 356, ring shanks 54 of various sizes can easily be accommodated. Accordingly, the ring assembling apparatus 50 is much more versatile in operation. The spring-biased detent 362 serves to frictionally cooperate with the center-wheel 358 to releasably hold the latter in place. Hence, the spring-biased detent 362 secures the adjustment center-wheel 358 in any one of a variety of positions during normal operation. It should be realized that manual rotation of wheel 358 will be sufficient to properly overcome the biasing effect of spring-biased detent device 362.

Particularly referring to the stripper means 366, it will be noted that it is associated with respective ones of the jaw means 329. Each stripper means 366 includes stripper bar 368, reciprocal stripper rods 370 and coil springs 372. Basically, the stripper means 366 serves to normally contact and downwardly bias the ring shanks 54 so as to ensure that such shanks remain engaged with the ring settings 56, whenever the second pivotal arm 346 is located in the releasing position, and the jaw members 344 and 346 are being raised in response to the action of the translating means 228.

As concerns stripper bar 368 it has a generally flat and U-shaped configuration which is formed with a central generally rectangular notch 374. One end of each rod 370 is appropriately attached to opposing ends of stripper bar 368. The opposite ends of rods 370 slidably protrude through suitable openings in the horizontal portion 354 of jaw 346. The coil springs 372 surround rods 370 and are interposed between horizontal portion 354 and the stripper bar 368. Coil springs 372 normally yieldingly urge the stripper bar 368 downwardly. Whenever jaw means 329 is actuated to lift individual ring shanks 54 from push slide 296, stripper bar 368 will tend to move upwardly, while jaw members 344 and 346 move to the grasping position. Alternately, whenever the ring shanks 54 are to be deposited jaw members 344 and 346 move to their releasing position and stripper bar 368, under the bias of the coil springs 372, moves downwardly so as to urge the shanks downwardly. The biased stripper bar 368 serves to also overcome the frictional forces created by the jaw members 344 and 346 on shanks 54. Accordingly any tendency for the shanks 54 to be lifted with such jaw members is substantially eliminated.

As previously noted, stripper bar 368 is formed with notch 374. Such notch 374 is effective to permit shank holder means 90 to move from its inclined position to its generally horizontal or holding position whenever the shanks 54 are being deposited on the ring settings at station C. The notch 374 permits pivotal arms 110 with shank engaging member 134 to move downwardly so that such members can engage the top portion of the shanks 54 without contacting the stripper bar 368.

Now referring to the jaw actuating means 330, such may be comprised of conventional double-acting fluidic motors 376 of the type previously described having a piston rod 378 fixed to a clevis member 380. Clevis member 380 is secured to reduced arm segment 354 by suitable means. The fluid motors 376 are connected to the bifurcated ends of cross-piece 341. Fluid motors 376 are actuated in response to a command signal from monitoring means 900 which, in turn, operates the control 950. Each of the fluid motors 376 is appropriately interconnected to control means 950 such that the motors will be selectively energized and deenergized. Depending upon whether or not the corresponding ring nest 106 has a suitably aligned ring setting 56 therein, the appropriate fluid motor 376 will or will not be energized. As previously mentioned, the probe means 202 is effective to provide such an indication. Also, actuation of the fluid motors 376 will be timed to commence after the turret wheel 92 has incrementally advanced the next tray 96 to its next successive position. At this particular time, the fluid motor 376 is energized to move piston rod 378 downwardly from its normal upward position. As a result of such downward displacement, the jaw member 346 will pivot about a pivot pin 352. Accordingly, jaw member 346 will swing generally outwardly and stripper bar 368 will act to retain ring shank 54 in the ring setting 56, such as depicted in FIG. 8. Whenever piston rod 378 rises in response to actuation of fluid motor 376 the jaw member 346 is pivotally moved inwardly towards jaw member 344. Accordingly, jaw means 329 can grasp an individual ring shank 54 between cutouts 350.

As previously indicated, shank carriage means 226 also includes camming means 334. In this embodiment, camming means 334 is defined by an adjustably movable camming block member 382 having at the lower end thereof a generally inclined camming surface 384, such as clearly shown in FIGS. 6, 11 and 12. Camming block 382 is suitably attached to the base member 336 by cap screws 386 which extend through elongated slots 388 in camming blocks 382. By virtue of this particular arrangement the camming surface 384 may be appropriately elevated or lowered. Inclined surface 384 contacts and downwardly pivots camming rod 138 which is connected between arms 132, as perhaps more clearly depicted in FIGS. 11 and 12. The downward displacement of camming surface 384 is in response to the downward movement imparted thereto by the translating means 228. Whenever camming surface 384 contacts camming rod 138 it will be understood that such is sufficient to overcome the bias afforded by coil springs 146. Accordingly, pivot arms 132 are simultaneoulsy pivoted from their inclined position, as shown in FIG. 11, to their horizontal position as illustrated in FIG. 12.

As clearly shown in FIGS. 6 and 28, the arcuate recess 136 in shank engaging member 134 has a configuration which snugly engages the top portion of shank 54. As a consequence thereof, the shanks 54 are firmly held with respect to their corresponding ring setting 56. As earlier indicated, the notches 374 on respective stripper bars 368 permit the shank engaging members 134 to contact the shanks 54 without otherwise interfering with the stripper bars 368. This is especially important since the shank carriage means 226 can be raised without obstruction.

At the conclusion of such camming action, the fluid motors 376 are again actuated to lower piston rods 378. In so doing, the jaw members 346 pivot outwardly to their releasing position. Conjointly with the foregoing, the translating means 228 effects a raising of jaw means 329 as shown in FIG. 10. As this occurs stripper bars 368, under the biasing force of coil springs 372, serve to maintain shanks 54 in their upright position. As mentioned in this manner, the stripper bars 368 overcome the tendency of the jaw members 344 and 346 to lift the shanks.

Figure 15:
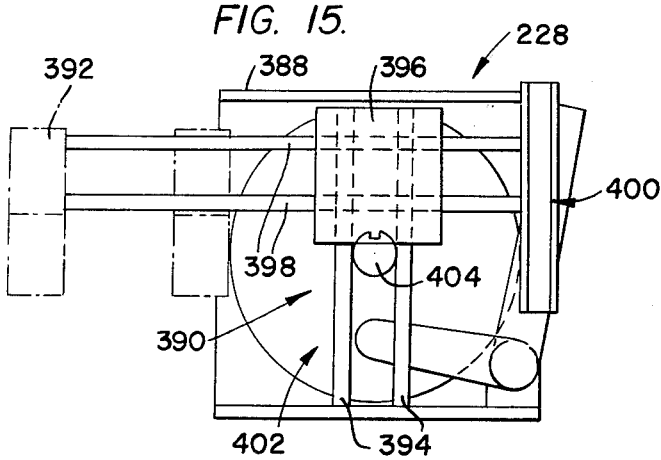
FIG. 15 is a diagrammatic view illustrating certain of the essential components of a conventional type of mechanical translating apparatus.
Figure 16:
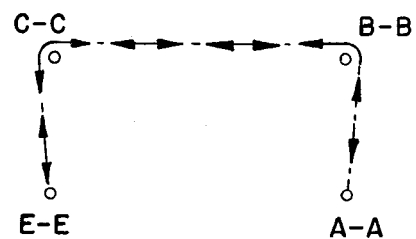
FIG. 16 is a diagrammatic view illustrating the general path of movement which the mechanical translating apparatus follows.

With reference to FIGS. 6 and 16 taken in conjunction with FIGS. 1 to 3 and 15, there is best shown in schematic form translating apparatus 228 of this invention. Briefly, translating apparatus 228, as earlier mentioned, is effective to selectively transport the ring shank carriage means 226 to and fro between the grasping station GG and depositing station DD. The translating apparatus 228, as noted, may be any well-known and conventional type of pick and place unit, as for example, one manufactured by and commercially available from the Stelron Mfg. Co. of Saddlebrook, New Jersey. Since the pick and place unit is relatively well-known and does not itself form an aspect of this invention, only that structure and function necessary for an understanding of its operation in context of this embodiment will be presently described. It should be initially pointed out however, that the type of translating movement to be later described may be realized by alternative devices without departing from the spirit and scope of this invention.

Specifically referring to FIG. 15 translating apparatus 228 includes housing 389, a translating driving mechanism broadly referred to by reference numeral 390, and translating head 392. It should be pointed out that translating head 392 (FIG. 6) is conventionally connected to the shank carriage means 226 by the cap screws 338 so that the latter moves in unison therewith. Concerning housing 389 it is appropriately fastened to support table 78. In connection with translating mechanism 390 it basically is comprised of a pair of vertically positioned and generally parallel bearing slides 394 secured at opposite ends to the housing 389. A cam driven carriage member 396 is vertically positionable with respect to the vertical slides 394. Also included in mechanism 390 is a pair of generally elongated and parallel horizontal bearing slides 398 which are reciprocally driven relative to carriage member 396. At one end slides 398 are connected to and driven by cam driven arm 400. The opposite ends of slides 398 are rigidly attached to translating head 392. Consequently, translating head 392 is movable in unison with cam driving arm 400.

In this embodiment, translating mechanism 390 has camming member 402 which is continuously rotated by drive shaft 404. The drive shaft 404 is rotated by drive pulley 166 and belt 168 of advancing means 60.

Such arm 400 is effective to have the head 392 generally longitudinally reciprocate in a horizontal plane between the innermost position B—B to the outermost position C—C. Cam driven carriage member 396 is effective to selectively raise and lower the head 392 at both the noted innermost and outermost longitudinal positions, B—B and C—C, respectively. At position A—A in FIGS. 15 and 16 the translating head 392 is at the rearward and lowermost position. Mention should be made that position A—A of head 392 generally corresponds to the grasping station for shank carriage means 226 connected thereto. Accordingly, the shank carriage means 226 can be operated so as to grasp the ring shanks 54. Particularly referring to FIGS. 15 and 16, it will be noted that at position E—E the translating head 392 is in its outer and lowermost position. Such generally corresponds to position D—D in FIG. 6 for shank carriage means 226. In this lowermost position shank carriage means is operable to deposit the ring shanks 54 onto the appropriate ring settings 56, as previously described.

In a conventional manner, both cam carriage member 396 and cam arm 400 are suitably driven to advance head 392 from position A—A to position B—B, C—C and D—D, back again in the reverse direction to A—A. Of course, it will be appreciated that the length of strokes of translating head 392, as well as timing sequence of such movements are appropriately selected in accordance with known techniques. For instance, translating head 392 whenever in position E—E should have the shank carriage means 226 situated over the nests 106 whenever each of the pair of successive pairs of nests are located at the ring placing station C.

Also, it is apparent that the head 392 may be in position A—A so that the shank carriage means 226 connected thereto is at the grasping station G—G. It will, of course, be understood that the turret wheel 92 will be advanced in such a manner that consecutive pairs of nests 106 remain at the shank placing station for a period of time which enables such placement. The period of time which the head 392 dwells in any one particular position is determined by the cam member 402 and is set in a conventional fashion so as to achieve the desired operations. The proper displacements of head 392 to suit a particular application of the present embodiment may be easily established in a known manner.

Now turning to FIGS. 1 to 3, 6 and 19, flux applying means 230 is perhaps best illustrated. Such flux applying means 230 is suitably mounted on table 78 and is stationed adjacent the ends of track members 246 so as to apply a flux compound 405 to the open ends of the ring shank, whenever the shanks are displaced from position B—B to C—C. The flux 405, of course, serves to facilitate the bonding between the ring shanks 54 and ring settings 56. Ordinarily, the flux material 405 will be used whenever two dissimilar materials are to be joined together. The type of flux material used in the present invention preferably, should be of the type which facilitates spot welding. An example of such a flux is "Copper-Nu" manufactured by and commercially available from the Kester Solder Company, Newark, New Jersey.

The present invention, however, envisions that flux applying means 230 need not be utilized should the separate component materials which are bonded together have no need for flux material to promote the bonding.

Figure 18:
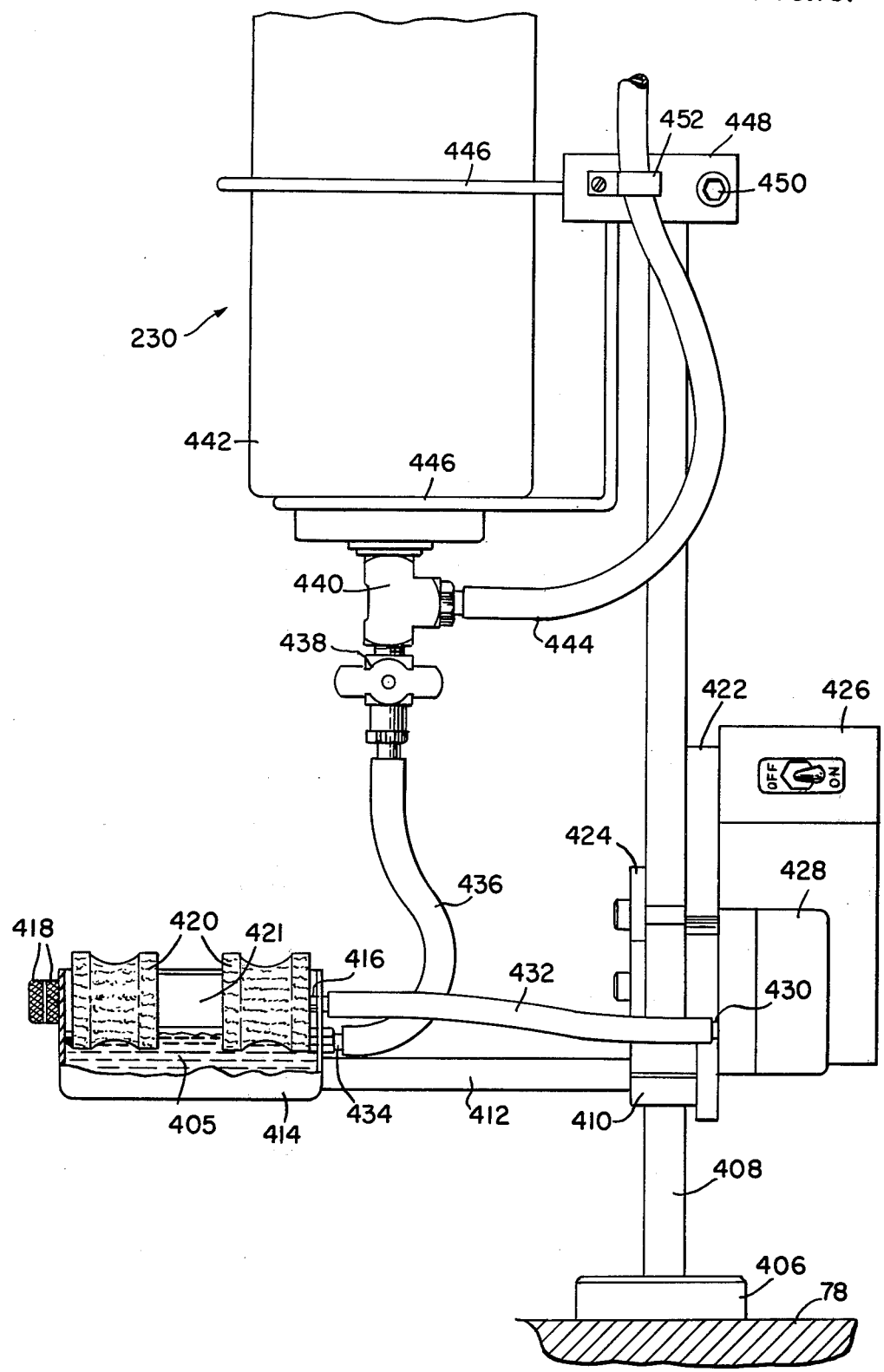
FIG. 18 is a side elevational view illustrating one embodiment of a flux applying device which may be used in conjunction with the ring assembling apparatus for applying flux to the open ends of the ring shanks.

With continued reference to FIG. 18, it will be seen that the flux applying means 230 includes a support probe base 406 suitably secured to support table 78. Upwardly extending from support probe base 406 is an elongated probe support tube 408. A suitable clamp 410 is secured to tube 408 and has connected thereto an elongated support arm 412 which has attached to its end a flux pan 414 for housing the flux 405. Clamp 410 permits selective elevational of flux pan 414 with respect to the horizontal path traveled by the ring shanks 54 as the shanks are carried by the shank carriage means 224 from the grasping station G—G to depositing station D—D. (See FIG. 6) An applicator shaft 416 has opposite ends which extend through opposite ends of the flux pan 414. One end of the applicator shaft 416 is secured to flux pan 414 as by lock nuts 418 or the like. The opposite end of the applicator shaft 416 extends through flux pan 414 and is driven, in a manner to be presently mentioned. Rotatably secured shaft 416 is a pair of applicator sponges generally designated by reference numeral 420. Sponges 420 or some other suitable type of fluid applicator device is rotated by shaft 416. A spacer 421 serves to keep the sponges 420 separated. The applicator sponges 420 are arranged so that the ring shanks 54 contact the latter during the path of travel from the grasping station G—G to the deposition station D—D. A mounting plate 422 is fastened to support tube 408 in a conventional fashion by a known type of clamp device 424. Attached to mounting plate 422 is conventional control switch unit 426, and reversible electric motor 428. The control switch unit 426 enables selective actuation and deactuation of reversible motor 428. Outwardly extending from the motor 428 is a rotatable drive pin 430. The pin 430 may be securely connected to the shaft 416 by any type of conventional type of driving member 432. In the instant embodiment Tygon tubing comprises the driving member 432. It will, of course, be appreciated that upon operation of motor 428, the drive pin 430 effectively drivingly rotates applicator shaft 416 through driving member 432. Accordingly, the applicator sponges 420 are correspondingly rotated. Flux 405 is supplied to flux pan 414 through a suitable opening (not shown) formed in the side of such pan. A hose barb 434 is connected to and extends from the noted opening in flux pan 414. Attached to hose barb 434 is a flexible liquid supply tube 436. Tubing 436 has its opposite end in fluidic communication with any well-known type of shut-off valve 438. Shut-off valve 438, in turn, is connected to a tee coupling 440, which is conventionally secured in a known manner to flux container 442. The flux container 442, of course, serves to house the flux material 405. The coupling tee 440 also has a flexible tube 444 connected thereto. Such tube 444 is open to the atmosphere.

In regard to the flux container 442, as noted in FIG. 18, it is supported by any suitable type of container support device including arms 446, and container clamp 448. The container clamp 448 is of the type which is selectively vertically positionable on the tube 408 by appropriate adjustment of screw 450. Also attached to the side of clamp 448 is hose clamp 452 which acts to connect tubing 444 thereto.

After having explained the above constructional arrangement of flux applying means 230 of the instant invention, it is believed that the operation thereof is evident. To supplement the foregoing, it will be understood that whenever reversing motor 428 is actuated after operation of switch unit 426, the drive pin 430 correspondingly rotates. As a consequence thereof, applicator shaft 416 drives both sponges 420. As noted in FIG. 18, a portion of each sponge 420 is submerged in the flux 405 so as to absorb the same. As sponges 420 uniformly rotate flux 405, which has been absorbed in the pan, is presented above the pan so that open ends of the shanks 54 can make contact therewith. The reversible type motor 428 enables the sponges 420 to provide a relatively uniform amount of flux applied to the shanks. The shut-off valve 438 can, of course, appropriately adjust the amount of flux material 405 supplied to pan 414. As mentioned, the clamp 410 permits proper vertical positioning of the flux pan 414 so that the sponges 420 will contact the free ends of shanks 54 as the latter travel from the grasping to the depositing stations.

Although the foregoing arrangement of components has been used to apply flux, the spirit and scope of the present invention envisions that other suitable arrangements may be provided so as to apply such flux to the free ends of ring shanks 54. Moreover, while flux applying means 230 has been disclosed adjacent the ends of the track members 246 and shank lifting means 236, the present invention envisions additional flux applying stations so long as the application is performed prior to the bonding or welding which is to be performed. Additionally, while a flux applying means 230 is disclosed for use with the present invention, flux need not be used if the assembly apparatus were joining together materials not requiring flux.

RING SHANK TESTING MEANS

After completion of the ring shank placing operation, the advancing means 60 effectively incrementally advances turret wheel 92 such that each pair of nests 106 is successively advanced to the next corresponding work station. Accordingly, the pair of nests 106 which were situated at the ring placing station C travel to the shank testing station D.

At this particular station, ring shank testing means 66 tests for the presence and correct alignment of a ring shank 54 on its corresponding ring setting 56. The ring shank testing means 66 is essentially constructed and operates in the same manner as the ring setting testing means 62. The only difference is that the shank testing means 66 contacts the ring shanks as opposed to ring settings. Since ring shank testing means 66 is formed with the same components and constructed and assembled in the same fashion as the ring setting testing means 62, a detailed description thereof will be dispensed with.

Figure 5A:
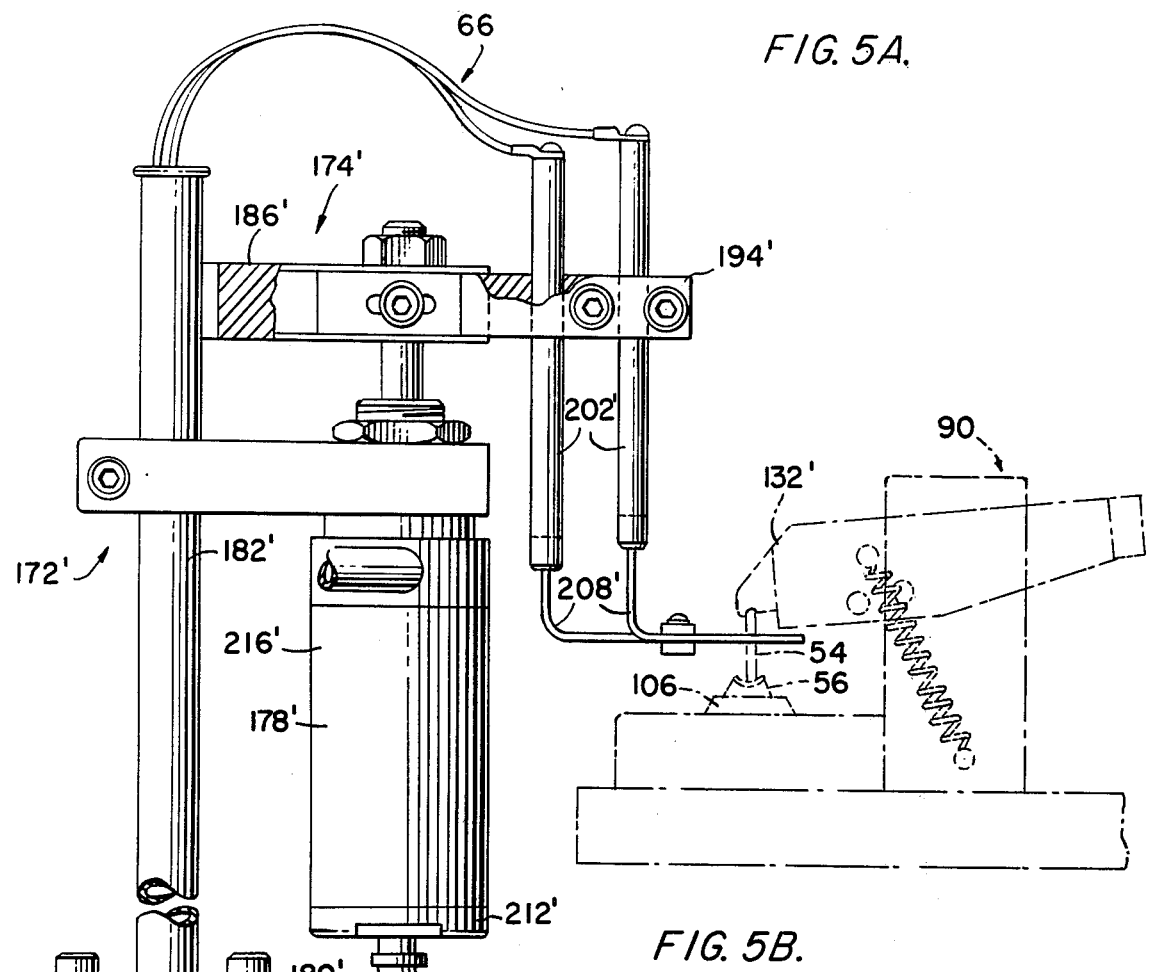
FIG. 5A is a side elevational view illustrating the ring shank testing device.
Figure 5B:
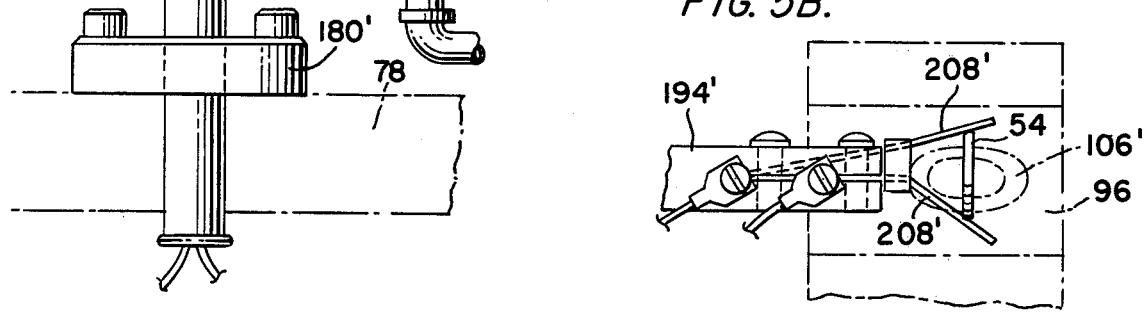
FIG. 5B is an enlarged fragmentary view illustrating a functional cooperation during testing between probes and ring shanks.
Figure 7:
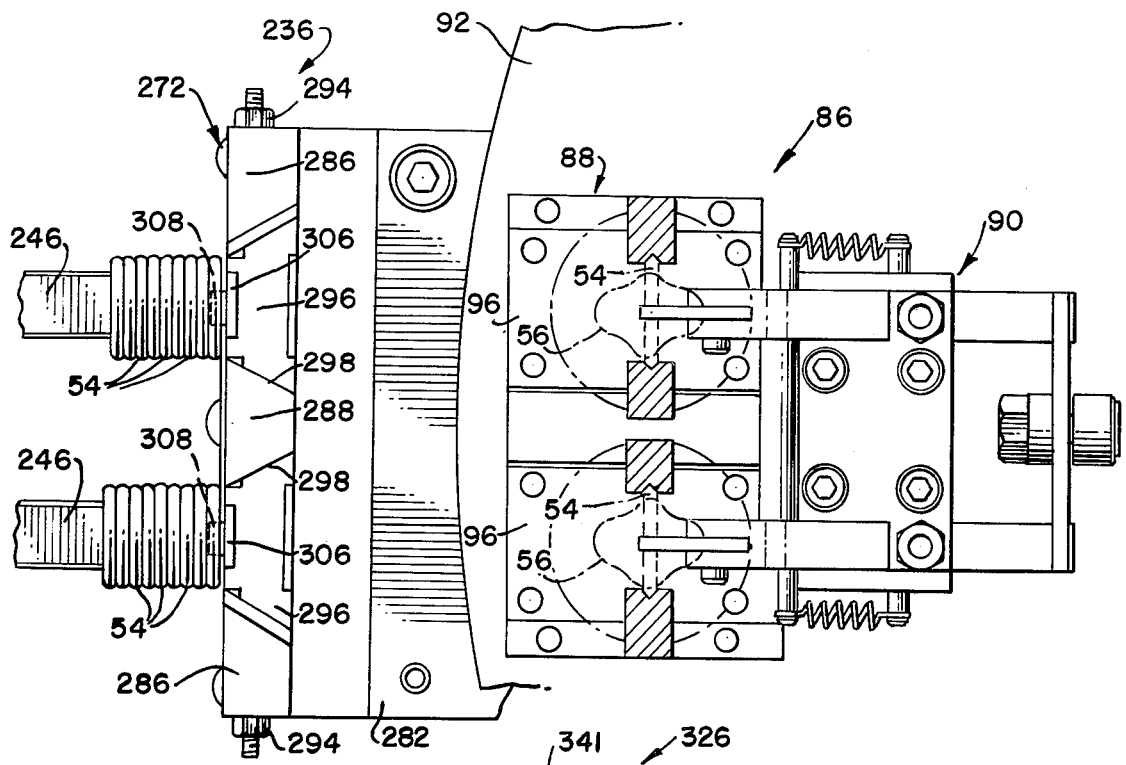
FIG. 7 is a view taken substantially along the line 7—7 appearing in FIG. 6 looking in the direction of the arrows and illustrating the relationship between the ring shank supply and lifting apparatuses and the ring shank holding devices after the ring shanks have been properly deposited onto appropriate ring settings.

In order to understand the operation of shank testing means 66, reference is made to FIGS. 2, 5A and 5B. It will be appreciated that inasmuch as there is similarity between the setting testing means 62 and shank testing means 66, parts of the shank testing means corresponding to the setting testing means 62 have been designated by similar reference numerals with the addition, however, of a prime marking. As shown in FIG. 5A, probe fingers 208' are in their lowered position. If probing units 202 of ring setting testing means 62 indicate that both the ring settings 56 are not present or misaligned then the bad signals which travel through memory 900 will prevent control means 950 from operating motor 206'. Should, however, one or both of the nest members 106 contain a properly aligned setting 56, the fluid motor 206' would be actuated. Accordingly, probe fingers 208' will move downwardly in the event of settings being so positioned for contacting shanks placed thereon. During this contact of the shanks by probe fingers 208', a conventional type of electrical continuity check is performed, whereby both probe fingers 208' are connected in a complete circuit by the presence of ring shank 54. Whenever the presence of a ring shank 54 is determined, a suitable good command signal is transmitted to the memory means 900. Conversely, should the ring shank 54 be absent or significantly misaligned, such as with the absence or misalignment of a setting, then probing unit 202', in a known manner, will serve to transmit to memory means 900 a bad signal indicative of absence or non-alignment of the ring shank. Such information is temporarily stored in the memory means 900 and will be shifted or transmitted to the succeeding station upon the incremental advancement of the turret wheel 92 whereat the bonding means 68 is located.

The signals produced by probing units 202' are transported, in a well-known manner, through the memory means 900, whereby such transport of the signal through the memory means 900 occurs in synchronism with advancement of the nests 106, which may hold the ring shanks and settings, to their next succeeding position.

As will be subsequently more fully described if a signal indicative of a properly aligned shank is transmitted to memory means 900 the aligned shank 54 and setting 56 will be suitably bonded together in a manner to be presently defined. It also is understood, that if a signal indicating a detectively aligned or non-aligned ring shank 54 is transported to memory means 900 then the bonding means 68 will not operate with respect to that particular pair of shank and setting to bond the same together.

As with the setting testing means 62, the shank testing means 66 may within the theory and practice of this invention have a wide variety of particular constructions to achieve a proper test for shank alignment.

At the completion of the ring shank testing procedure, advancing means 60 is effective to incrementally advance the turret wheel 92. By virtue of this movement, not only will the corresponding pair of nests 106 carrying settings and/or setting and shanks travel from the ring shank testing means 66 at station D to bonding means 68 at bonding station E, but, also, the signals generated by probing units 202' will progress through the memory means 900 to suitably actuate or not various components of the bonding means 68 for appropriately bonding or not bonding the settings and shanks. It should also be pointed out that the signals transmitted to the memory means 900 from ring setting testing means 62 are erased by the memory means at this particular station. It is also contemplated that the ring shank testing means 66 need not be selectively actuated in response to bad or good signals from setting testing means. Accordingly, such signals could be erased in a known manner at shank placing station C. It will be further recognized that the ring shank testing means 66 may also provide for a means which enables an operator to determine whether problems are occurring at shank placing station C. Towards that end the probes 202' may be electrically connected to an alarm device to operate such alarm whenever shanks are not present thereby indicating feeding problems at shank placing station C.

BONDING MEANS

Referring to FIGS. 20 to 23, taken along with FIGS. 1 to 3, there is perhaps best illustrated bonding means 68. Bonding means 68 essentially comprises monitoring apparatus 454, and welding mechanism 456. The bonding means 68 is contemplated for selectively spot welding respective ones or the ring shanks 54 to the ring settings 56. Although this particular embodiment of bonding means 68 is designed to spot weld two properly aligned pairs of shanks and settings, it is within the spirit and scope of this invention to have other numbers of shanks and settings spot welded together.

Both the monitoring apparatus 454 and welding mechanism 456 are basically of a known type which may be commercially available from the Joyal Manufacturing Co. of Linden, New Jersey. The monitoring apparatus 454 is basically effective to control the amount and duration of electrical current which is supplied to the welding mechanism 456. Such is done for purposes of regulating the welding temperature or heat applied to the ring shanks 54 to achieve a proper welding action. Towards this end, apparatus 454 is connected to a suitable source of power as, for instance, a transformer (not shown). Apparatus 454 also generates signals representative of good and bad welds. It should be pointed out that the structural components and operations of the monitoring apparatus 454 are known and do not form an aspect of this invention. Therefore, the description to follow will primarily be concerned with only those components needed to gain a proper understanding of the bonding means 68, in its relationship with ring assembling apparatus 50. For instance, the details of its welding circuit do not form an aspect of the present invention but, however, suffice it to say that such welding circuit employs transformers, relays, switches and other circuitry in order to initiate and control electricity flow to the welding mechanism 456 for bonding the ring shanks and settings. Monitoring apparatus 454 is also suitably electrically connected to memory means 900, in a known manner, shown in FIG. 37. By this particular arrangement, good signals introduced into memory means 900 from the ring shank testing means 66 will serve to appropriately actuate monitoring apparatus 454, so as to supply the proper amount of electrical current to those shanks 54 and settings 56 which have been indicated as being properly aligned at the shank testing station D.

Aside from the foregoing, monitoring apparatus 454 conventionally determines the quality of heat applied to the shanks 54. In a known fashion, should the heat applied be insufficient to satisfactorily spot weld a joint, the monitoring means 454 will transfer a signal to memory means 900. Such signal will be representative of a bad welded joint. On the other hand, with an acceptable bond, memory means 900 has transmitted thereto a signal which signifies that a good or satisfactorily bonded joint between shank and setting has occurred. Such good and bad signals, as afterwards described, will cooperate with either good parts removing means 72 or bad parts ejecting means 74.

Although the succeeding description describes one particular form of bonding method and apparatus, other types of bonding methods and appropriate apparatuses are clearly envisioned within the principles of this invention. On the other hand, should the shanks and settings be joined by an adhesive material the necessity for weld monitoring apparatus 454 and welding mechanism 456 would no longer exist.

With continued reference to FIGS. 20 to 23, the welding mechanism 456 for performing the spot welding is better illustrated. As noted, welding mechanism 456 is situated at bonding station E and basically comprises stationary means 458, movable welding means 460, welding actuating means 462, and upper movement limit index means 464. Regarding stationary means 458, it is defined by stationary frame member 466 fastened to supporting table 78. Such frame 466 includes a generally rectangular upstanding support 468 having a protruding platform 470, and abutment ledge 472, as shown in FIG. 21.

As more clearly depicted in FIG. 20, welding actuating means 462 includes double-acting fluid motor 474, of the previously described type which is detachably retained in opening 471 of platform 470 by nut 476. Fluid motor 474 includes piston rod 478 which is vertically reciprocated along its respective axis. Such actuating means 462 also includes supply and exhaust lines 482, and regulators 484 connected at opposite ends of motor 474. Lines 482 are strapped along support 468 and lead from a suitable source of pressurized fluid which is operated by control means 900. Upon energization of the motor 474, piston rod 478 will reciprocate to thereby move welding means 460 between an upward non-welding position and a downward welding position such as illustrated in FIG. 22. As noted, in the welding position movable welding means 460 contacts and applies a sufficient quantity of heat to the ring shanks 54 so as to effectuate a spot welding thereof with their respective settings 56.

Movable welding means 460 comprises carrying means 486, and biased electrode means 488. Carrying means 486 includes rod 490 which at one end is attached to piston rod 478 and at the opposite end is fastened to an upper horizontal switch bracket 492 through bolt arrangement 494. In this manner, switch bracket 492 is conjointly movable with piston rod 478. Upper bracket 492 also has a pair of generally flat lateral arms 496. A pair of bolts 498 surrounded by spacers 499 serve to connect switch bracket 492 to a micro switch mounting block 500. The mounting block 500 is connected by bolts 502 to head support slide 504 (FIG. 21). Head slide 504 is configured to be slidably movable with respect to stationary head support slide base 506. Slide base 506 is suitably connected to base support 468. Also, connected for simultaneous movement with head slide 504 is a pair of electrode support blocks 508. Each electrode block 508 is connected to head slide 504 by well-known type of key 510 one on each side, and adjusting bolts 512. Each bolt 512 extends through laterally elongated slots 514 in a corresponding electrode support block 508. Accordingly, block 508 is laterally adjustable through manipulation of bolts 512, for known purposes. As a consequence of the above arrangement, the electrode blocks 508 are capable of movement in unison with mounting block 500.

As perhaps best shown in FIG. 20 together with FIG. 21, a pair of head support members 516 is suitably connected beneath a corresponding electrode support block 508, as by insulated screws 517. Each support member 516 has a bifurcated forward portion which defines spaced apart end portions 518 each having aligned openings 520. Interposed between each support block 508 and a support member 516 are suitable pieces of electrical insulation 522.

Electrode carrying means 486 of the present invention also include pairs of spaced apart electrode holders 524 which serve to hold individual electrodes 526. It will be noted that a pair of electrode holders 524 are mechanically associated with an electrode support member 516. A more detailed description of the electrodes 526 will be presently mentioned. A support shaft 527 is associated between each holder 524 and support member 516. The shaft 527 has a free end slidably received within an insulated aperture (not shown) formed in support member 516. The foregoing arrangement permits electrode holder 524 to be movable relative to support member 516.

As more clearly shown in FIGS. 20 and 23, there are a pair of inner and outer electrode shafts 528 and 530, respectively, are aligned through openings 520. The lower ends of the shafts 528 and 530 are fixedly attached to respective ones of each of electrode holders 524. In each opening 520 are fit conventional insulated bushings which permit sliding movement of the shafts 528 and 530 for known purposes. Plastic flange bearing and thrust bearings 536 and 538, respectively, serve to provide insulation between the mounting bracket 532 and outer main shaft 528. Inner main shaft 530 has a reduced neck 529 disposed in a vertical alignment with an opening in the mounting bracket 532. The upper end of each outer shaft 530 is coupled to an opening in micro switch mounting bracket 532 by cap screws 534. Accordingly, the outer main shafts 528 are simultaneously movable with the mounting bracket 532.

Compression means 540 are shown in FIGS. 20 and 21 is provided between end portions 518 and associated with each inner and outer main shaft 528 and 530 to provide a generally downward biasing force on each of the electrodes 526. The compression means 540 is defined by washer 542, compression spring 544, and spring retaining nut 546. Spring 544 is disposed between washer 542 and retaining nut 546. Nut 546 is threadably adjustable on each of the shafts 528 and 530.

By reason of the aforementioned constructional relationship, each of the electrodes 526 whenever intimately engaging opposite sides of the shank, as perhaps best denoted in FIG. 22, will permit the pairs of inner and outer shafts 528 and 530 to rise relative to support member 516 but yet provide a bias force on the shanks 54 so as to ensure the firm engagement thereof with electrodes 526. Consequently, a more positive contact is provided which effectively serves to facilitate improved spot welding of the shanks to the settings. Moreover, this yielding type of action acts to prevent the electrodes 526 from being undesirably forced down to such an extent that the shanks 54 may be displaced from proper alignment during the bonding.

Again referring to FIG. 20, it will be seen that welding mechanism 456 further includes elongated actuating rod 548, compression spring 550, insulating sleeve 552, jacuzzi arm 554, bolt 556, jacuzzi pivot rod 558, grounding electrode device 560, pivot member 562, pivot shaft 564, and grounding cable 566 and grounding iron 568. Elongated actuating rod 548 is threadably fastened to micro switch bracket 492. A retaining ring 561 is connected to rod 548 and retains spring 550 interposed between it and bracket 492. The lower end of the rod 548 is connected to insulated sleeve 552 which, in turn, is connected to an end of a known type of pivotal jacuzzi arm 554. The opposite end of jacuzzi arm 554 is pivotally connected through bolt 556 to jacuzzi pivot rod 558 which is suitably mounted to rectangular support frame 468. In this mannr limited pivotal movement of the jacuzzi arm 554 is attained. Such pivotal movement, as will be subsequently described in more detail, is in response to vertical displacement of actuating rod 548. Grounding electrode device 560 rests on jacuzzi arm 554 and includes grounding electrode elements 569.

The grounding electrode elements are movable between non-grounding and grounding positions. In the non-grounding position, both are raised and spaced away from tray members 96, as clearly shown by the full lines in FIG. 21. In the grounding position, as illustrated in dotted lines in FIG. 21, grounding electrode elements 569 contact respective tray members 96 to provide a corresponding electrical ground for electric current flowing from each pair of electrodes 526. Although in FIG. 21 only a single grounding electrode 569 is depicted as contacting a tray member 96, it will be appreciated that both grounding electrode elements 564 (FIG. 20) simultaneously pivot to the grounding position.

Towards the particular end of effecting the noted pivotal movement both grounding electrode elements 569 are fastened for conjoint pivotal movement with grounding electrode device 560. Device is connected to grounding electrode pivot member 562 which, in turn, pivots about pivot shaft 564. Pivot shaft 564 has its opposite ends connected between vertical sections of rectangular frame 468. Grounding cable 566 leads to a suitable electrical ground.

Now referring to the novel and improved electrodes 526 of this particular invention, it will be observed that they are arranged in pairs, such as best shown in FIG. 22. In the welding position each pair cooperates and contacts with shanks 54 in a manner such that opposite sides of respective ones of the shanks contact opposite sides of the electrode 526, as clearly depicted in FIG. 2. Each electrode 526 is a generally rectangular bus bar formed with angled grooves 570. Grooves 570 are disposed at suitable angles relative to the vertical axis of the electrodes 526. Although a variety of angular positions are contemplated, it has been determined that an angle of 60° advantageously forces the shanks 54 into proper and firm engagement with the settings 56. Specifically, each pair of cooperating grooves 570 will, whenever contacting the ring shanks, apply equal, opposite and inwardly directed forces thereto. Through this particular arrangement of electrodes 526, a more positive type of force is provided to maintain the shanks 54 in proper alignment and firm engagement during the spot welding. Accordingly, an improved type of bonding results with the use of electrodes made in accordance with this invention.

Braided central bars 572 are connected to each inner holder 524 and braided side bars 573 to respective ones of the outer holders 524. The respective pairs of central and side bars 572 and 573 supply electricity from monitoring apparatus 454 to electrodes 526 for permitting the latter to perform their intended function.

The electrode holders 524 and electrodes 526 are kept from being excessively hot by reason of cooling medium from a suitable source continuously flowing through passages 574 formed in electrode holders 524. Consequently, electrodes 526 will not overheat during a protracted period of operation.

With continued reference to FIG. 20 together with FIG. 21, welding mechanism 456 further includes upper limit index switch means 464 and lower limit switch means 578. Initially referring to upper limit switch means 464, it includes micro switch 580, and switch actuating bolt 582. The micro switch 580 is connected to lateral plate 584 which, in turn, is affixed to a side of support frame 468. Safety switch 580 is positioned to be contacted and actuated by actuating bolt 582 whenever carrying means 486 returns to its upwards or non-actuating position after a particular welding operation. As shown more clearly in FIG. 20, actuating bolt 582 is threadably fastened to a lateral arm 496, and is vertically adjustable with respect thereto. Lead wire 586 electrically interconnects micro switch 580 with the rotational control device of indexing mechanism 152 which forms a component part of advancing means 60, in a known manner, for indicating that the spot welding operation has been completed and the electrodes 526 suitably raised above the working area to their inoperative position.

Now referring to the lower limit switch means 578, such is defined by a suitably pair of micro switches 588 having lead wires 590 and actuating bolts 592. Each micro switch 588 is fastened to and conjointly movable with micro switch mounting bracket 500, such as clearly shown in FIGS. 20 and 21. Both micro switches 588 are operatively connected through lead wires 590 to monitoring apparatus 454 for purposes of providing signals which serve to actuate the monitoring apparatus 454, in conventional fashion, to energize respective pairs of electrodes 526 for spot welding. It should be understood that each mirco switch 588 operates independently of the other. Actuation of such micro switch 588 occurs whenever actuating bolts 592, which are threaded to opposite ends of micro switch mounting bracket 532, make contact therewith. The aforenoted contact results whenever mounting bracket 500 carrying the micro switches 588 moves relatively downwardly towares micro switch bracket 532. Whenever there is contact the monitoring apparatus 454 will generate a good signal to the memory means 900 indicating that a shank is present. Thusly, as will be explained the bond testing means 70 will be operated to test the strength of the bond in a manner to be described. If there is no switch actuation then a bad signal will be registered in the memory means 900 so that, as will be more fully explained, the bond testing means 70 will not be operated. This embodiment also visualizes that the monitoring apparatus may be adjusted in a manner not forming part of this invention so that it will determine whether the current applied is providing for a good or bad bonded joint. Should a good bond be provided then as will be explained the bond testing means 70 will be operated. Conversely, should monitoring apparatus 454 detect a badly bonded shank and setting then a bad signal will be transmitted to memory means 900 to prevent actuation of the bond testing means 70 and good parts removing means 72. As shown in FIG. 21, bracket 500 has adjustably connected thereto stop bolt 594 which abuttingly contacts with stop ledge 472 to thereby positively limit and regulate downward movement of carrying means 486. Moreover, stop 594 serves to enable height adjustment of electrodes 526 above the tray members 96. Through this adjustable relationship, it will be appreciated that ring shanks 54 of varying heights can be accommodated for by merely varying the spacing of electrode heads 526 with respect to the tray member 96.

After having explained the above constructional arrangement of bonding means 68, it is believed that the operation thereof is self-evident. To supplement a description of the above arrangement, it will be understood that whenever fluid motor 474 is energized by control means 950, piston rod 490 moves downwardly. Conjointly micro switch bracket 500, micro switches 588, support slide 504, support block 508, support members 516, electrode holders 524, electrode heads 526, mounting bracket 532, and actuating bolts 592 also move downwardly. Additionally, actuating rod 548, as previously observed will move downwardly to cause ground electrode elements 569 to contact tray members 96. The downward movement of electrodes 526 stops whenever they firmly engage the ring shanks 54 on opposite sides of the shank 54 as depicted in FIG. 22. The engagement of shanks 54 by electrodes 526 is arranged to occur before stop bolt 594 strikes ledge 472 to provide for a sufficient downward pressure on the shanks.

By reason of grooves 570 the proper position of the shanks 54 is maintained and suitable force applied. During this contacting of shanks 54 with the electrodes 526, electrode holders 524 will move upwardly relative to the head support 516, since they are conjointly movable with ledge 472 and the electrodes 526 seat upon the shanks 54. Additionally, the inner and outer shafts 528 and 530 move upwardly relative to end portions 518. Accordingly, a gap between the tops of these shafts and upper end segment 518 is created for reasons well-known with this apparatus. Since bracket 500 moves relative to the stationary bracket 532, the tops of actuating bolts 592 contact micro switches 588. Correspondingly, signals are generated to apparatus 454 which, in turn, serves to supply the proper current to the electrodes 526 for a preselected time interval necessary to spot weld the shanks to the settings. Should no shanks be located in one or both of the nests 106 the micro switches 588 associated therewith will not be actuated because of the signals supplied to the memory means 900 when the corresponding nests where tested by shank testing means 66. Whenever there is an absence of such shank a bad type signal indicative of such circumstance is transmitted to the memory means for subsequent transmittal to the bond testing means 70 and good parts ejecting means 72, to not operate the same while operating the bad parts ejecting means 74.

After the welding operation fluid motor 474 will be energized to raise carrying means 486 and thereby electrodes 526. Also mounting bracket 500 returns to its upper position whereby actuating bolt 582 engages and actuates micro switch 580. In this fashion micro switch 580 generates a signal which is transmitted by lead 586 to advancing means 60 indicative of the fact that the electrodes 526 are raised to their upper position and no obstructions have been encountered. Accordingly, the indexing mechanism 152 is free to appropriately index turret wheel 92 another incremental turn. Thereafter, the turret wheel 92 is again incrementally rotated by the advancing means 60 to successively advance the trays 96 to the next operative station.

As mentioned, monitoring means 454 is able to indicate whether a particular spot weld is satisfactory or unsatisfactory. Correspondingly, of course, it, therefore, provides suitable signals for the memory means 900 to indicate good or bad welds. Such signals will be subsequently utilized in a manner to be described.

As more particularly noted, in FIGS. 1 to 3 and 28, bonding means 68 further includes tilting means 596. The primary purpose of such tilting means 596 is to move pivot arms 132 from their horizontal position at bonding station E to a generally upward pivoted position, as turret wheel 92 advances to the bond testing station F. In this manner, as will become self-evident, the bonded shanks 54 can have tensile forces applied thereto to ascertain the adequacy of the actual bonding between the shanks and setting. Accordingly, for this to occur there cannot be downward forces on the shanks as applied by the arms 132.

Tilting means 596 may include vertical support arm 597, lateral support arm 598, and inclined tilting plate 599. The vertical support arm 597 is appropriately positionable and connected relative to lateral support arm 598 which is affixed at one end to frame 468. Tilting plate 599 is flat and angularly fixed with respect to arm 598, as in the manner illustrated in FIG. 28. Such plate 599 is positioned to be in the path of movement of camming member 142. It will be appreciated that as the turret wheel 92 rotates to its next successive station, the camming member 142 in the horizontal position will make contact with the plate 599. During the rotational movement tilting plate 594 serves to force the pivot arms 132 upwardly. Thereby, the bias afforded by spring 146 is overcome. The arms 132 whenever in their upward inclined position enable the bonded joint between the shanks 54 and settings 56 to be tested by applying appropriate forces thereto in a manner to be described. The instant invention, of course, envisions that other types of arrangements can be employed for tilting arms 132 upwardly so long as they act to tilt the pivot arms 132 from the horizontal to inclined or upward positions so that the bond testing can be performed.

BOND TESTING MEANS

As more precisely depicted in FIGS. 24 through 27, bond testing means 70 at station F of the present embodiment, is shown to basically include testing support means 600, testing carriage movement means 602, and tensile force applicating means 604. In general, the bond testing means 70 basically serves the purpose of applying upward tensile forces on the ring shank 54 after such shank has been bonded. By virtue of this operation, should the bond be undesirable, the upwardly applied tensile forces to the ring shank 54 will serve to separate one or both of the bonds between shank 54 and its corresponding setting.

In connection with FIGS. 24 and 25, testing support means 600 is seen to be defined by a pair of spaced apart and generally L-shaped longitudinally extending brackets 606, base plate 608, and elongated wedge shaped channel guide members 610. Such brackets 606 are connected to table support member 78 through conventional means. Base plate 608 is fastened across the top of the vertical parts of brackets 606 and guide members 610 are in a spaced apart relationship with respect to each other and connected to base plate 608. As seen clearly in FIG. 25, the guide members 610 define a channel 612 within which carriage movement means 602 is reciprocated between forward and reverse directions. Horizontal crosspiece support 613 extends between and is secured at both ends to the guide members 610.

Particularly referred to the carriage movement means 602, it includes mounting slide block 614, fluid motor 616, of the double-acting type previously noted, having piston rod 618 and limit micro switch means 620 with lead 621. The lead 621 is connected to the indexing mechanism in any suitable manner. The switch 620 when contacted with serve to permit that indexing mechanism 152 to drive the turret wheel 92 at the end of the testing operation. This contact will serve the purpose of indicating that the bond testing means is in the inoperative position. On the other hand, the failure of the switch to be contacted will indicate that the bond testing means has had difficulty in returning to the inoperative position. Accordingly, the switch arrangement is of the type that should there be such problems it will prevent indexing mechanism from rotating the turret wheel. Fluid motor 616 and limit micro switch 620 are stationarily fastened to the support 613. Upon suitable energization of fluid motor 616, the piston rod 618 reciprocates in a to and fro manner to displace slide block 614 between its operative position, as shown by the solid lines thereof in FIG. 24, to the inoperative position as shown by the phantom lines thereof in FIG. 24. The sliding block 614 has a suitable configuration which enables it to be snugly and slidably received within the channel 612.

In regard to the sliding block 614, it is generally elongated with tapering lateral sides, as best shown in FIG. 25. Also as shown in FIG. 25, a wear shim or gib 622 is interposed between one side of guide member 610 and the slidable block 614. The lateral sides frictionally engage and slidably move within the channel 612. Mounted on and supported by sliding block 614 is a pair of forward and rearward upright support members 623 and 624, respectively. Piston rod 618 is affixed at its free end to rearward upright support members 624 so that the latter is conjointly movable between the noted operative and inoperative positions, in response to displacement of the piston rod. The rearward support member 624 contacts and actuates end limit switch means 620 as shown by the phantom lines in FIGS. 24 and 26B whenever carriage movement means 602 is in the inoperative position. The significance of such engagement will be subsequently set forth. To selectively reciprocate the slide block 614, motor 616 is appropriately energized to extend rod 618 leftwardly, as viewed in FIG. 24, so that the tensile force applying means 604 is able to cooperate with a pair of bonded ring shanks 54 and ring settings 56 for purposes of having force applied to the bonded joints. A stop plate 625 is suitably connected to the brackets 606 across the front end thereof and serves to limit the forward movement of the slide block 614.

Specifically referring to force applying means it will be noted that such is comprised of a pair of tensile force actuating means 626, a pair of conventional double-acting fluid motors 628 of the character noted above having suitable fluidic lines 630 connected thereto. Both the fluid motors 628 have their opposite ends suitably secured to and between forward and rearward supports 623 and 624, respectively. It will be appreciated that each tensile actuating means 628 is for testing individual ones of the bonded settings and shanks associated with a particular nest member 106. Also, each tensile actuating motor 628 has a reciprocally moving piston rod 632.

Tensile force applying means 604 further includes defect signal means 634. In this particular embodiment, defect signal means 634 comprises a pair of micro switches 636 each of which is suitably connected to opposite sides of upper arm portion 638 of the forward support 623 and have lead wires 637 extending from each micro switch 636 and are appropriately electrically interconnected with the memory or monitoring means 900. The significance of such interconnection will also be subsequently discussed. Such switches 636 also have plungers 639 located so as to be contacted, in a manner to be hereinafter described.

Referring, in particular, to FIGS. 24, 25, 25A and 26B force applying means 604 further includes jaw means 640 ring probing means 642, ring adjustment means 644 and protective shield 645.

Jaw means 640 of the instant invention is suitably connected to the forward end of slide block 614 and includes a pair of upper and lower relatively movable jaw members 646 and 648, respectively. As clearly shown in FIGS. 24 and 27, both jaw members 646 and 648 are adapted to be inserted within an opening formed by the bonded shank 54 and setting so as to test the bond whenever the slide member 614 is in its operative position. It will be noted that upper jaw member is formed with a raised rib portion 647. Since both jaw means 640 are identical in construction and function in a like manner, only one will be described in detail for simplicity of description.

Each lower jaw 648 is a generally elongated member which extends from body 649. Platform 649 is suitably rigidly fastened to an appropriately configured recess at the forward end of slide block 614 as by pins 650 which cooperate between the slide block 614 and platform 649. As noted, the lower jaw 648 is provided with a curled carriage spring 651 which contacts trays 96 whenever the jaws 646 and 648 are in their forwardmost or operative position. The purpose served by spring 651 is to provide for a shock absorbing means. It should be particularly pointed out that the lower jaw 648 is arranged to slide over setting 56 much in the manner shown in FIGS. 24 and 27. By this particular arrangement, the lower jaw 648 provides a reaction surface for the setting 56 whenever upwardly applied tensile forces are directed to the shank 54 by upper jaw member 646 during the force applying operation.

Upper jaw 646 is suitably pivotally connected at 652 to a segment of platform 649 and is generally defined by an L-shaped structure with horizontal leg 654 and vertical leg 656. Intermediately located on and laterally extending from vertical leg 656 is threaded boss 658, see FIG. 24, which is fastened to piston rod 618. Located at the top of vertical leg 656 is an adjustable stop screw 660 which serves to appropriately contact and actuate the plunger 639 of defect signal means 634 whenever a defect is sensed by the tensile force applicating means 604.

It will be understood that upon actuation of tensile actuating motors 628 piston rod 632 will retract. In this manner upper jaw 646 will pivot generally upwardly such as indicated by the arrow shown in FIG. 24. During this pivotal movement horizontal leg 654 will correspondingly pivot upwardly. Since, as aforementioned, both of the jaw members 646 and 648, whenever the block 614 is in its operative position, are between the shank 54 and setting 56, this type of upward movement will serve to apply a generally upward tensile force on the ring shank 54. Should, for example, one or more of the bonded joints existing between the shank 54 and setting 56 be inadequate, such upward force will be sufficient to cause the shank to separate from the setting. On the other hand, if the rings and settings are properly bonded to the ring shanks, such upward force will not be sufficient to separate the two. Mention, of course, should be made that the force generated will be appropriately selected to ensure that properly bonded shanks and settings are not otherwise damaged and that improperly and partially bonded shanks will be completely or partially separated. It should be understood, of course, that for each ring shank 54 there will be two bonded joints with the setting 56.

In the event that there is a proper bond between a ring shank 54 and corresponding ring setting 56, the stop screw 660 at the top of vertical leg portion 656 will not contact the defective signal means 634, such as indicated by the solid lines in FIG. 24. If one or both of the bonded joints are defective the upper jaw 646 will serve to lift or separate the shanks 54 from the settings 56. The additional pivotal movement of leg portion 656 under the foregoing circumstances will permit the stop screw 660 to contact the plunger 639 of micro switch 636. Consequently, a signal is transmitted to the monitoring means 900 and the monitoring means as will be more fully described, acts to indicate that a particular bonded pair of shanks and settings for a nest 106 is not properly bonded therebetween. Accordingly, the signal will serve to actuate bad parts ejecting means 74 for that particular nest whenever the nest 106 has progressed to bad parts ejecting station H. Also, the foregoing signal is arranged so as to not cause the good parts removing means 72 to be actuated for purposes of removing at least the setting from the nest 106.

In those situations that a ring shank 54 completely separates from the ring setting 56, after the application of the tensile force it will be carried by upper jaw 646, as such jaw is rearwardly advanced in response to rearward linear retraction of slide block 614. During such rearward advancement the separated ring shanks 54 will tend to fall from upper jaw 646. Those ring shanks 54 which do separate and fall may be caught in a receptacle 662 which rests on support table 78 and is located between the turret wheel 92 and L-shaped brackets 606. Although not shown, the present embodiment contemplates that a shank removing device may be connected to protective shield 645 and function to cooperate with upper jaw 646 so as to remove such shanks 54 which are completely separated from the settings 56 after the force applying step.

In connection with protective shield means 645, such is constructed with a forward overhanging portion 663 which extends over a portion of jaws 646 and 648 whenever slide block 614 is in its operative position. Shield 645 is also formed with depending side sections 664 which are fastened to opposite guide members 610. Overhanging portion 663 has a tendency to prevent defectively bonded shanks 54 from uncontrollably being thrown upwardly and away from setting 56 during the testing procedure. Consequently, with the prevention of this uncontrolled upward movement the likelihood of injury to an operator is diminished and the hindering of effective operation of ring assembly 50. In the particular embodiment being disclosed, the protective shield 645 is made of an integrally formed plastic transparent material. Certainly, other suitable types of materials are envisioned within the spirit and scope of this invention.

Figure 27:
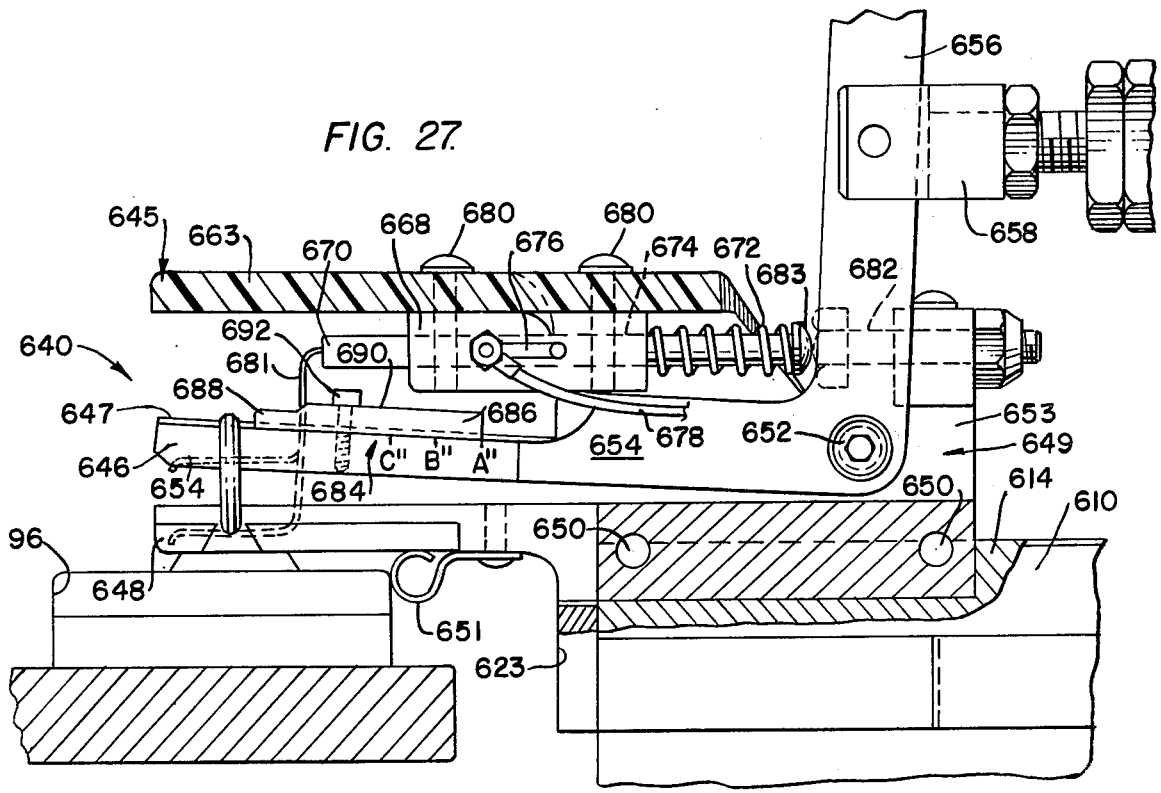
FIG. 27 is a side elevational view, partly in section, taken substantially along section line 27—27 appearing in FIG. 26A looking in the direction of the arrows and illustrating another view of the bond testing apparatus in its operative position, whereat it applies tensile forces to the bonded joint between the ring shanks and ring settings.
Figure 26B:
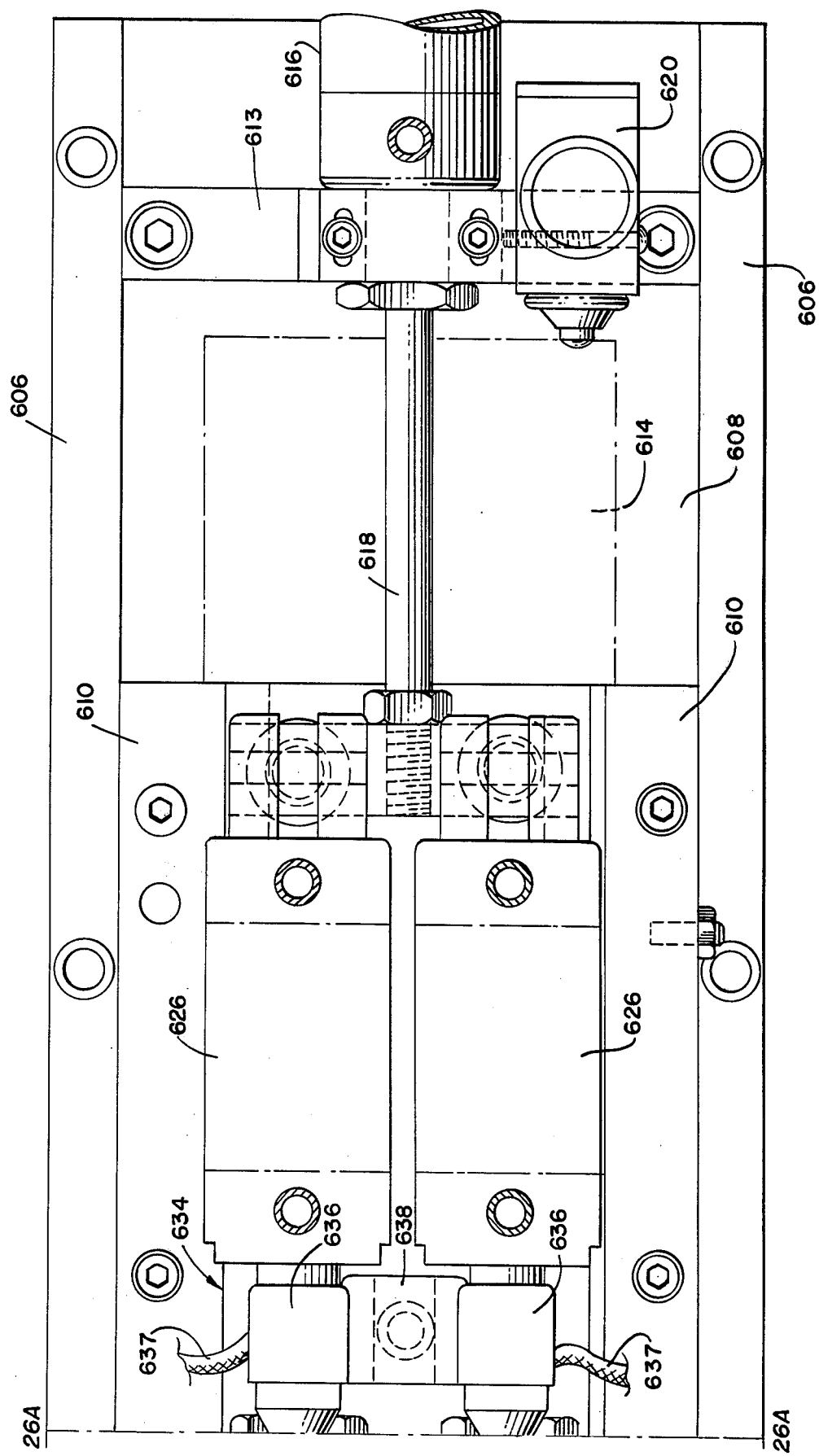

Regarding ring probe means 642, such is shown more clearly in FIGS. 24 and 27 and includes probe housing 668, a pair of conventional electrode probe devices 670, and a corresponding pair of compression springs 672 associated with each probe device. Housing 668 is formed with a pair of separate elongated bores 674 on the sides thereof which receive and permit sliding movement of the electrode probes 670 relative thereto. The housing 668 is connected by bolts 680 to the underneath surface of overhanging portion 663. The lateral sides of the housing 668 are appropriately formed with suitably elongated slots 676. Slots 676 enable passage and reciprocation of lead wires 678, which are electrically connected to probes 670, without interference by the housing 668, as the electrode probes 670, are relatively moved with respect to such housing, in a manner to be subsequently described. Accordingly, the connection of the electrical leads 678 remain unhampered throughout repeated usage of the probes 670. The probe wire 681 of each electrode device 670 is designed to contact a ring setting 56 for purposes presently elaborated upon. The compression springs 672 are interposed between the rear of housing 668 and an enlarged head 683 at one end of electrode probe 670. Springs 672 act to bias the probes 670 rearwardly from housing 668 so that probe wires 681 are out of the normal path of movement of the ring settings 56 on the turret wheel 92.

The platform member 649 includes upright end member 653 which carries two threadedly adjustable bolts 682 suitably fastened thereto. Each bolt 682 is adapted to engage the enlarged heads of the probes 670, whenever platform 649 is in its forward position to forcibly slide the former forwardly. The end result of such engagement is that individual probe wires 681 contact respective ring settings 56. Upon such engagement the ring probe device 670 may transmit a signal to an alarm device not shown for purposes of indicating that a setting is not present. Alternatively, the signals could be transmitted to monitoring means 900 for subsequently forwarding good or bad signals to the good parts removing means 72 and bad parts ejecting means 74. If a good signal is experienced the good parts removing means will be able to be operated to remove a good ring provided the defect signal is also not operated. Should a bad signals be indicated then bad parts ejecting means will be operated to remove if possible the ring shank. The ring probe also serves as a back-up testing device. Instead of having the probes 670 contact the setting they can be arranged to contact the shank. Also, if desired the probes 670 need not be present.

Turning to the operation of this embodiment it will be understood that in response to the noted bad or good signals transmitted from bonding means 68 to monitoring means 900, the control means 950 is appropriately controlled to allow respective ones of the fluid motors 628 to be energized depending upon the presence of a ring shank and an adequate bond being effectuated at bonding station E. The jaw member 646 will pivot upwardly to apply a tensile force on the ring shank 54. As mentioned, the lower jaw 648 holds the setting 56 in the nest 106 during this operation to facilitate application of the tensile forces. It will be understood that should a ring shank not be present at station E the shank bonding means 68 will not detect a ring shank, and, accordingly, a signal will be transmitted to monitoring means 900 such that whenever the particular ring setting has advanced to station G the corresponding fluid actuating motor 628 will not be energized. Similarly, should the monitoring apparatus 454 indicate an inadequate bond for a particular shank and setting the corresponding motor 628 will not be actuated.

The preferred embodiment also embodies ring adjustment means 684 will is slidably positionable on upper jaw 646. The purpose served by ring adjustment means 684 is to enable the testing of ring shanks 54 having varying sizes (e.g., small, medium and large). As a consequence thereof, bond testing means 70 has versatility for testing the bonds of various sized rings.

Ring adjustment means 684 is defined by adjustment slide member 686 which is selectively positionable relative to upper jaw 646. Specifically, slide 686 is movable on rib 647 that is integrally formed on upper jaw 646. Rib 657 prevents uncontrolled lateral dislodgement of adjustment slide member 686, as well as guides the latter in longitudinal movement. Also, slide member 686 is formed with a reduced forward end shoulder portion 688, and an elevated back portion 690. Adjustment set screw 692 extends through elongated opening 694 formed in the top of slide 686 and threadedly cooperates with jaw member 646 such that it can releasably hold adjustment member 686 in position.

As denoted in FIGS. 24 and 27, indicia A", B", C" is spaced apart from each other on upper jaw 646 and serves to properly position slide member 686 in three distinct settings such that various sized ring shanks 54 can be operated. For example, whenever the rearward end of the slide 686 is coincident with indicia marking A", the smaller sized ring shanks can be tested. Indicia marking "B" is used for intermediate sized ring shanks, whereas marking C" is for use in testing larger sized ring shanks. It will be appreciated, of course, that to properly position the slide to any one of the foregoing positions set screw 692 is unfastened. Accordingly, the slide can be appropriately longitudinally displaced relative to upper jaw 646 so that the rearward end thereof is positioned to coincide with the particular indicia marking.

In the particular position of parts illustrated in FIG. 24, the adjustment slide 686 is adapted to fit within and tensile test relatively small ring shanks since reduced shoulder portion 688 is properly positioned beneath a ring shank. Consequently, whenever both jaw members 646 and 648 are suitably positioned therebetween and actuated so that upper jaw pivots, the slide will effectively contact the ring shank 54. In this fashion, it applies the upward force thereon so as to subject the bonded joints between setting and shank to tensile forces for purposes of testing the bonds. Should it be desirable to test shanks having even larger sizes, adjustment slide member 686 can be moved, in the manner indicated above, so that its rearward end is coincident with the indicia gradation C. At this specific position, the elevated portion 690 of the slide member 686 will, whenever upper jaw 646 is upwardly pivoted, contact underneath the ring shank 54 to force the latter upwardly to test for a proper bonding between the ring shank and setting.

As mentioned earlier, if one or both bonds are weak the upper jaw 646 will pivot such that bolt 660 contacts plunger 639 of micro switch 636 to thereby cause a signal to be transmitted to memory means 900 representative of the condition indicating a weak bond. The memory means 900 will transfer such signal in a manner to be described.

Should the bond be satisfactorily tested such condition, in a known manner, will also be registered by memory means 900 for use as afterwards made clear.

At the completion of the foregoing bond testing sequence, the fluid motor will be energized so that piston rod 618 will move the support 624 rearwardly. As a result thereof, the slide block including the platform 649, upon which the jaw means 640 is operatively connected, will rearwardly move to no longer extend between the shank and setting. Whenever in this inoperative or retracted position index micro switch 620 transmits a signal to advancing means 60, permitting the indexing mechanism 152 to enable the turret wheel 92 to successively and sequentially advance the nests 106 having the tensile testing ring settings and shanks to the next successive station. Of course, should index micro switch 620 not be contacted at the end of the bond testing operation the switch 620 will disable indexing mechanism 152 from advancing the turret wheel, since this condition would indicate that a malfunction has occurred with the bond testing means 68.

GOOD PARTS REMOVING MEANS

Particularly referring to the good parts removing means 72 of the present invention, such is perhaps best illustrated in FIGS. 1 and 3 taken in conjunction with FIGS. 29 and 30. As shown, removing means 72 is seen to include a translating means 700 including a mounting block 702 which is continuously movable between forward and reverse positions in a fashion to be presently mentioned. In particular, block 702 moves between a forward pickup position, P—P, indicated by solid line in FIG. 30 to a rearwardly releasing position R—R, represented in dot-dash lines in FIG. 30. Additionally ring removing means 72 includes transporting means 704 which is rigidly connected to said mounting block 702 for conjoint movement therewith. In the embodiment being presently described, the transporting means 704 comprises supporting means 706, grasping means 708 and grasping actuating means 710.

Regarding the noted translating means 700, it further includes pick and place mechanism 712 which is similar to the translating mechanism 390 stationed at the shank placing station C. Translating mechanism 700 is continuously driven from the drive pulley 166 and advancing means 60 and fixed to block 702. It will be appreciated, of course, that the components forming the translating mechanism unit 700 as with mechanism 390, are also made of conventional material and constructed and assembled in a known fashion so as to perform in the same manner. Therefore, a detailed description as to its construction and operation is deemed unnecessary. It will be appreciated therefore, that translating mechanism 700 serves to displace the mounting block 702 associated therewith, in the same fashion as mounting plate 392 is displaced by mechanism 390. Consequently, the mounting block 702 is arranged to basically follow the same pattern of movement of mounting plate 392 as illustrated more clearly in FIGS. 6 and 15. Specifically, mounting block 702 vertically rises from pick-up position P—P whereby good rings are grasped, as denoted in FIG. 30, to a predetermined vertical height above the turret wheel 92 indicated by H—H. Thereafter, translating mechanism 700 will retract mounting block 702 longitudinally rearwardly away from turret wheel 92 until the mounting block 702 is positioned over the conveying means 714 at position I—I. At this juncture, it should be mentioned that a more detailed description of conveying means 714 will be subsequently set forth in the succeeding description. At position I—I the translating mechanism 700, in conventional fashion, causes the mounting block 702 to descend towards conveyor means 714 until it reaches the rearward and lowermost releasing position R—R. Transporting means 704, whenever in the releasing position will be operated so that the good or completed rings 52 carried thereby descend to the conveying means 714.

With continued reference to FIGS. 29 and 30 transporting means 704 is more clearly disclosed. As previously mentioned, transporting means 704 includes supporting means 706. Supporting means 706 is defined by an elongated sliding mounting block 716 that is slidably fastened to the mounting block 702. Such sliding arrangement between mounting block 702 and sliding block 716 may take the form of a conventional dovetail type sliding arrangement which permits guided vertical sliding movement. As viewed the sliding block 716 includes at least two spaced apart generally elongated slots 718 and a cutout 720 located at the lower end thereof so as to cooperate with a portion of grasping means 708. Cap screws 722 cooperate, in a standard fashion, with the slots 718 and threaded openings (not shown) in block 702. The foregoing arrangement serves the purpose of enabling vertical positioning of the sliding block 716 relative to mounting block 702.

Sliding block 716 includes calibrations generally indicated by reference numeral 752. Such calibrations 752 are primarily provided for the specific purpose of enabling the ring removing means 72 to satisfactorily remove good rings having shanks with varying sizes. As best depicted in FIG. 29, these calibrations 752 are formed by a plurality of spaced lines, each of which is identified by reference characters A''', B''' and C'''. By selectively placing selective calibrations 752 adjacent an appropriate fixed point on mounting block 702, an operator can accurately adjust the height of sliding block 716. Hence, the position of the grasping means 708 with respect to the good rings 52 mounted on tray member 96 will be correspondingly varied to the desired setting. It will be recognized, of course, that by fastening or unfastening the cap screws 722 relative positioning of sliding mounting block 716 is attained. As mentioned, calibrations 752 are arranged for enabling the advantageous picking of several various sizes ring shanks. For purposes of illustration and not limitation, whenever calibration A''' is situated at the top of mounting block 702, a large ring shank can be set and suitably lifted. Similarly, calibrations B''' and C''' can be appropriately adjusted so that sliding block 716 can be positioned for vertically positioning medium and smaller sized ring shanks 54, respectively.

With reference to grasping means 708 of this embodiment it is defined by a relatively stationary finger plate member 724 and a pair of pivotal finger members 726. Stationary finger plate 724 is affixed to cutout 720 by cap screws 728. Since plate 724 is fixedly connected with slidable block 716 it moves in unison with mounting block 702. Stationary finger plate 724 includes a pair of lateral support arms 730 which terminate at the lower end thereof and extend laterally outwardly. Each lateral arm 730 serves as a backing for finger 726 and ring shank 54 whenever contacted by pivotal fingers 726. Moreover, as noted, the backing plate 724 is to be positioned behind the ring shank as shown in FIG. 30.

Regarding the pivotal pair of fingers 726, each has a generally L-shaped configuration and is pivotally mounted by conventional pivotal device 732 to the side of sliding block 716. It will be recognized, of course, that each pivotal finger 726 is adapted to selectively grasp a good or satisfactory ring from the nest 106. Each pivotal finger 726 has a generally vertical portion 734 and horizontal portion 736. A stub shaft 738 is connected to vertical portion 734 and outwardly extends therefrom. Stub shaft 738 serves to actually engage one of the lateral arms 730, in the manner depicted in FIG. 30, so as to enable the lifting and carrying of ring shanks 54 and settings from the pick-up position P—P to the releasing positon R—R. As the translating mechanism 700 moves block 716 downwardly from position H—H to the pick-up position it will be appreciated, of course, that the stub shaft 738 will be spaced from arm 730 until the actuating means 710 pivots finger 726 such that the stub shaft 738 contacts the arm 730 whereby the ring is firmly grasped. Horizontal portion 736 of pivotal finger 726 member is connected to grasping actuating means 710 by clevis member 740. It will be further appreciated that the stub shaft 738 will move away from the arm 730 so as to permit the ring 52 to be released at the releasing position.

Turning now to grasping actuating means 710 it will be appreciated that such is connected to the grasping means 708 for purposes of moving the latter between its ring grasping position and ring releasing position. Actuating means 710 is defined by a pair of suitable energizable fluid motors 744 of the kind indicated above, which are operable by control means 950 in response to certain signals from memory means 900. Each of the fluid motors 744 has a piston rod 745 which is rigidly connected to the top of clevis member 740. Also included in actuating means 710 is a mounting bracket 746 having a pair of clevis support flanges 748. The mounting bracket 746 is connected across the top of sliding block 716 in a suitable fashion and the top end of each motor 744 is fastened to a corresponding clevis support flange 748 through clevis pin 750. Each fluid motor 744 also includes a pair of fittings 751 connected at opposite ends thereof with fluid hoses 752 serving to supply and exhaust pressurized fluid to the motor from control means 950. As mentioned above and herein repeated, although the present embodiment is directed towards energizable fluid motors 744 which have piston rods 745 reciprocating up and down, it is certainly within the spirit and scope of the present invention to have other suitable and equivalent types of energizable motors which achieve the noted operation of the grasping means 708.

Selective energization of one or both of the fluid motors 744 by control means 950 is achieved as a result of signals which have been transmitted thereto, in a known manner, from monitoring means 900. Each of the fluid motors 744 will be actuated so as to move rod 745 downwardly if signals from both the monitoring apparatus 454 and bonding testing means 70 indicate that the bonding is satisfactory. It will be recognized that downward movement of rod 745 will displace vertical leg portion 734 downwardly relative to stationary finger plate 724, such that stub shaft 738 moves through the opening defined by the ring shank 54. In this operating position, stub shaft 738 engages the lateral arms 730 to trap the ring shank. It will be noted that stub shaft 738 is based beneath the lower portion on the shank 54. During this upward movement of block 716 from pick-up position P—P to raised position H—H stub shaft 738 will travel a small vertical distance before it engages the underneath surface of a ring shank 54. Whenever sliding block 716 reaches position H—H the mounting block 702 is then retracted rearwardly and downwardly to the releasing position R—R. At the completion of the foregoing operation, translating mechanism 700 is operated so as to raise the mounting and sliding blocks 702 and 716, respectively, vertically upwardly as more clearly represented in FIGS. 3 and 30 by the arrows. In the releasing position R—R, as shown in FIGS. 3 and 30 pivotal fingers 726 are positioned over conveying means 714. Once over the conveying means 714 the sliding block 716 is in its lowermost and retracted position, and control means 950 energizes the fluid motor 744 to raise piston rod 745. As a result of the rods upward movement, the pivotal finger 726 will move from the carrying position whereat stub shaft abuts plate 724 to the releasing position as shown by the phantom lines in FIG. 30, such that stub shaft 738 no longer is situated beneath the ring shank. As a consequence thereof, the ring 52 will drop onto conveying means 714. It will be recognized, of course, that energization of the fluid motors 744 and positioning of grasping means 708 with respect to the conveying means 714 and nests 106 are appropriately timed such that movement of the good rings 52 from the nests 106 is performed in a preselected and coordinated fashion such that grasping means 708 suitably cooperates with each successive set of nests 106 and the fluid motors 744 timed to effectuate the picking up and releasing.

Specifically referring to FIGS. 1 to 3, conveying means 714 is seen to basically carry the completely formed good rings 52 from beneath the releasing position of grasping means 708 to a suitable collection receptable 754 connected to work table unit 76. As noted in FIG. 3 bad parts ejecting means 74 has been omitted for the sake of clarity in illustrating the transporting means 704 of good parts removing means and its cooperation with conveying means 714. In the embodiment being described, the conveying means 714 is defined by a conventional form of vibrating out-feed conveyor mechanism 756, such as of the type manufactured by and commercially available from Dyna-Slide, E. Syracuse, New York, a division of Lipe-Rollway Corporation.

Since the components, assembly, and operation of the conveyor mechanism 756 are well-known a detailed description thereof will be dispensed with. Rather, only those portions which are believed necessary for an understanding of its operation and relation to the present invention will be subsequently set forth. Such mechanism 756 essentially includes support base plate 758, resilient vibrator brush-like conveying member 760, controller 762, and toe clamps 764. Toe clamps 764 function to secure base plate 758 to work table 78. A vibrator 765 as shown in FIGS. 2 and is mounted underneath conveyor member 760 and imparts vibrator motion thereto. The controller 762 is also connected to the table 78 and is appropriately connected to the vibrator 765 so as to control the amplitude of vibration. Consequently, by reason of the above described relationship, a simple yet convenient approach is provided for transferring the released rings 52 to a collection receptacle 754.

It is well within the principles of the instant invention that other forms of conveying devices may be suitably employed for conveying the good rings 52 from good parts removing means 72.

BAD PARTS EJECTING MEANS

Concerning bad parts ejecting means 74, such is best shown in FIGS. 31 to 36, taken in conjunction with FIGS. 1 to 3. As depicted ejecting means 74 essentially comprises framing means 766, motion producing means 768, motion transmitting means 770, pair of lifting means 772, ejecting means 773, and switch sensing means 774.

Figure 35:
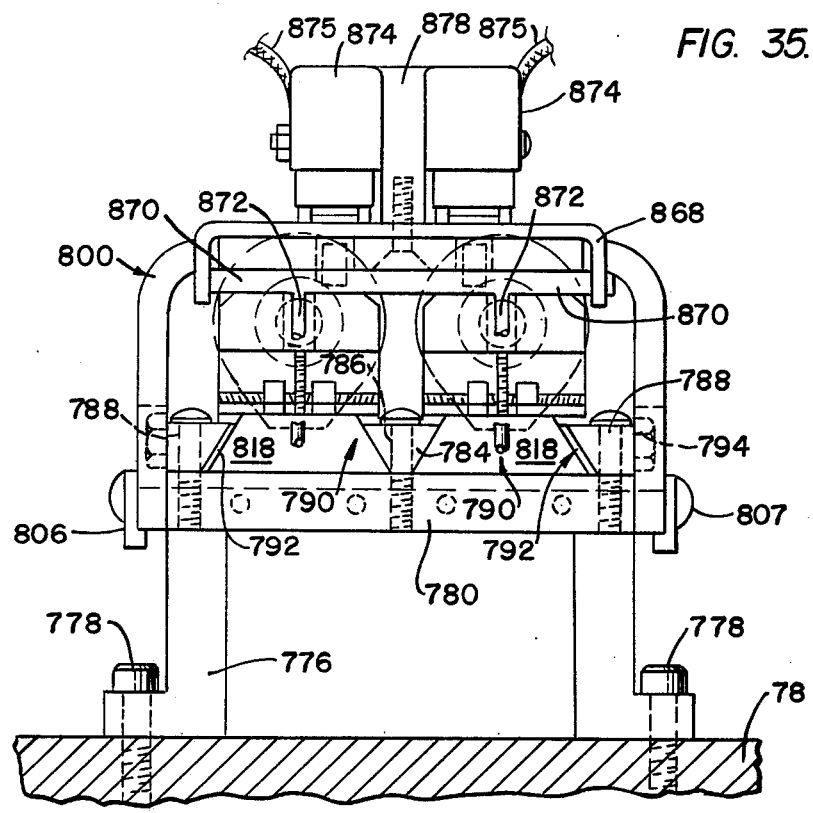
FIG. 35 is a view taken substantially along line 35—35 appearing in FIG. 32 looking in the direction of the arrows and illustrating even more detail of the bad parts ejecting apparatus.

Referring in particular, to FIGS. 32 and 35, there is best shown frame means 766. Such is depicted as including a pair of generally parallel and spaced L-shaped brackets 776, fastened to table top 78, as by bolts 778, generally flat base plate 780 which is secured to and across the top portions of each bracket 776 by means of fastening bolts 782. A wedge shaped central guide member 784 is centrally connected along a longitudinal portion of base plate 780 by cap screws 786 or the like. A pair of outer elongated guide members 788 are rigidly secured by cap screws along the longitudinal edges of base plate 780. Each of the elongated guide members 788 have suitable incline guiding surfaces. The foregoing arrangement of central and outer guide members 784 and 788, respectively, serve to define a pair of generally parallel and longitudinally extending guide channels 790 for cooperation with motion transmitting means 770, in a manner to be presently set forth. As also noted, gibs 792 are appropriately connected, in a well-known fashion, along the inclined surfaces of outer guide member 788, as by conventional ball plunger 794. Additionally, suitable lubricating material, for purposes of facilitating movement or displacement of motion transmitting means 770 within channels 790 may be applied to the inclined surfaces of the guide member 784 and gib 792.

Frame means 766 further includes a mounting block 796 having a pair of openings 797. Mounting block 796 serves to support motion producing means 768. A pair of longitudinally extending adjustable cap screws 798 (FIGS. 32 and 34) one of which is shown, is threadedly connected to the base of mounting block 796 and serves to limit the rearward displacement of motion transmitting means 770, such as indicated in FIG. 34. Further, frame means 766 is also formed with a generally arcuate protective shield 800 which can be made from suitable materials, for example, transparent plastic. Protective shield 800 has a top surface 802 with depending lateral side portions 804 which are secured to the corresponding opposite sides of base plate 780 by side brackets 806 which are secured by cap screws 807 to the lateral edges of the base plate. An elongated stop plate 808 is also suitably connected to the base plate 780 at the forward end thereof so as to extend across the forward end of guide members 788. In this particular manner, stop plate 808 functions to limit the forward movement of motion transmitting means 770, whenever the lifting means 772 are moved to their operative position.

Referring to the motion producing means 768 of this particular embodiment, such is depicted as basically comprising a pair of standard fluid motors 809, of the type previously described, connected to control means 950. Fluid motors 809 serve to linearly reciprocate piston rods 810 having standard coupling members 811 at their free ends. The coupling members 811 are coupled to serve to facilitate interconnection of motion transmitting means 770, in a manner made evident. It will be appreciated that whenever piston rod 810 is selectively energized it will advance the motion transmitting means 770 between inoperative and operative positions. It will be understood that in the inoperative position of transmitting means 770, the lifting means 772 cooperates the ring settings 56 and possibly shanks 54 which are located in the respective nests 106. Whenever the motion transmitting means 770 moves from the operative position to the inoperative position lifted settings 56 and or shanks 54 are discharged into a suitable discharge receptacle, such as catch pan 812. The catch pan 812 is situated between and beneath the protective shield for receiving the discharged settings and possibly shanks. Of course, other suitable devices may be used as a receptacle for receiving the discharged settings and shanks from lifting means 772.

Referring back to the fluid motors 809 each has a reduced neck portion suitably received in the opening 797 formed in mounting block 796. Operatively associated with each of the respective fluid motors 809 are conventional fluid supply lines 814 which facilitate energization of the motors. The supply lines 814 interconnect fluid motors and the control means 950 and are designed to supply and exhaust the pressurized fluid to appropriately energize the fluid motors. The main control means 950, as indicated above, is operated in response to signals transmitted thereto from monitoring means 900 for purposes of suitably actuating the fluid motors. The monitoring means 900, as mentioned, will present good or bad signals to control means 950 for actuating appropriate valves associated with the fluid motors 809. Such signals are supplied to monitoring means 900 for application with fluid motors 809 from either ring probe device 670, bonding means 68 or bond testing means 70.

It will also be clearly understood that piston rods 810 will reciprocate motion transmitting means 770 to its operative position, whenever respective pairs of nests 106 have been sequentially indexed from the good parts removing station G to the bad part ejecting station H and suitable signals have been supplied to memory means 900 so as to cause fluid motors 809 to have their rods 810 extend.

With continued reference to FIGS. 31 to 35, motion transmitting means 770 is more properly shown as comprising a pair of generally elongated wedge dovetail type slide members 818. The wedge members 818 are formed so as to slidably interfit and cooperate with the guide channels 790 for guiding advancement of the slides. Lifting means 772 is also appropriately mechanically connected to motion transmitting means. Additionally, each slide block 818 is arranged to abut the forward end of the adjustable set screw 798 for positively limiting their rearward movement.

Now turning to the pair of lifting means 772 of the embodiment being illustrated, it will be recognized that both are identical in construction and operation. Consequently, for the sake of simplicity in the subsequent description of lifting means 772 only one will be described in detail. Mention should be made that the principles of the instant invention envision that other suitable lifting means may be appropriately provided for so long as they perform in the same manner.

Figure 36:
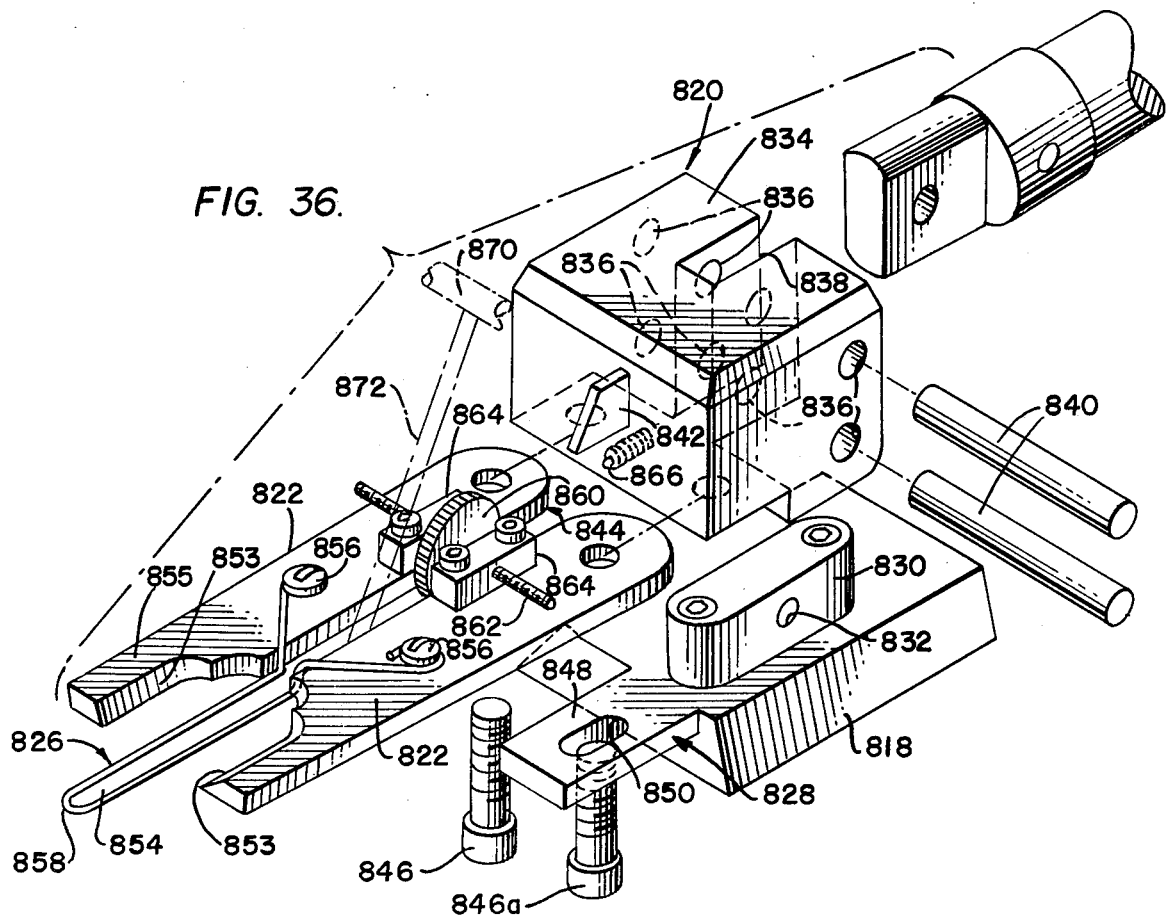
FIG. 36 is an exploded perspective view illustrating structural details of the components which form certain portions of the bad parts ejecting apparatus.

In particular, referring to FIG. 36 lifting means 772 is primarily defined by tilting means 820, a pair of lifting fingers 822, finger adjusting means 824, retaining means 826, and tilting limit means 828.

The tilting means 820 includes stationary block 830 with central opening 832 being rigidly connected to slide member 818 for conjoint movement with the latter. In addition, tilting means 820 further includes a tiltable outer block member 834 having upper and lower pairs of spaced apart and aligned openings 836, and recessed portion 838. Recessed portion 838 is adapted to receive reduced portion of coupling member 812'. A pair of corresponding upper and lower holding pins 840 slidably cooperate with individual openings 836. By the foregoing arrangement, it will be appreciated that the bottom holding pin 840 serves to pivotally and detachably connect outer tiltable blocks 834 to stationary block 830 for purposes subsequently made clear, and top holding pin 840 seems to detachably secure the free end of coupling member 812' to the recessed portion 838 of tiltable block. As a result of this particular form of interconnection, displacement of rod 810 will cause tilting block 834 to be conjointly pivoted such as more clearly depicted in FIG. 33. Correspondingly, of course, stationary block 830 will be likewise displaced in the direction of travel of piston rod 810.

In regard to the pair of lifting fingers 822 such are primarily arranged to lift the defective or non-bonded settings and shanks positioned in the nest member 106 located at ejecting station H, such as illustrated in FIG. 33. Each finger 822 is pivotally secured at one end beneath the forward portion of the tiltable mounting block 834 by individual cap screws 846 and 846a which extend through suitably formed openings in the tilting block 834. It should be particularly pointed out that cap screws 846a will cooperate with the tilting limit means 828 so as to limit the upward pivotal movement of the tilting block 834.

Tilting limit means 828 in this particular embodiment is defined by an extension member 848 connected to and protruding outwardly from the forward end of dovetail slide member 818. An elongated slot 850 is appropriately formed in the extension member 848. Essentially, cap screws 846a extends through slot 850 and will engage the extension member 848, whenever tilting block 834 is tilted in a manner to be described. Consequently, the upward pivotal movement of tilting block 834 is limited such as more precisely depicted in FIGS. 33 and 34.

At the opposite end of each finger 822, is a reduced forward segment portion 852, with an inwardly inclined bevelled surfaces 853, such as more clearly shown in FIG. 36. The bevelled surfaces 853 are effective, whenever the motion transmitting means 770 and lifting fingers 822 are in their fully extended or operative position, to straddle and slide beneath opposite ends of a particular setting 56 held in the tray 96. It will be appreciated, therefore, that whenever the lifting fingers 822 are tilted from the horizontal or pick-up position, to their lifted or inclined position, as shown in FIG. 33, the settings 56 will accordingly, be lifted from the nests 106.

Upward tilting of finger 822, of course, results when piston rod 810 is being rearwardly displaced. The type of pivotal connection between tiltable block 834 and stationary block 830 is such that upon rearward movement of piston rod 810 the tiltable block 834 pivots or tilts upwardly until cap screw 846a engages the underneath surface of extension member 848. Upon continuous rearward movement of piston rod 810, the slide 818 returns to the normal inoperative position. Set screws 798 serve to ensure a more positive stop for movement of slide 818, as well as, of course, the end of the piston rod stroke, as determined by the motor.

As best shown in FIG. 36, retaining member 854 has a pair of ends 856 and elongated closed nose 858. The ends 856 are firmly attached to individual fingers 822 as by screws or the like. Nose portion 858 is defined by generally parallel and narrowly spaced apart sections 859 integral with ends 856. The nose 856 extends between bevelled edges 853 and longitudinally beyond fingers 822. Since the nose portion 858 is sufficiently resilient and is arranged in the foregoing manner, it serves to ride upon the top surface of a setting 56 so as to properly maintain the setting 56 stationarily mounted between the cooperating bevelled surfaces 853. During the pivotal movement of fingers 822, and rearward movement of slide 818, the setting 56 carried by the fingers will cooperate with ejecting means 773 in a fashion to be presently mentioned so as to remove the setting and shank from the fingers.

With continued reference to FIG. 36, each pair of fingers 822 has connected thereto finger adjusting means 824. Adjusting means 824 includes a centerwheel 860 having a screw threaded shaft 862 which threadedly extends through opposed mounting blocks 864 secured to respective ones of the fingers 822. By this particular arrangement by appropriately rotatably adjusting centerwheel 860 and thereby shaft 862 cooperating with blocks 864, in conventional manner, the fingers 822 with bevelled surfaces 853 can be moved apart or together from each other. Accordingly, the fingers can accommodate settings of various sizes. A centerwheel guide 842 is provided so as to prevent lateral drifting of the centerwheel 860. Further, the finger adjusting means 824 includes a conventional spring biased plunger 866 which is retained in the front of tilting block 834. Biased plunger 866 basically functions to releasably engage and maintain the center wheel 860 in a preselected setting.

Referring in particular to ejecting means 773, such is seen to include a mounting yoke 868 which overlies top shield surface 802 and has opposed ends overhanging the sides of the shield. A connecting bar 870 interconnects the free ends of yoke 868 to firmly secure the same to shield 800. Ejecting means 773 further includes a pair of separate elongated ejecting members 872 appropriately connected, in any manner, to connecting bar 870. Each ejecting member 872 is inclined and cooperates with a particular set of fingers 822 so as to contact and thereby force the settings 56 from between fingers 822 and retaining members 854, whenever the fingers 822 are being returned to their inoperative position, see FIG. 34. Ejecting members 872 are positioned so that they force the settings 56 into catch pan 812.

The switch means 774, in essence, includes a pair of conventional micro switches 874, each having lead wires 875 and a cam 876. As shown in FIG. 37, the lead wires 875 suitably electrically interconnect respective micro switches 874 with advancing means 60. As noted in FIG. 35, respective micro switches 874 are suitably attached to opposed side portions of vertical plate member 878 which, in turn, is rigidly connected to protective shield 800. Consequently, switches 874 are spaced in a side-by-side relationship with each other for cooperating with individual piston rods 810 and tilting blocks 834.

Whenever lifting means 772 is in the inoperative or tilted position cams 876 will contact tilting block 834. When the fingers 822 are disposed from their inoperative position to the operative positions the cam 876 rolls off tilting block 834 and coupling member 811 onto piston rod 810. As a result thereof, the micro switches 874 provide a signal indicative of the fact that the fingers 822 have been moved to their actuating or operative position. It will be appreciated that during the return stroke of piston rod 810 to its inoperative position the cams 876 will ride onto blocks 834 and coupling members 811. As a consequence thereof, micro switches 874 function to provide an appropriate signal to advancing means 60 to at least indicate completion of the ejecting process in that the lifting means 772 has returned to its inoperative position. If either one of the switches is not actuated during the return stroke than a signal indicative of the malfunction will be forwarded to advancing means 60 to halt advancement of the turret.

The operation of the bad parts ejecting means 74 is believed readily apparent from the foregoing description. To supplement such description, however, it will be understood that whenever the turret wheel 92 has been incrementally advanced to the ejecting station H it may carry settings which have been unbonded or improperly bonded with shanks. Respective ones of the fluid motors 809 will be energized in response to whether or not so-called bad signals have been supplied to memory means 900 by bonding means 68, bond testing means 70 or ring probe device 670. As will be described in greater detail in the succeeding description these appropriate bad signals will enable the control means 950 to energize the motors 809. If, of course, monitoring means 900 has good signals transmitted thereto from bond testing station F with regard to individual nests 106, such will indicate that no settings 56 exist in the nest 106. Consequently, the monitoring means 900 will not allow the appropriate motors 809 to be energized. As a result thereof, fingers 822 remain stationarily tilted in the inoperative position.

If, for example, monitoring means 900 does indicate that at least one of the two nests 106 include a non-bonded or defectively bonded ring setting and shank, the control means 950 energizes the motor 809 associated with the defectively bonded ring so that rod 810 is forwardly linearly displaced. Consequently, tilting block 834, lifting fingers 822, stationary block 830, as well as slide 818 are correspondingly displaced. Such forward displacement continues until stop plate 808 is struck as well as fluid motor 809 deenergized. Also during this displacement cam 876 will ride off coupling member 811 and tilting block 834. Toward the end of the forward stroke of piston rod 810, the bevelled edges 853 slide beneath the opposed lateral sides of settings 56 and retaining spring 854 slides over the center of such settings. This cooperation results in the settings being firmly grasped to be movable with fingers 822.

When the fluid motor 809 is reenergized it displaces rod 810 in the rearward direction. The tilting block 840 pivots from the horizontal position shown in FIG. 32 to the tilted position indicated by phantom lines. Accordingly, the fingers 822 will rise until stopped by bolt 846a engaging the underside surface of extension member 848. Continuation of the rearward displacement of piston 810 and tilted block 834 facilitates the cooperation with the ejecting member. The ejecting member 872 becomes effective to contact the shank and/or setting to force the same from between the retaining spring 854 and fingers 822. It should be pointed out at this particular moment that nose portion 848 of spring 854 is relatively axially long so that ejecting member 872 will avoid striking the end thereof. It will be appreciated that ejecting member 872 generally moves between the spaced apart portions forming the nose 858. Consequently, rearward movement of the sliding block 818 will not cause ejecting members 872 to contact and otherwise damage retaining spring 854. Also, during this rearward movement cams 876 of the respective micro switches 874 will once again ride upon the coupling member 811 and tilting block 834. Such cooperation serves to indicate that a particular ejecting sequence has been completed. Accordingly, a signal is advanced to the advancing means 60 for purposes of enabling the latter to incrementally rotate the turret wheel 92. Set screw 798, as previously noted, provides for a positive stopping action for the rearward slide block 818, as the fluid motor 809 returns such slide block and lifting fingers 882 to their inoperative position as clearly shown in FIG. 34.

Having the benefit of the preceding description of the present invention, its operation and the sequence of steps involved, the novel and improved process are believed evident. Reference is now made to FIG. 37 which presents, in block diagram form, a drawing showing the interrelationship between several of the operating stations for purposes of further facilitating an understanding of this novel and unobvious invention.

As mentioned previously, the various double-acting fluid motors used at each of the respective stations B to H are operated by a suitable pressurized fluid, such as air, from a conventional source which is not shown but nonetheless well-known. Additionally, each of these double-acting fluid motors is operatively interconnected, in well known fashion, to control means 950. Control means 950 of the present embodiment is a conventional and suitable device which is of the type generally used in industrial applications to control in a coordinated and preselected sequence a plurality of devices, such as the fluid motors or, if desired, the welding apparatus 454. Therefore, a detailed description as to its construction and operation will be dispensed with inasmuch as such does not form an aspect of this invention. Basically, control means 950 includes a bank of solenoid actuated valves whose operation may be regulated by a cam timer in a fashion conventional in the field to close the individual solenoids at suitable and preselected times to attain the automatic, controlled and coordinated timing sequences for the fluid motors as above noted. It will be pointed out that the indexing mechanism 152 is operatively connected to the cam timer in a known manner to drive the latter during each advancement of the former. This latter form of connection is also well known in the field and does not form an aspect of this invention. By way of specific illustration and not limitation the solenoid valve bank may be of the type commercially available from MAC Valves, Inc., of Wixom, Michigan, and the cam timer unit commercially available from Gemco Electric Company, of Clawson, Michigan. It is pointed out, however, that other suitable and equivalent kinds of solenoid valve systems and cam timer units are envisioned as being within the spirit and scope of this invention.

The monitoring means 900 of this invention may be defined by a suitable and conventional form of electronic memory system which comprises an electronic shift register. Such system is constructed of known components and operates in a known fashion. The monitoring means 900 is appropriately connected to the apparatus supporting means 58 and, of course, the control means 950. The monitoring means 900 essentially functions to remember the position of components moving around on the turret wheel 92 and temporarily stores signals after each index of turret wheel 92, in conventional manner. Thereafter, it consecutively transfers these stored signals to the next successive station whenever the turret wheel is again incrementally advanced. Stated somewhat differently, a signal is generally transmitted to the monitoring means 900, concerning a particular setting and shank associated with a nest, such signal being indicative of a particular condition of the setting and/or shank. Each signal tracks the particular shank and/or setting it is associated with for utilization at some later position. The stored and transferred signals are, as aforenoted, generally characterized as "bad" or "good" and serve to selectively actuate the operation of several components. Mention, of course, should be made that monitoring means 900 includes shift registers appropriately electrically associated to have the signals track respective ones of each pair of nests 106 that are consecutively indexed through a complete revolution on turret wheel 92.

OPERATION

The particular sequence of operations of the ring assembly apparatus 50 which is made in accordance with the present invention will be understood by additionally referring to FIGS. 1 to 3, along with FIG. 37. At the loading station A, an operator or perhaps an automatic ring setting placing device, which is envisioned within the broader aspects of this invention, can be utilized to place ring settings in their respective nests 106. By having a pair of nests 106 for each station, the production rate of apparatus 50 is correspondingly increased since many rings can be assembled per unit time.

Upon incremental rotation of turret wheel 92, in step-by-step fashion, the pair of nests 106 are advanced from loading station A to be positioned at ring setting station B. The control means 950 energizes fluid motor 216 so that probe fingers 208 travel to their operative position to contact any settings 56 in the nests 106. Such contact occurs provided, of course, the settings are present. In addition, the probe fingers 208 will enable indication of non-alignment of the settings in the nest 106 should both wires fail to make proper contact with the settings 56. If a setting 56 is present and properly aligned a corresponding "good" signal associated with that particular nest is entered to the monitoring means 900. Should a setting not be present or misaligned a "bad" signal will be transmitted to monitoring means 900. After a predetermined time the fluid motor 216 is again activated by the control means 950 to return the probe fingers 208 upwardly to their inoperative position. Thereafter, the turret wheel 92 is indexed to carry the trays 106 to the shank placing station C. Accordingly, the good or bad signals generated at the ring setting testing station B are transferred to the shank placing station C and track the corresponding settings thereto.

At the shank placing station C, the shank placing means 64 will selectively function to place the ring shanks 54 onto settings 56 in the nests 106. It is evident that both good and bad signals originating from the ring setting testing means 62 are for purposes of applying corresponding outputs at shank placing station C. In this embodiment, a bad output signal from station B overrides a signal from the cam timer, in a known manner, to prevent energization of the fluid motors 314 and 376 which correspond to the respective nest 106 which the output signal is associated with. Consequently, fluid motor 314 does not raise shanks 54 to the grasping position so that they may be grasped by shanks carriage means 226. Also, the corresponding fluid motor 376 of shank carriage means 226 will not be operated.

Conversely, good signals entered into monitoring means 900 will permit the control means 950 to operate the corresponding fluid motors 314 of the shank lifting means. Thus, the shanks are lifted to an elevated position whereat the associated fluid motor 376 will cause the jaw members to grasp the shank 54 and release the same whenever over the setting 56 therefor. Also, the jaw actuating means 330, whenever the jaw means 329 are in their lowermost position, serves to actuate the pivot arms 132 to firmly contact and grasp the shanks. After the jaw means 329 are moved to a position away from the nests 106 and pivot arms 132, the turret wheel 92 is again successively indexed by advancing means 60 to advance the shanks and settings from station C to shank testing station D.

At station D, the shank testing means 66 serves to test for the presence, misalignment or absence of the ring shanks 54. The fluid motor 216' of shank testing means 66 is operated by control means 950 to raise and lower the probes 212' much as in the manner described in connection with ring setting testing station B. The exception, however, is that the probe fingers 208' contact the shanks, as shown in FIGS. 5A and 5B. It will be appreciated that motor 216' will be energized by at least one good signal transferred through monitoring means 900 from the ring setting testing means 62.

On the other hand, if two bad signals are transmitted from setting testing means 62 it will result in the monitoring means 900 preventing, in a known manner, energization of motor 216'. It will be understood that one bad signal will not prevent energization of the motor 216'. Alternatively, the signals generated at station B need not be forwarded to the ring shank testing means 66 but, rather, erased at the shank placing station C.

The shank testing probe fingers 208' are effective for determining the proper alignment of the shanks 54 with respect to the settings 56. The probes 208' are connected to memory means 900 for purposes subsequently disclosed. Alternatively, the signals generated by probes 208' could be connected to an alarm like device which would serve the purpose of actuating the latter in response to an absence of a ring shank. Accordingly, the indicating device will provide a suitable indication to an operator that there might be a malfunction with the shank placing means 64. In addition, the memory means 900 is arranged such that the good or bad signals entered at the ring setting testing station B are erased. After the motor 216' raises the probes 208', the advancing means 60 successively indexes turret wheel 92 and nests 106 to the bonding station E.

At bonding station E control means 950 actuates motor 474 to lower the pair of electrodes 526 and the monitoring apparatus 454 is actuated by control means 950 to enable supply of current to each electrode provided good signals have been transmitted from the ring probes 208'. If during the downward movement of electrodes 526 they do contact a shank the corresponding micro switch 588 will be actuated to indicate the presence of a shank and transmit a good signal to memory means 900 for subsequent use as herein described as well as enable current flow to the electrodes. Should there not be a shank the switch will not close and then a bad signal will be transferred to the memory means 900. During the contact of electrodes 526 with shanks 54 the heat generated will be sufficient to bond the shanks 54 to their corresponding settings 56. The weld monitoring apparatus 454 also, in a known manner, gauges the quality of heat applied and can enter good or bad signals into memory means 900 in response to whether or not it senses good or bad bonded joints, such as if the heat applied is not within a preselected range. Upon retraction of motor 474 the electrodes 526 will rise and the micro switch 580 will be actuated to indicate that the electrodes have been safely raised and also permit the indexing mechanism 152 of advancing means 60 to incrementally advance the turret wheel 92. Should the switch 580 not be contacted then advancing means 60 will not index the turret wheel. Moreover, the good or bad signals of ring shank testing means are erased at this station.

At the conclusion of the preceding operation, the turret wheel 92 is again indexed such that the bonded shanks and settings are incrementally advanced to the bonding testing station F.

At bond testing station F, the bond testing means 70 is actuated to test for good and bad bonded rings. To this end, the fluid motors 616 will be suitably energized each time by control means 950 to move jaw means 640 to its operative position. The individual fluid motors 626 for operating jaw means 640 for each nest may or may not be actuated depending on whether or not a good or bad signal has been entered into monitoring means 900 for the corresponding nest by welding control apparatus 454 or the micro switches 588. As mentioned, at this station tensile forces are applied by jaw means 640 to those shanks 54 which have otherwise been indicated by bonding means 68 possessing a good bond. Bad signals will not cause actuation of motors 626. If the bond joint fails on either side of the ring, the jaw means 640 will pivot sufficiently to actuate the defect sensing means 634 to transfer a bad signal indicating a bad bonding to monitoring means 900. If the bond is good, defect means 634 is not actuated and a good signal is entered into monitoring means 900. The control means 950 will after a predetermined time energize the motor 616 to return to the inoperative position. In this process, the switch 620 is actuated and serves to indicate that the jaw means 640 has returned to the inoperative position and the indexing mechanism 152 can operate to advance the turret wheel 92 to the next or good parts removing station G. Should the index safety switch 620 not be actuated then the advancing means 60 will not rotate the turret thereby indicating a malfunction at the bond testing station.

At the good parts removing station G the good parts removing means 72 is operated. To this end, the fluid motor 744 is associated with respective ones of grasping means 708 will be actuated if a good signal has been transferred by memory means 900 for that particular motor. Such good signal may come from bonding means 68 or bond testing means 70. Thus, the shanks and settings which are properly bonded will be removed from the nests 106 by grasping means 708. Translating means 700 carries the rings 52 to its depositing position over the conveying means 714. At this point fluid motor 744 is again operated by the control means 950 to release rings onto the conveying means. It will be recognized that whenever a band signal is entered into monitoring means 900 by the bonding means 68 or bond testing means 70 the motors 744 will not be operated to operate grasping means 708. In this latter regard and in known fashion, the monitoring means 900 overrides the control means 950 to prevent actuation of motors 744.

From the good parts removing station G, the turret wheel 92 carries the nest 106 to the bad parts removing station H. At such station, respective ones of the fluid motors 809 of bad parts ejecting means 78 will or will not be operated, to cause lifting fingers 822 to facilitate ejection of the nonbonded or defectively bonded settings, in accordance with whether good or bad signals have entered into memory means 900 by the bonding means or bond testing means 70. It will be understood that if good signals have been indicated by bond testing means 70, they are transferred to monitoring means 900. The good signals provide for an override, in a known manner, of the signals generated by the control means 950 to prevent energization of the particular fluid motors 809 corresponding to the nest with which the good signals are associated at the bad parts ejecting station. Conversely, if bad signals have been entered into the monitoring means 900 by the bonding means 68 or bond testing means 70 for either or both of the nests 106 at the bond testing stations G, the control means 950 will be able to operate, in the intended manner, to permit the desired energization of the fluid motors 809. Consequently, the lifting fingers 822 will be moved to their operative positions to lift the settings 56 and possibly shanks 54 from the nests. Upon further energization of motors 809 by control means 950 the fingers 822 are retracted and in the process the ejecting means 773 ejects the items carried by the fingers. If the index limit switches are not actuated during the return then a signal is forwarded to the advancing means 60 which prevents operation of the indexing mechanism. If the micro switches are contacted during retraction of the fingers to the inoperative position, then advancing means 60 is effective for further successively and incrementally advancing the turret wheel 92 to its next successive position. As a consequence thereof, an empty pair of nests 106 is advanced back again to the loading station A for reloading.

ANOTHER EMBODIMENT

Figure 38:
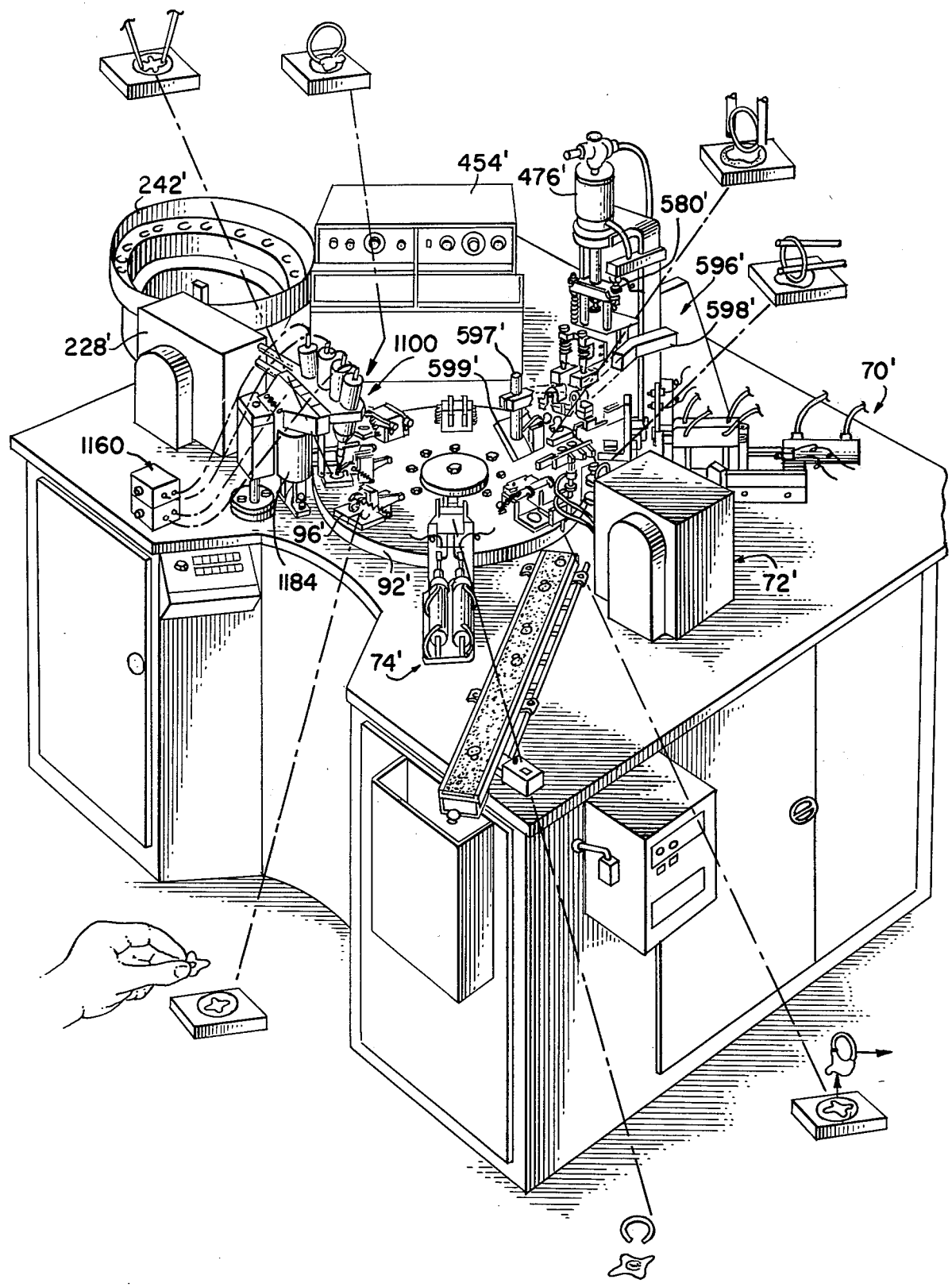
FIG. 38 is a perspective view illustrating a preferred embodiment of the instant invention.
Figure 39:
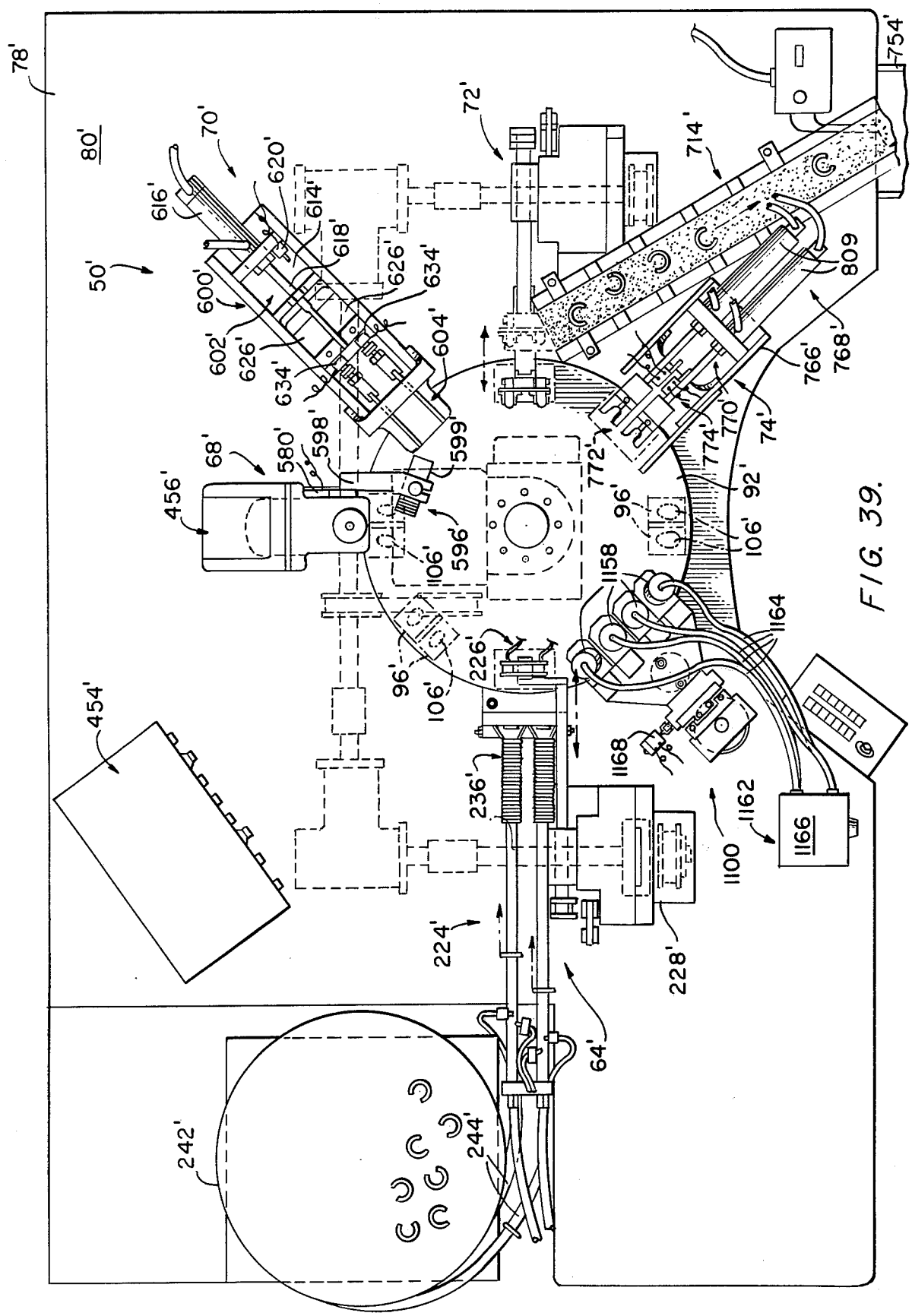
FIG. 39 is a plan view of the preferred embodiment denoted in FIG. 38 with certain components removed for purposes of clearly illustrating such embodiment.
Figure 40:
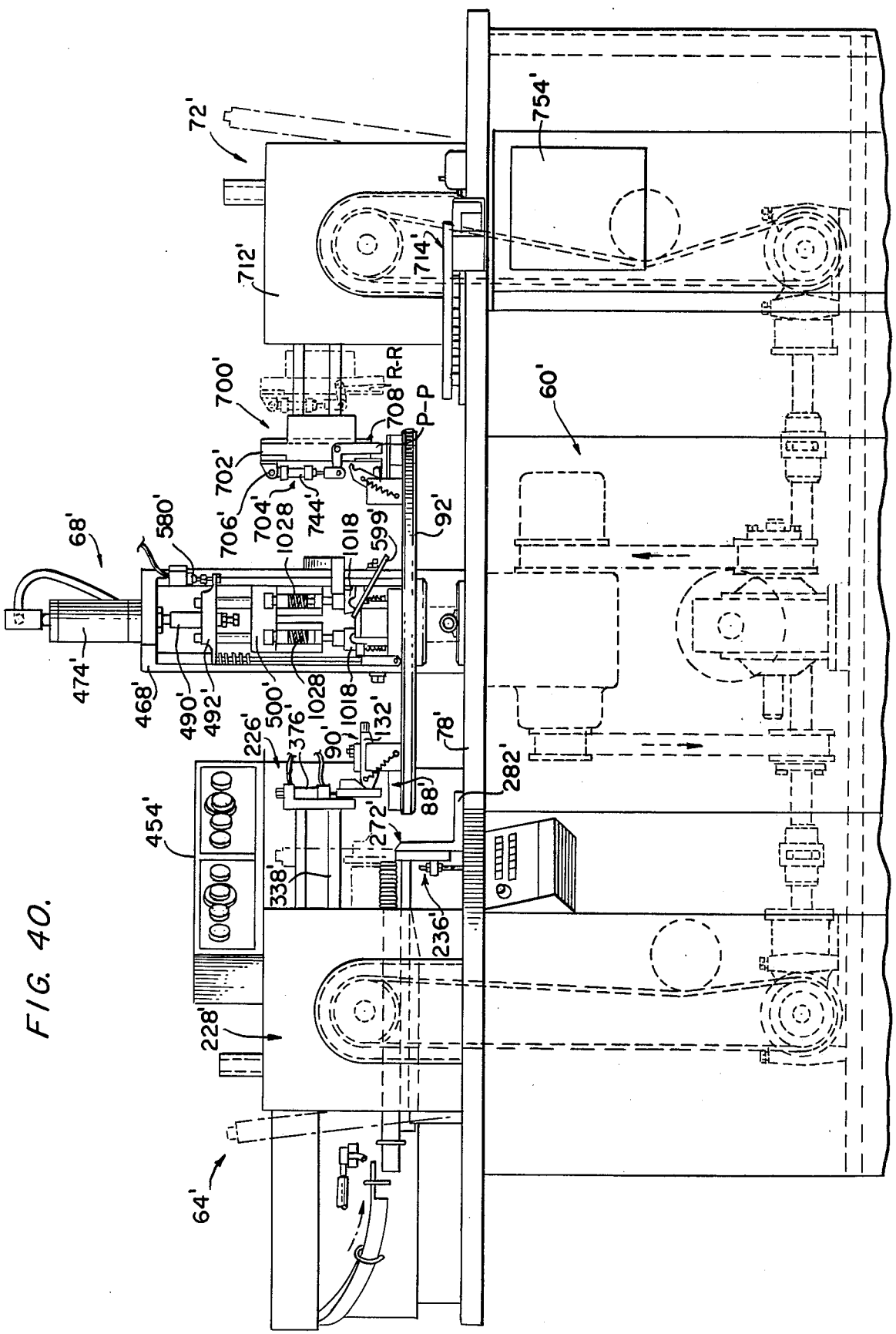
FIG. 40 is a side elevational view of the ring assembling apparatus as illustrated in FIGS. 38 and 39 depicting in greater detail components forming the ring assembling apparatus of this invention, as well as having certain components removed for sake of clarity.

With particular reference to the FIGURES of the drawings and especially FIG. 38 taken in conjunction with FIGS. 39 and 40, there is clearly illustrated a preferred embodiment of this particular invention. The present embodiment is an extremely versatile ring forming apparatus. It has been determined to be not only successful in assembling relatively heavy and large types of jewelry rings, but is also especially successful in advantageously forming delicate and smaller type jewelry rings without scorching type imperfections or weak bonded joints. Besides the preceding enumerated benefits, the particular construction and corresponding operation of the organization of components forming this embodiment is even more simplified. Correspondingly, such embodiment is even less likely to result in operating, maintenance and repair problems.

It should be pointed out, however, that the preferred present embodiment is in many respects similar to that previously described but, however, it has certain modifications and simplifications. Basically, these modifications include the removal of both the ring setting and ring shank presence and alignment testing means 62 and 66, respectively. In addition, a novel and improved bonding agent applicating means 1100, has been substituted for the ring setting testing means 62. Also, there has been a simplification of the bonding means 68 located at the bonding station E. It will be noted that the following description will be primarily directed towards those alterations which have been made to bring about this ring assembling apparatus 50'. For sake of simplicity in describing this embodiment, it should be pointed out that structure of the present embodiment which corresponds to that in the previously mentioned embodiment will be identified by like reference numerals with, however, the addition of a prime marking.

To gain a broader perspective as to the structural components forming this particular embodiment of the ring assembling apparatus reference is made to FIGS. 38 to 40. As with the previously described embodiment, ring assembling apparatus 50' is arranged for use in the rapid, automatic and continuous assembling of jewelry type finger rings, wherein such rings may include varied size conventional ring shanks and appropriate ring settings therefor. In addition, this ring assembling apparatus 50' is likewise adapted to be used for selectively joining other types of jewelry rings such as, necklaces, bracelets, earrings if the latter are comprised of suitably joinable components. Not only can jewelry type rings, such as necklaces, bracelets and earrings be assembled and joined together, as with the previously described embodiment, but also other integrally united articles comprised of appropriately joinable first and second components.

With continued reference to FIGS. 38 to 40, the apparatus supporting means 58' is defined by a conventional form of desk type work table unit 76'. Desk unit 76' includes a generally flat and relatively sturdy mounting support table 78' having work surface 80'. Advancing means 60', bonding agent applicating means 1100, ring shank placing means 64', bonding means 68', bond testing means 70', good parts removing means 72' and bad parts ejecting means 74' are also operatively connected to the support table 78' in any suitable fashion.

Advancing means 60' as with the other embodiment basically includes work holding means 86' having ring setting holding means 88', shank holding means 90', turret wheel 92' and intermittent driving means 94' (FIGS. 39 and 40). Since the advancing means 60' is similar to the earlier described embodiment a detailed description is dispensed with. Suffice it to say, however, that the turret wheel 92' is positively and incrementally advanced to a plurality of discrete operating positions. Work holding means 86' are connected to the top surface of turret wheel 92' and include a pair of closely juxtaposed ring setting holding means 88' and corresponding shank holding means 90'.

Individual ones of the respective pairs of ring setting holding means 88' is similar in construction to those of the previous embodiment, such as clearly shown in FIG. 17.

The turret wheel 92' is successively and incrementally advanced, whereby each set of work holding means 86' travels from at least loading station A, to a plurality of working stations including bonding agent applying station B, ring shank placing station C, dwell station D, bonding station E, bond testing station F, good parts removing station G, and bad parts ejecting station H. Each set of work holding means 86' is circumferentially spaced so that whenever a respective one is situated at one particular station, the other sets are correspondingly aligned at the other respective stations. It will be noted that between the ring shank placing station C and bonding station E there is the station D formerly assumed by the ring shank testing means and presently at which no actions are performed.

BONDING AGENT APPLICATING MEANS

Figure 42:
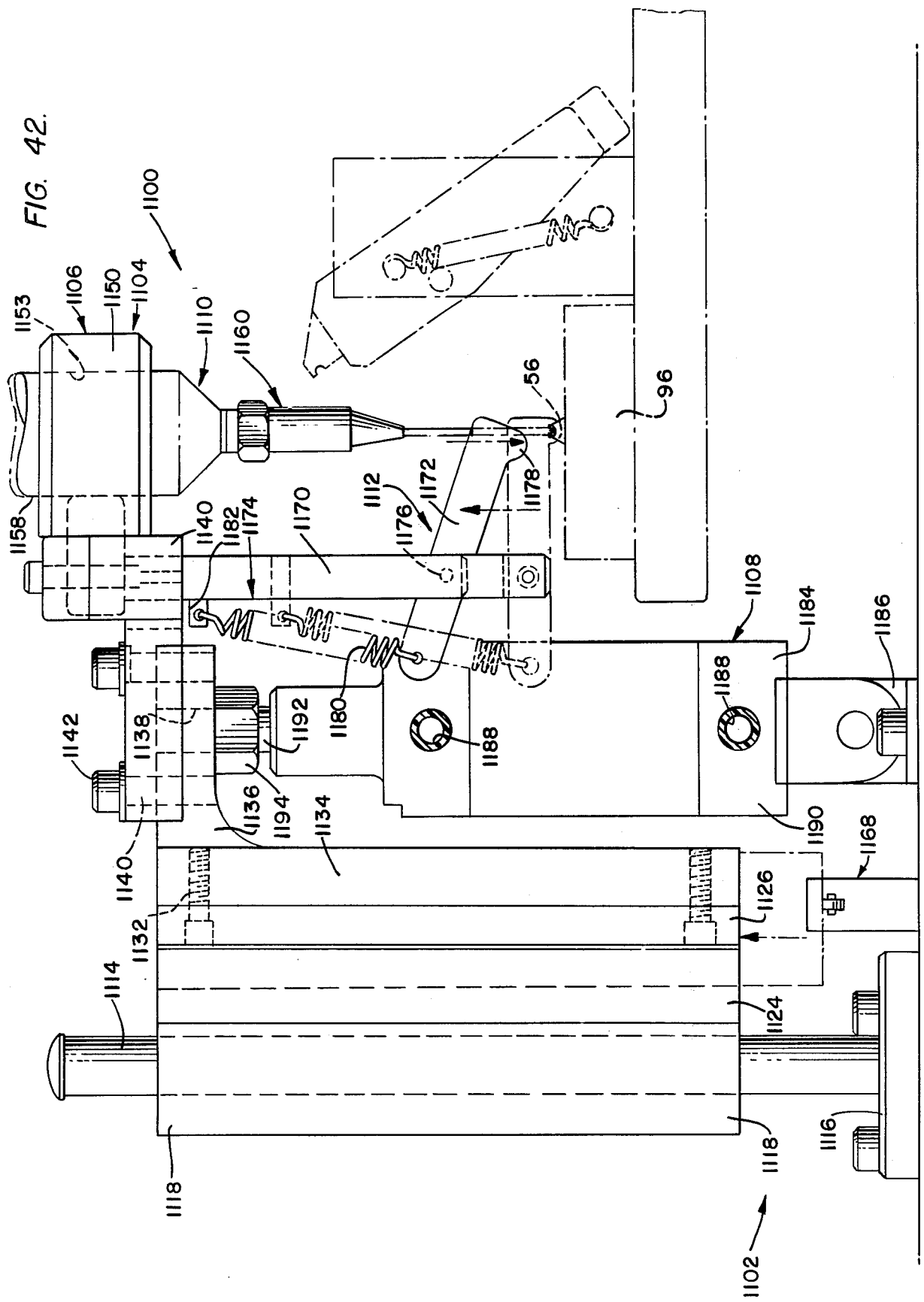
FIG. 42 is a side elevational view of the bonding agent applicator of the present invention shown in the process of applying bonding agent at the bonding agent applicator station.
Figure 43:
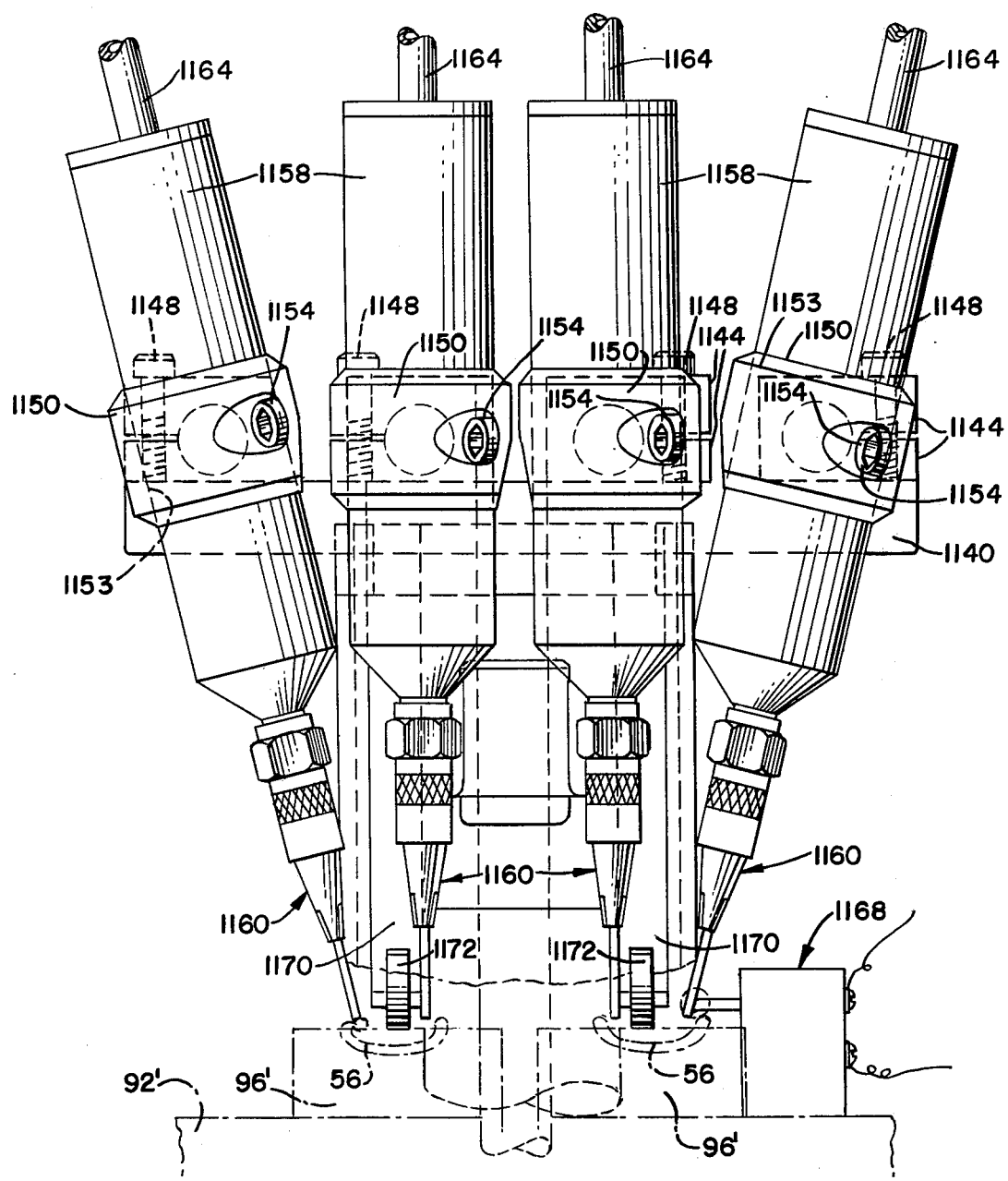
FIG. 43 is a front elevational view of the bonding agent applicating apparatus of the present invention.
Figure 44:
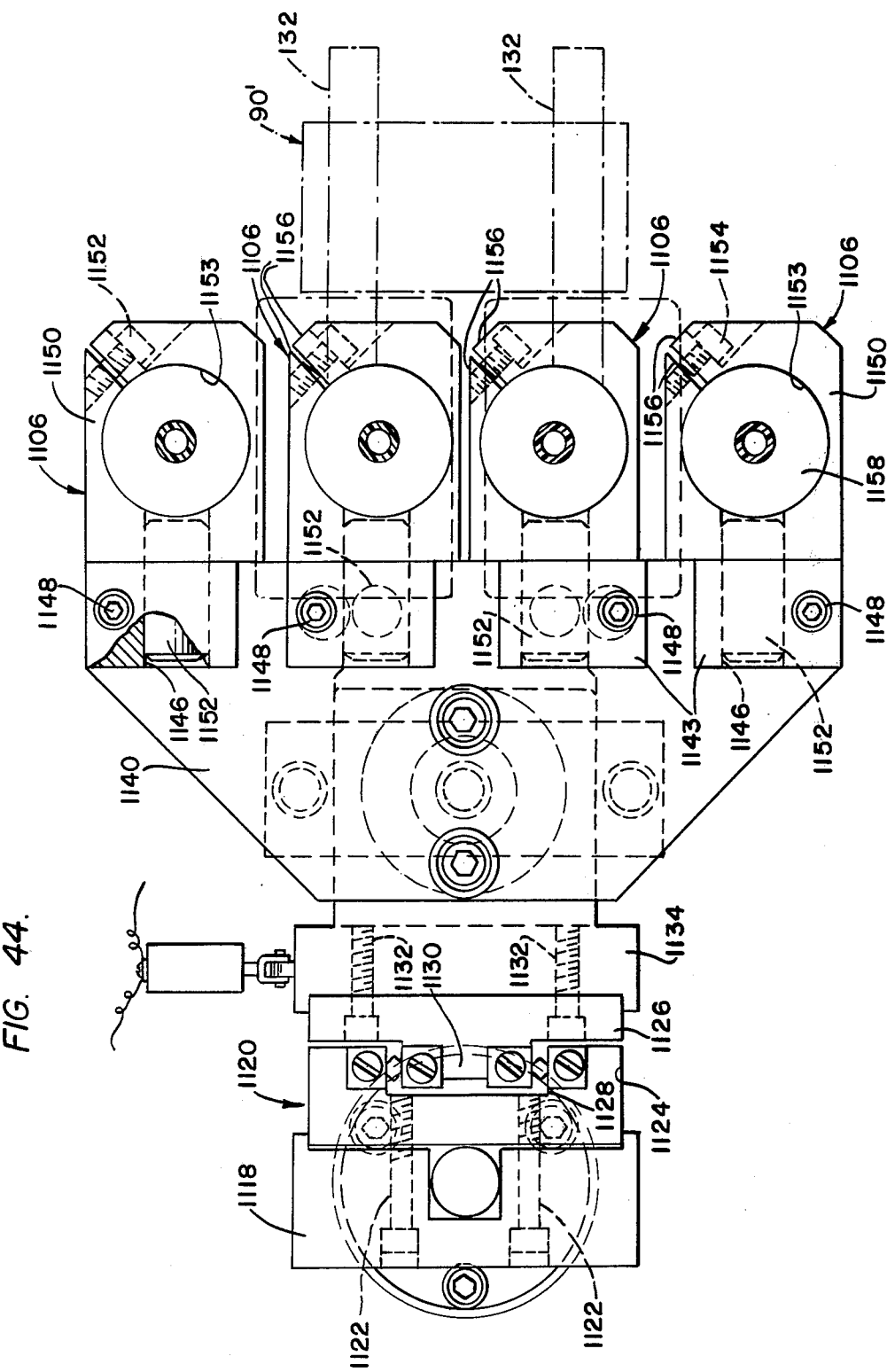
FIG. 44 is a plan view of the bonding agent applicating apparatus as shown in FIGS. 42 and 43.

Particularly referring to FIGS. 38 to 40 taken in conjunction with FIGS. 42 to 44 there is perhaps more precisely depicted the novel and improved bonding agent applicating means 1100 suitably positioned at the bonding agent applicating station B. Principally, the bonding agent applicating means 1100 serves to accurately dispense measured quantities of a suitable solder material to selected portions on the ring setting 56 to facilitate the subsequent formation of a secure bond between the setting 56 and shank 54.

As clearly shown in FIGS. 42 to 44 bonding agent applicating means or apparatus 1100 is arranged to comprise supporting means 1102, platform means 1104 having adjustable applicator receiving bracket means 1106, platform moving means 1108, bonding agent dispensing means 1110 and disengaging means 1112.

In regard to the support means 1102, such is contemplated as including a generally elongated supporting rod 1114 extending vertically upwardly from a base 1116 secured to the table. Additionally, the supporting means 1102 further includes a securing block 1118 being positioned on the supporting rod 1114. Securing block 1118 is adjustably connected to the rod 1114 and also to linear type bearing means 1120 as by threaded members 1122. Bearing means 1120 may be any standard type which facilitates a smooth and linear displacement of the platform means 1104 is response to operation of the platform moving means 1108, in a manner to be presently described.

With continued reference to FIGS. 42 and 44, bearing means 1120 includes a stationary outer bearing race member 1124 and movable inner bearing race member 1126. The stationary bearing member 1124 is generally U-shaped in plan view (FIG. 44) and slidably cooperates with movable inner bearing race member 1126. Additionally, the stationary bearing member 1124 vertically extends along a portion of the vertical extent of securing block 1118. The bearing block 1124 defines a channel 1128 which defines the path of travel for the inner race member 1126. Such inner race member 1126 includes a reduced bearing portion 1130 which is slidably received by and in the channel 1128 formed by the bearing member 1124. Cap screws 1132 serve to connect the inner bearing race member 1126 to the movable platform means 1104 so that the former is conjointly movable with the latter. In this known fashion, the up and down reciprocation of the platform means 1104 is assured to follow the desired path. Otherwise, a tendency might exist for applicating means 1110 to become disoriented.

As concerns the movable platform means 1104, such includes a generally elongated block 1134 fixedly connected, as by the noted securing cap screws 1132, to the inner bearing member 1126. Thus, the two are conjointly movable. Movable block 1134 has a forward generally horizontal ledge 1136 with threaded opening 1138. Ledge 1136 is rigidly connected to a portion of the platform moving means 1108. Actuation of platform moving means 1108 causes the ledge 1136 and block 1134 to advance between the operative and non-operative positions indicated by the solid and dotted lines, respectively, in FIG. 41.

Additionally, platform means 1104 further embodies a generally flat and triangular shaped top platform plate 1140. Threaded cap screws 1142 fixedly secure platform plate 1140 to the ledge 1136. Suitably connected to platform plate 1140, in the embodiment being presently described, are two pairs of four linear spaced apart adjustable applicator receiving means 1106 being situated at the radial innermost end of platform plate 1140. As will be more thoroughly described, corresponding ones of the applicator receiving bracket means 1106 suitably contain portions of bonding agent dispensing means 1110. More particularly described receiving means 1106 includes conventional type of supporting brackets 1143 having movable free ends 1144 which define a variably sized opening 1146 therethrough. Threaded cap screws 1148 join the free ends 1144 of the bracket 1143 and can be appropriately turned to correspondingly vary the size of opening 1146 for purposes subsequently made clear.

Receiving means 1106 also comprises applicating holders 1150 which have a shaft 1152 being rotatably received with respective ones of the openings 1146 of the supporting brackets 1143. As a consequence thereof, the applicator holder 1150 may assume any preselected position. Holders 1150 also include an adjustable opening 1153. Adjustment screws 1154 appropriately interconnect free ends 1156 of brackets 1143 to enable the openings 1153 to have adjustable sizes for reasons subsequently made clear. Releasably retained by applicating holders 1150 in a manner to be described, is the bonding agent dispensing means 1110.

From the foregoing arrangement it will be noted that corresponding shafts 1152 are releasably secured within adjustable openings 1146. Shaft 1152 prior to being locked into position by screw 1154 is rotated to properly position applicating holders 1150. It is contemplated within the principles of this invention that other similar types of structures are embraceable thereunder for defining the platform means 1104.

Still referring to FIGS. 38 to 40 and 42 to 44 bonding agent dispensing means 1110 may be defined by a conventional type of fluid material dispensing apparatus for dispensing metered quantities of solder material. One example of such type of bonding dispensing means is commercially available from Electron Fusion Devices Inc. of East Providence, Rhode Island. Other similar types may be used which will operate in accordance with this invention without departing from the scope thereof. In this embodiment, dispensing means 1110 includes a cylindrical container member 1158 having the general configuration and construction of a hypodermic type syringe. Container member 1158 holds a liquid solder type paste material for deposition on the ring setting 56. Attached to the forward portion of each container 1158 is an applicating needle means 1160. By appropriate manipulation of set screws 1154 containers 1158 are slidably positionable within opening 1153 of holders 1150. The containers 1158 can be positioned in any desired angular position by suitably rotating the shaft 1152. As a result of this construction platform means 1104 permits adjustable and versatile positioning of the containers 1158 and applicating needle means 1160.

As more precisely depicted in FIGS. 42 and 43 applicating needles 1160 are appropriately positioned so that a pair are slightly above each ring setting 56. It will be understood that needle means 1160 will dispense measured amounts of solder at predetermined points on the ring settings 56. These application points are, of course, located at areas in which the open ends of the ring shanks 54 will be placed. Since containers 1158 are adjustable in the fashion indicated above bonding dispensing means 1110 can successfully accommodate a wide variety of sizes and shapes of ring settings. Although two pairs of applicating containers 1158 are associated with this embodiment other suitable numbers of containers 1158 are envisioned for use depending, of course, upon the number of ring settings.

Mention should be made that the soldered paste held within containers 1158 is intermittently dispersed in response to a series of corresponding fluid pressure impulses applied thereto by the control means 1162 (see FIG. 38). Consequently, dabs of solder will be deposited on the ring settings 56 beneath the applicating needle means 1160. As noted, bonding agent dispensing means 1110 of this embodiment is of a well known type, therefore, a detailed description of its structure and operation will not be given. Only a brief description, however, of its necessary components and operation will be touched upon to more fully understand this embodiment. In accordance with such type of apparatus 1110 pressurized fluid, such as air from a suitable source (not shown), is forced through fluid lines 1164 in preselected incremental impulses. Control means 1162 includes two identical known types of control boxes 1166. It will be seen that a pair of fluid lines interconnect each control box with a pair of containers 1158. Such control boxes 1166 function to accurately control the timing and sequence of the fluid pulses applied to individual containers 1158 through fluid lines 1164. The pulses are initiated in response to bearing block 1134 moving downwardly and contacting micro switch means 1168 which may be mechanically fixed to table 78' and suitably electrically connected to the control means 1162. After the block 1134 moves upwardly and clears switch 1168 the control means 1162 is able to be actuated for another operation. The timing and duration of the impulses will regulate the amount of liquid solder dispensed. The metered quantity of solder dispensed will, of course, be dependent on the amount necessary to satisfactorily achieve the desired bonded joint between ring setting and shank. The type of bonding solder will, of course, be the type which enables the bonding of relatively small and delicate ring shanks and settings. The solder actually forms an integral part of the bond. It has been determined that with solder, as opposed to the spot welding of the former embodiment, a highly desirable bonding action is achieved between the ring shanks and settings, particularly with smaller and more delicate ring settings and shanks. In this particular manner, the finished bond is free of any bonding or surface imperfections which could be unaesthetic, as well as avoids the tendency of weak bonds between the shank and setting. Moreover, through use of solder less heat is required to join the ring components.

As depicted in FIGS. 42 and 43, there is perhaps best shown disengaging means 1112 which ensures separation of the applicating needles 1160 from the deposited solder on the ring setting 56. Consequently, the tendency for the setting 56 to be lifted from the tray member 96' as the platform means 1104 is retracted to the non-operating position from the operating position is overcome. It will be pointed out that each setting 56 has associated therewith a disengaging means 1112.

Essentially described, disengaging means 1112 includes support post 1170, pivotal stripping bar 1172, and resilient means 1174. Support post 1170 depends from and is appropriately connected at one end to a suitable opening in platform plate 1140. Stripping bar 1172 is pivotally attached as at 1176 to the free end of the support bar 1170. The foregoing organization of components permits the stripping bar 1172 to move vertically in unison with the platform plate 1140. Pivotal stripping bar 1172 itself is a thin generally elongated member having an enlarged forward portion 1178 adapted to engage the ring setting 56, such as shown in FIG. 42 in dotted lines. Opposite portion 1178 is an opening which acts to secure one end of the resilient means 1174.

Resilient means 1174 may be comprised of a conventional extension spring 1180 with one end connected to the opening in the pivotal bar 1172, whereas the other end is connected to a spring pin 1182 fastened to spring post 1170. By reason of the above arrangement, the pivotal bar 1172 is biased clockwise, as viewed in FIG. 42. Hence, bar 1172 will exert a generally downward force on the ring setting 56. This is important whenever the platform plate 1140 is being lifted upwardly. The magnitude of the biasing force is selected to be sufficient to ensure separation of needle applicator means 1160 from ring setting 56 as well as ensure that the setting remains seated in the tray 96'. After platform means 1104 is raised to the non-operating position work holding means 88' is incrementally advanced to the next position. Accordingly, another pair of ring settings 56 can be positioned at bonding agent applying station B for having the solder applied thereto. It will be appreciated that enlarged end 1178 is raised sufficiently to permit unobstructed rotational advancement of the settings 56.

As to platform moving means 1108 such may be comprised of any known type of double acting fluid motor 1184 which whenever selectively energized causes the platform 1140 to appropriately raise and lower. In this embodiment, fluid motor 1184 has one end fixedly attached to bracket 1186 on table 78'. Fluid motor 1184 is connected by appropriate pressure hoses 1188 and fittings to the main control means 950'. Extending from the top of fluid motor cylinder 1190 is a reciprocal piston rod 1192 threadedly attached by cap nut 1194 to the forward ledge 1136. Whenever piston rod 1192 vertically reciprocates slide bearing means 1120 facilitates such movement. The fluid motor 1184 appropriately forces the platform 1140 downwardly to the working position, whenever a new set of ring settings 56 are positioned at the bonding agent applicating station B. Once the applicating needle means 1160 have reached the bottom of their path, the control boxes 1166 which are actuated in response to switch 1168 being contacted by the bearing block 1134 as the latter descends conjointly with piston rod 1192. The control boxes 1166 in well known fashion, direct measured impulses of pressurized fluid to the container 1158 to correspondingly dispense metered amounts of solder material at the desired placement points on the setting. Upon the conclusion of the dispensing step, fluid motor 1184 is once again energized to raise the platform 1140 and thereby containers 1158 and applicating needle means 1160 upwardly. Stripping bar 1172 functions to ensure the necessary separation between the applicating needle means 1160 and ring settings 56. As indicated, the biasing force applied by spring 1180 is adequate for purposes of having enlarged end 1178 keep the setting seated. After the platform is lifted the turret wheel 92' is appropriately indexed to carry the settings 56 to the ring shank placement station C.

RING PLACING MEANS

Whenever at the ring assembling station C, ring shank placing means 64' basically functions in the manner described in the aforementioned embodiment to place the shanks 54 on the settings 56. During such operation it is evident, of course, that the free ends of each shank 54 are to be placed onto the solder deposited on the setting 56 for facilitating the subsequent bonding action. Insofar as the ring shank placing means 64' is formed of essentially the same components as ring shank placing means 64, it will function in substantially the same manner. As a consequence a complete description thereof is not believed necessary for an understanding of this particular embodiment. However, to briefly describe the operation thereof in connection with this embodiment reference is made to FIGS. 38 to 40. Moreover, given the substantial identity of structure between the two placing means reference is also made to FIGS. 6 to 12, 13 and 14.

It should be pointed out that ring shank placing means 64' basically comprises ring shank supplying means 224', ring shank carriage means 226' and motion translating means 228'. This particular embodiment does not include, however, a flux applying means similar to flux applying means 230 since the bonding agent applicating means 1100 at station B is utilized. Notwithstanding that modification to the ring shank placing means 64' it essentially operates to deposit ring shanks on the ring settings.

In the previous embodiment, the fluid motors 310 associated with ring shank lifting means 236 of ring shank carriage means 226 were selectively actuated in accordance with whether or not the ring setting testing means 62 indicated the presence, absence or misalignment of the ring settings in the corresponding trays 96. Since in this embodiment there is no counterpart to ring setting means, as well as the corresponding good and bad signals insofar as bonding agent applicating means 1100 does not provide for similar types of good or bad signals, the fluid motors (not shown) of the shank lifting means 236' will be selectively energized by control means 950' each time the turret wheel 92' advances the trays 96'. In this manner, ring shank lifting means 236' will raise ring shanks 54 to the lifting position, whereat they will cooperate with the carriage means 226'. Shank carriage means 226' includes fluid motors 376' which actuate jaw means 329' to grasp the shanks and then deposit the same on the settings. Since there is the absence of good or bad signals being generated from station B concerning the setting, both the shank lifting means 236' and jaw actuating motors 376' will always be operated each time the turret wheel 92' is sequentially indexed. Thus the shank lifting and jaw actuating motors 236' and 376', respectively, will operate so that the individual ring shanks are grasped and released at the appropriate times so that such shanks are deposited onto the settings whereby the free ends of the shanks contact the solder material. After the shank carriage means 226' places the shanks 54 on the settings 56 and the jaw means 329' is raised from the depositing position, the turret wheel 92' is free to advance to the next successive position. As a result thereof, the settings and shanks are passed to station D.

In this particular embodiment, as earlier indicated, the ring assembling apparatus 50' does not include a ring shank testing means 64 at station D. Notwithstanding its absence, the turret wheel 92' will nonetheless suitably advance the trays 96' to this position. Since the ring shank testing means is not used, the associated fluidic and electrical circuitry for operation of such means is also not needed. Although in this embodiment no operating steps are performed, the trays 96' and shanks might be worked upon if desired.

BONDING MEANS

Figure 45:
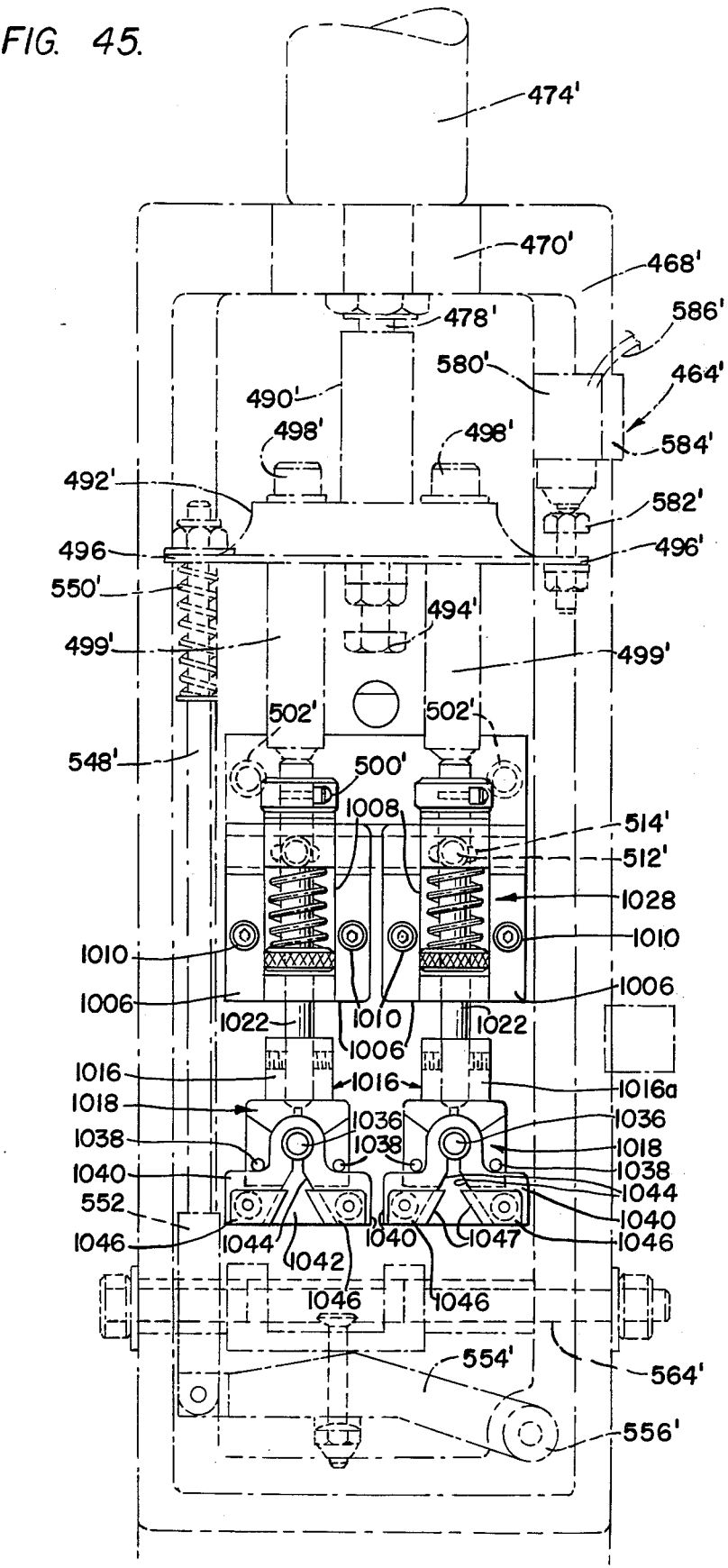
FIG. 45 is a front elevational view of another embodiment of the bonding apparatus of this particular invention.
Figure 46:
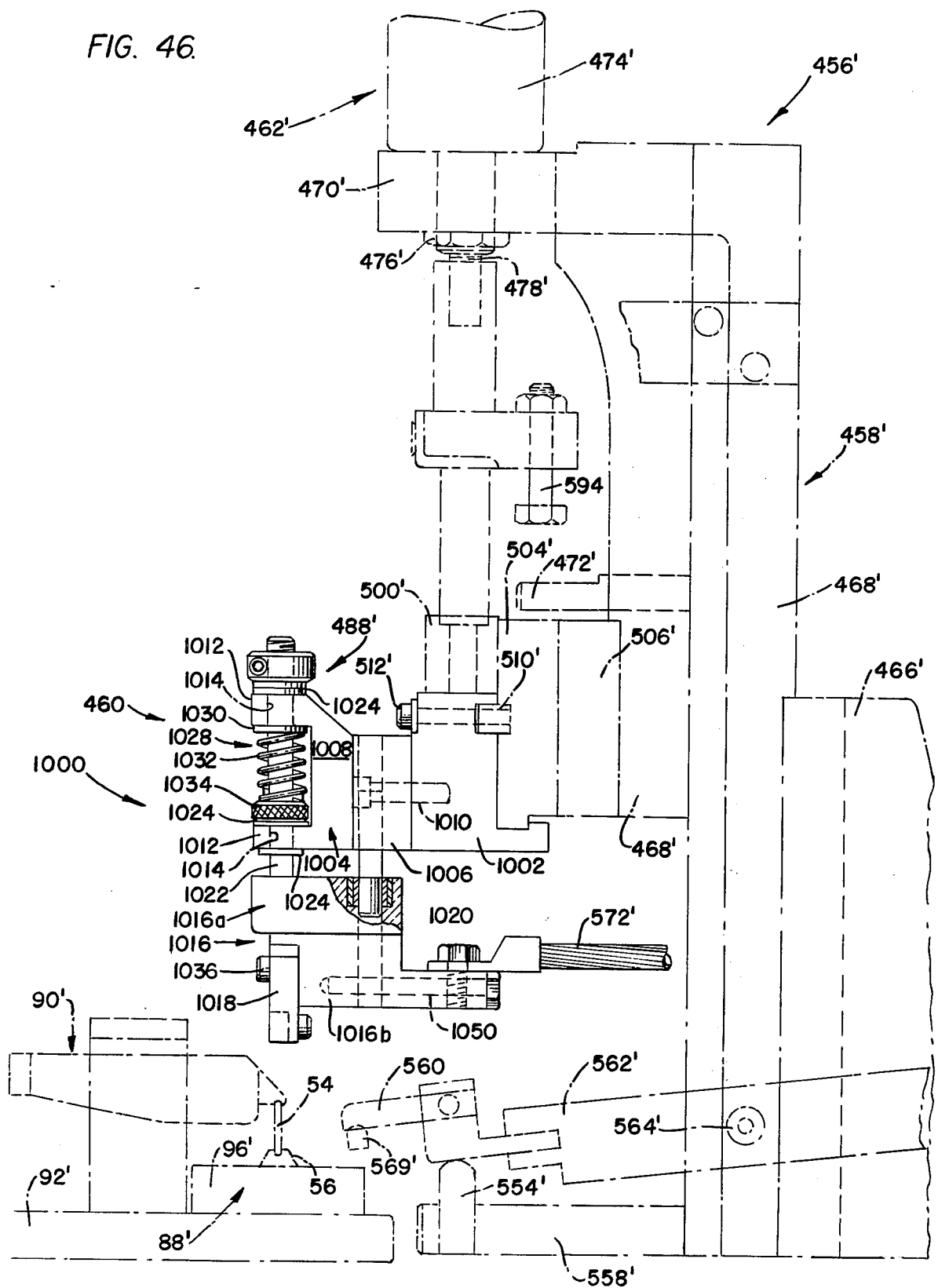
FIG. 46 is a side elevational view, partly in section, illustrating other aspects of the bonding apparatus as depicted in FIG. 45.

Bonding means 68' of this particular embodiment is best referred to in FIGS. 45 and 46 taken along with FIGS. 38 to 40. Generally, bonding means 68' as employed in the present embodiment is somewhat less complicated in construction and operation than bonding means 68. Although both function to apply heat to the shanks, bonding means 68' will not test for whether or not a ring shank is absent or misaligned or for the quality of heat applied. Since many of the components are structurally and functionally equivalent a detailed description of bonding means 68' is not required. However, to appreciate the simplicity of this bonding means 68', in the broader aspects of this invention, only those portions necessary for a description of its modified operation will be discussed in any great detail.

Bonding means 68' operates to automatically solder respective ones of aligned ring shanks 54 to the ring settings 56. Although only a pair of shanks and settings are to be soldered it is also within the spirit and scope of this invention to have other numbers of shanks and settings soldered together.

The bonding means 68' includes monitoring apparatus 454' and bonding mechanism 456'. Both are of a type which may be available from the Joyal Manufacturing Co. of Linden, New Jersey. Monitoring apparatus 454' controls the amount and duration of electrical current which is supplied to the bonding mechanism 456'. Such is done for purposes of regulating the soldered temperature or heat applied to the ring shanks 54 to achieve a proper bonded joint. Towards this end, apparatus 454' is connected to a suitable source of power as, for instance, a transformer (not shown). This embodiment is particularly adapted to advantageously solder delicate or small types of ring shanks and settings. Generally, in practice, a soldering operation as opposed to spot welding operation, especially for the smaller type jewelry rings requires less electrical current. With less current it has been determined that the lower temperatures do not seem to scorch the setting and shank about the joint. Accordingly, an even more aesthetic type of bonded joint for relatively smaller and more delicate type rings is obtainable from a solderered joint as opposed to a spot welded joint. In this embodiment as with the other embodiment, apparatus 454' applies current to the shanks and, therefore, the settings. Accordingly, the soldering operation is facilitated. The flow of current, however, is not conditioned upon bad or good signals from a shank testing station since there is none. The apparatus 454' has the current flow in response to the control means being actuated whenever the turret wheel 92' advances the trays 96' to such station.

Figure 41:
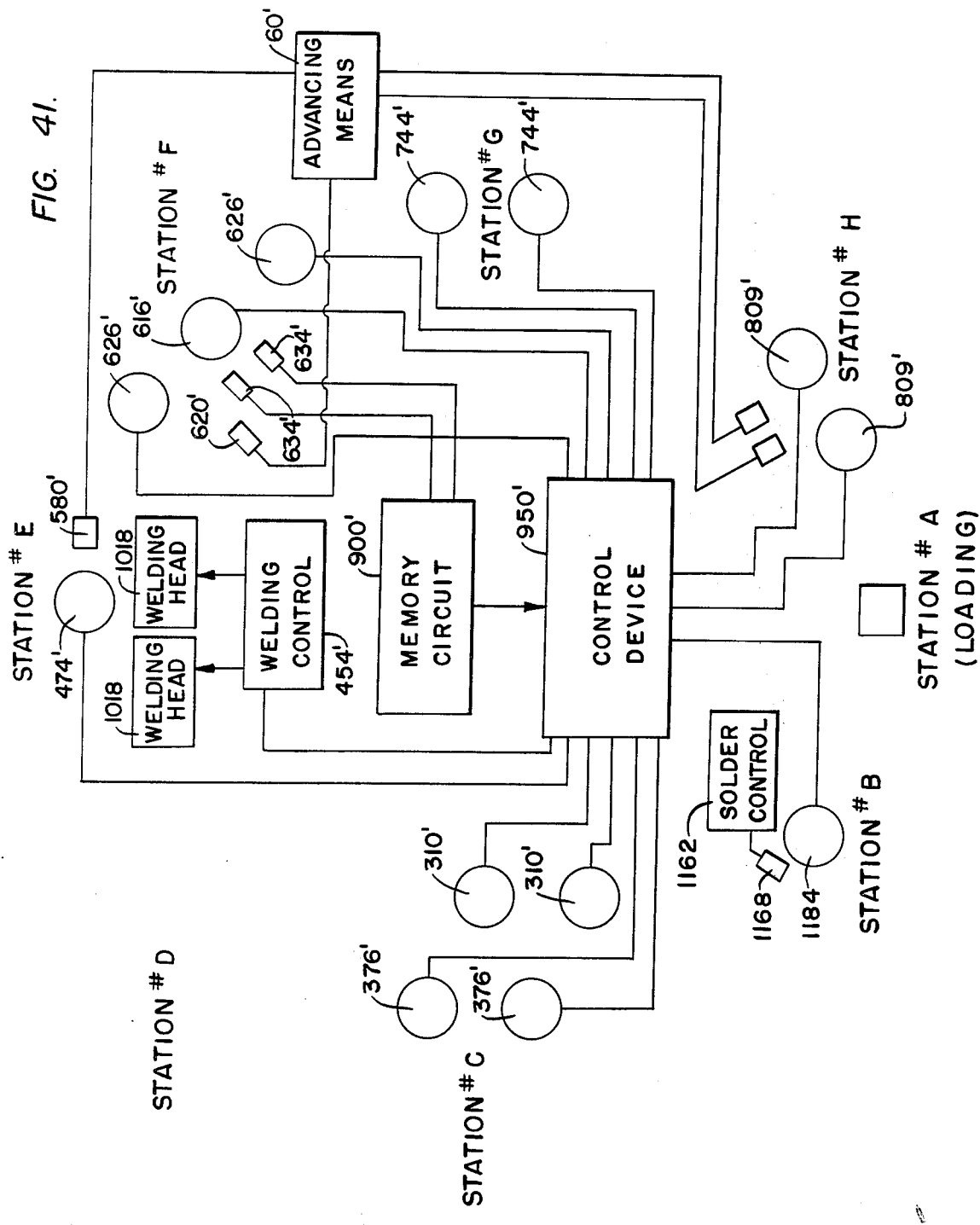
FIG. 41 is a schematic view illustrating in block diagram form the essential connections between micro switches, fluid motors, welding apparatus, memory circuit and control means of the instant invention.

The structural components and operations of the monitoring apparatus 454' are known and do not, therefore, form an aspect of this invention. Thus, the description to follow will primarily be concerned with only those components needed to gain a proper understanding of the bonding means 68' in its relationship with ring assembling apparatus 50', as well as to elaborate upon the simplified design of the bonding mechanism 456'. As best shown in FIG. 41 monitoring apparatus 454' is electrically connected to control means 950' in a known manner. In this arrangement the control means 950' will, whenever a pair of nests 96' are advanced by turret wheel 92' to bonding station E serve to appropriately actuate monitoring apparatus 454'. Upon actuation, electrical current is supplied in the proper amount regardless of whether the shanks and/or settings are present or properly aligned. Apparatus 454' is also used differently in that it does not transfer a signal to memory means 900' indicating whether or not the electrodes effect the desired bond or not since there are no micro switches similar to micro switches 588. Accordingly, there will not be any good or bad signals representative of bad or good soldered joints transmitted to the memory means 900'. Thus, such signals will not cooperate with either good parts removing means 72' or bad parts ejecting means 74' as they did in the other embodiment.

It should be pointed out that the bonding mechanism 456' is generally similarly constructed and operates in a like manner as mechanism 456' that is, to contact the shanks and supply the necessary heat in order to effectuate a bond between the ring shanks and settings. The differences between the two mechanisms will be subsequently touched upon. It should be noted that certain structures such as the pressure hoses and regulators have been omitted from the drawing for purposes of clarity. These structures are, however, utilized in this embodiment. Essentially, the differences between the two mechanisms relate to the electrodes and and manner by which they apply current to the shanks, and the absence of shank testing electrodes which indicate shanks. Although the bonding mechanism 456' actually performs a soldering operation between the shanks and setting operation, as opposed to a spot welding action, it nonetheless as earlier mentioned serves to supply the necessary heat to the shanks in response to electric current being supplied thereto As best shown in FIGS. 45 and 46, bonding mechanism 456' basically comprises stationary means 458', movable means 460', actuating means 462' and upper movement indexing means 464'. Stationary means 458' is basically defined by stationary frame member 466' fastened to supporting table 78' and includes a generally rectangular upstanding support 468' having a protruding platform 470' and abutment ledge 472'.

With continued reference to FIGS. 45 and 46 as well as FIGS. 38 to 40 it will be observed that actuating means 462' includes a double-acting fluid motor 474' and vertically reciprocal movable piston 478' of the character noted before. Motor 474 is detachably connected to platform 470'. Actuating means 462' also includes supply and exhaust lines 82' and fluid regulators 84', not shown, which selectively regulate the energization of motor 474' to reciprocate rod 478'. Reciprocation of rod 478', of course, moves movable means 460' between an upward, nonbonding, position, such as illustrated in FIG. 46, and a downward bonding position. In the bonding position movable means 460' which includes carrying means 486' and biased electrode means 1000 has the latter actually contact and supply a sufficient quantity of heat to the ring shanks 54 for effectuating soldering thereof with their respective settings 56.

Movable bonding means 460' comprises carrying means 486' and biased electrode means 1000. The electrode means 1000 is structurally different than electrode means 488 but essentially functions in the same manner to apply electric current to the shanks. The difference between structure will be subsequently discussed. Carrying means 486' is generally similar to carrying means 486 but differences do, however, exist which generally simplify the construction thereof. Biased electrode means 1000, as will be afterwards more fully described, is also differently constructed.

Carrying means 486' includes rod 490' which at one end is attached to piston rod 478' and at the opposite end is fastened to an upper horizontal switch bracket 492' through bolt arrangement 494'. In this manner, switch bracket 492' is conjointly movable with piston rod 478'. Upper bracket 492' also has a pair of generally flat lateral arms 496'. Bolts 498' surrounded by spacers 499' connect switch bracket 492' to mounting block 500'. The mounting block 500' is connected by bolts 502' to head support slide 504' (FIG. 46). Head slide 504' is suitably configured to be slidably movable with respect to stationary head support slide base 506'. Slide base 506' is suitably connected to base support 468'. Also, connected for simultaneous movement with head slide 504', is a pair of electrode support blocks 1002. Each electrode block 1002 is connected to head slide 504' by well-known type of keys 510', one on each side, and adjusting bolts 512'. Each bolt 512' extends through a laterally elongated slot 514' in a corresponding electrode support block 1002. Accordingly, block 1002 is laterally adjustable through manipulation of bolts 512', for known purposes. Consequently, electrode blocks 1002 are capable of movement in unison with mounting block 500'.

Referring to the new and modified structure denoted by the solid lines in FIGS. 45 and 46, it will be seen that electrode block 1002 has suitably connected thereto head support 1004. Head support 1004 with flange portions 1006 and support segment 1008 is affixed to block 1002 as by cap screws 1010. Each support segment 1008 has a bifurcated forward portion which defines spaced apart end portions 1012 having openings 1014 aligned with the other. The support segment 1008 is made of a suitable electrical insulating material.

Electrode means 1000 of this embodiment includes a pair of spaced apart electrode holder units 1016 having upper and lower units 1016a and 1016b which serve to hold individual pivotal electrodes 1018. A more detailed description of the electrodes 1018 will be presently mentioned. A guide pin 1020 is slidably associated between each holder 1016 and head support 1004. The guide pin 1020 has a free end slidably received within an insulated aperture (not shown) formed in support holder unit 1016. By reason of the foregoing structural arrangement electrode holder 1016 is movable relative to head support 1004 for well-known purposes.

This embodiment, instead of having a pair of inner and outer electrode shafts 528 and 530 as did the other embodiment, has only a single electrode shaft 1022 extending through aligned openings 1014 of each head support means 1004. The lower ends of the shafts 1022 are fixedly attached to respective ones of each of electrode holder units 1016. In each opening 1014 are fit appropriate conventional type insulated bushings indicated generally by reference numeral 1024. Bushings 1024 permit sliding movement of the shafts 1022 for known purposes. The upper ends of each shaft 1022 are not coupled to an opening in a mounting bracket as in the other embodiment.

Compression means 1028 as shown in FIGS. 45 and 46 is associated with each shaft 1022 to provide a generally downward biasing force on each of the electrodes 1018. The compression means 1028 is defined by washer 1030, compression spring 1032, and spring retaining nut 1034. Spring 1032 is disposed between washer 1030 and retaining nut 1034. Nut 1034 is threadedly adjustable on shaft 1022. The above compression means 1028 is similar to compression means 540. Whenever the electrodes 1018 intimately engages opposite sides of the shank, shafts 1022 are permitted to rise relative to support member 1010 but yet provide a bias force on the electrodes 1018 to ensure the firm engagement thereof. Consequently, a positive contact is provided between shank 54 and compression means 1028. That cooperation serves to facilitate an improved soldering of the shanks to the settings. Moreover, this yielding type of action acts to prevent the electrodes 1018 from being undesirably forced down to such an extent that the shanks 54 may be displaced from proper alignment during the downward motion thereof and during bonding.

Bonding mechanism 456' as with mechanism 456 also includes elongated actuating rod 548', compression spring 550', insulating sleeve 552', jacuzzi arm 554', bolt 556', jacuzzi pivot rod 558', grounding electrode device 560', pivot member 562', pivot shaft 564', grounding electrodes 569'. The foregoing elements and their interconnection and operation have been previously described in the earlier noted embodiment. Since they essentially operate in the fashion detailed above and do not by themselves form an aspect of this embodiment, a further description thereof is not deemed pertinent. Suffice it to say, however, that they serve to oscillate the grounding electrodes 569' between their non-grounding position, away from tray 96' to their grounding position contacting tray member 96'.

Turning now to FIGS. 45 and 46, electrodes 1018 of this particular embodiment will be best observed. As mentioned electrodes 1018 physically contact opposite sides of each shank 54 adjacent the respective joints between the shank and setting. Each electrode 1018 is pivotally connected as at 1036 to the lower electrode holder 1016b. The pivotal movement permits the compensation for slight misalignments between the shank and pivotal electrode 1018. Stop pins 1038 project from the face of electrode holder 1016 and act to limit uncontrolled pivotal movement of electrode 1018. Since both electrodes 1018 are substantially similar only one will be described for purposes of the detailed description.

Basically, the electrode 1018 includes a looped intermediate section with laterally extending contact projections 1040 and a generally inverted triangular shaped cutout area 1042 having inclined contacting surfaces 1044 for engaging the ring shanks 54. A pair of channel defining flat plates 1046 with inclined edges 1047 are fastened to the contact projections 1040, as by cap screws. As viewed from the drawing, inclined edges 1047 are generally parallel to and extend beyond surfaces 1044. Accordingly, plates 1046 in combination define channels which are sized to snugly accommodate therein various ring shank sizes as well as to apply equal, opposite and inwardly directed pressure thereto during the soldering. Such arrangement provides for a versatile and positive type of force transmitting device which also maintains the shanks in proper alignment and firm engagement during the soldering.

Braided bars 572' are connected to each lower holder 1016 for supplying electricity from monitoring apparatus 454' to electrodes 1018 to permit the latter to perform their intended function. Electrode holders 1016 and electrodes 1018 may be kept from becoming excessively hot by reason of a cooling medium being continuously forced from a suitable source through passages 1050 formed in electrode holders 1016. Consequently, the electrodes 1018 will not overheat during a protracted period of operation.

Particularly referring to FIG. 45 together with FIG. 41, bonding mechanism 456' includes upper index switch means 464' which includes micro switch 580' and switch actuating bolt 582'. Micro switch 580' is connected to lateral plate 584' which, in turn, is affixed to a side of support frame 468'. Micro switch 580' is positioned to be contacted and actuated by actuating bolt 582' whenever carrying means 486' returns to its upwards or non-bonding position after a particular soldering operation. Actuating bolt 582' is threadedly fastened to a lateral arm 496' and is vertically adjustable with respect thereto. Lead wire 586' electrically interconnects micro switch 580' with the advancing means 60' in a known manner, for indicating that the soldering operation has been completed and that the electrodes 1018 have been suitably raised above the working nests 96' to their inoperative or non-bonding position. Should the switch 588' not be actuated, then the advancing means 60' will inhibit movement of the turret wheel 92'. At any rate, the flow of current to electrodes 1018 has ceased by reason of monitoring apparatus 454' cutting off such current after a preselected time and the turret wheel 92' is free to be sequentially indexed to another successive position upon the switch 588' being contacted.

The present embodiment does not have lower limit switch means 578. As shown in FIGS. 45 and 46, bracket 500' has adjustably connected thereto stop bolt 594' which abuttingly contacts with stop ledge 472' to positively limit and permit regulation of downward movement of carrying means 486'. Moreover, stop 594' serves to enable height adjustment of electrodes 1018 above the tray members 96'. Through this adjustable relationship ring shanks 54 of varying heights can be suitably accommodated for by merely varying the spacing of electrode heads 1018 with respect to the tray member 96'.

After having explained the above constructional arrangement of bonding means 68', it is believed that operation thereof is self-evident especially since such is substantially similar to the aforenoted bonding means 68. However, to supplement a description of bonding means 68', it will be understood that whenever fluid motor 474' is energized by control means 950', piston rod 490' moves downwardly. As this occurs, of course, the turret wheel 92' is stopped. Conjointly with downward movement of the piston rod 490', micro switch bracket 500', head slide 504', support block 1002, head support 1004, electrode holder units 1016, electrodes 1018, and actuating bolts 592' also move downwardly. Additionally, actuating rod 548' will move downwardly to cause grounding electrode elements 569' to contact respective tray members 96'. The downward movement of electrodes 1018 stops whenever the ring shanks are engaged. Shanks 54 are engaged by electrodes 1018 before stop bolt 594' strikes ledge 472' for providing a sufficient downward pressure on the shanks 54 ensuring a positive engagement between shanks and settings. By reason of the channels formed in electrodes 1018 the position of the shanks 54 is properly maintained and suitable forces applied thereto. Continued downward movement is arrested by ledge 472'.

After the noted soldering operation control means 950' energizes fluid motor 474', to raise carrying means 486', electrodes 1018 and mounting bracket 500' to their upper inoperative positions. Also, the monitoring apparatus 454 stops flow of current to the electrodes 1018. As indicated, actuating bolt 582' will engage and actuate micro switch 580' to generate a signal which is transmitted by lead 586' to advancing means 60'. Thereafter, the turret wheel 92' once again is able to be incrementally rotated by the advancing means 60' to successively advance the trays 96' to their next stations. The monitoring means 454' is not adapted to indicate whether a particular soldered joint is satisfactory to unsatisfactory and, therefore, does not provide suitable signals to the memory means 900' for indicating good or bad bonded joints. Thus, there will not be any signals forwarded to the bond testing means 70', good parts removing means 72' or bad parts ejecting means 74'. Accordingly, only the bond testing means 70' which will be discussed presently, is effective to indicate the existence of a good bond or not. Moreover, since there are no micro switches 588 there will not be generated the good or bad signals representing the presence of absence of shanks as in the earlier embodiment. It is also contemplated that monitoring apparatus 454' may be of the type which will give signals of bad or good soldered joints. The invention visualizes, moreover, that switches similar to micro switches 588 could be used so as to initiate flow of current to an electrode in response to presence of the shank.

Although the foregoing described modified bonding means 68' has been preferred for use in conjunction with this embodiment, other types and kinds of bonding means, such as that mentioned earlier in connection with the other embodiment, may be applied in association with assembly apparatus 50' without departing from the spirit and scope of this invention.

As noted in FIGS. 38 and 40 bonding means 68' also comprises tilting means 596'. Tilting means 596' serves to move the pivot arms of the shank holding means 90' from their horizontal position at bonding station E to a generally upward pivoted position, as turret wheel 92' advances to the bond testing station F. In this manner, as will become subsequently evident, the bonded shanks 54 can have tensile forces applied thereto to ascertain the adequacy of the actual bonding between the shanks and settings. Accordingly, for this to occur, there cannot be downward forces on the shanks as applied by the arms. As best shown in FIG. 38, the tilting means 596' may include a vertical support arm 597', lateral support arm 598' and inclined tilting plate 599'. The tilting plate 599' is flat and angularly fixed with respect to arm 597' as in the manner illustrated in FIG. 38. Such plate 599' is positioned to be in the path of movement of the camming member of shank holding means 90'. Whenever the turret wheel 92' is rotated to its next successive station, camming members of the shank holding means 90' will make contact with the plate 599'. During continued rotational movement, tilting plate 599, as in the other embodiment, will act to force the pivot arms upwardly. The instant embodiment, of course, envisions that other types of arrangements can be emplpoyed for tilting the pivot arms upwardly from the horizontal to inclined or upward positions for permitting bond testing to be performed.

BOND TESTING MEANS

Bond testing means 70' at station F of the present embodiment, is generally shown in FIGS. 38 to 40 and is substantially similar to the bond testing means 70. Accordingly, a detailed description thereof is not forthcoming. It will be further understood, of course, that since the structural arrangement of the bond testing means 70' is substantially similar to that of bond testing means 70, except for the differences hereinafter enumerated, it will operate in substantially the same way. As a consequence thereof, those shanks 54 and settings 56 which are joined together at bonding station E will be subject to separating tensile forces at station F. Therefore, shanks 54 and settings 56 will separate should the bonded or soldered joints between them possess insufficient strength.

Briefly described, however, bond testing means 70' includes testing support means 600', testing carriage movement means 602', and tensile force applicating means 604'. The carriage movement means 602' essentially includes sliding block 614', fluid motor 616' and piston rod 618'. Force applicating means 604' basically comprises force actuating means 626', fluid motors 628' and defect signal means 634'. As clearly shown in FIG. 41, defect signal means 634' is depicted as being operatively connected to the monitoring means 900' for purposes subsequently made evident. Index switch 620' is suitably electrically connected to advancing means 60' to permit the same to advance the turret wheel 92' after the movement means 602' reaches the inoperative position and the force actuating means 626' is safely away from the turret wheel.

It should be pointed out that in this version of the bond testing means 70', the tensile force applying means 604' does not include a ring probe means such as probe 642 of force applying means 604 of the former described embodiment. Accordingly, whenever the tensile testing means 604' is at the operative testing position, signals which would have indicated either the presence, absence of misalignment of a ring setting will not be transmitted to the monitoring means 900'. In this particular manner, there will be an absence of signals forwarded to the good parts removing means 72' and bad parts ejecting means 74'. Accordingly, an even more simplified arrangement is provided.

It will be apparent that since in this embodiment the bonding means 68' has been modified as indicated above, actuation of the tensile force applicating means 604' will not be conditioned upon the corresponding good or bad signals generated by monitoring apparatus 454' in response to either the existence of good or bad soldered joints or micro switches simular to micro switches 588 of the other embodiment indicating the presence of absence of ring shanks. Consequently, there are no good or bad signals generated at bonding station E. Although conventional monitoring apparatus 454' is employed in association with ring assembly apparatus 50', the noted conventional monitoring apparatus 454, if desired, may also be successfully used. In this latter case, there would be generated corresponding good or bad soldered joint signals. Also, signals indicating the presence of absence can be provided if micro switches similar to 588 are added. The noted signals would be forwarded to the tensile force applicating means 604' and used in the manner indicated earlier for force applicating means 604.

Other than the formerly noted changes to the structure and operation of bond testing means 70', it remains substantially the same as bond testing means 70. Hence, the operation thereof will be substantially the same. To briefly understand the operation of bond testing means 70' reference will be made to FIGS. 38 to 40 as well as FIGS. 24 to 27. Although FIGS. 24 to 27 represent the structure of bond testing means 70 reference is made thereto since the structure is similar to bond testing means 70' with, of course, the notable exception of the ring probe means 642. As noted, ring probe means has been omitted from this embodiment to make it even more simple in operation.

In operation, bond testing means 70' is adapted to be actuated each time the turret wheel 92' is suitably indexed. To this end, main control means 950' will energize the fluid motor 616' to advance the sliding block 614' inwardly towards the turret wheel 92' and, thus, to the operating position. Whenever in this position the force actuating means 626' including the fluid motor 628' and jaw means associated therewith will be operated. The jaw members similar to jaw member 644, more clearly depicted in FIGS. 24 to 27, are inserted within openings formed by the shank and setting. The fluid motors 628' whenever actuated will cause the corresponding pairs of jaw members to apply tensile forces to the respective pairs of ring shanks and settings. It should be remembered that should the shanks be unsoldered or inadequately soldered the defect signal means 634' associated with the defective shank is energized in response to pivotal movement of one of the jaw members. In turn, the actuated defect signal means 634' transmits its signals to monitoring means 900' for further use in controlling the operation of good parts removing means 72' and bad parts ejecting means 74' as will be presently explained.

In the first embodiment, operation of the fluid motors 628 was conditioned upon the presence of only good type signals originating from bonding means 68 indicating a shank and good bond. In this embodiment fluid motors 628' will always be operated inasmuch as there are no good or bad signals to be transferred to the monitoring means 900' from bonding means 68' to prevent in a known manner main control means 950' from energizing fluid motors 628'.

In connection with the foregoing, should defect signal means 634' be actuated, indicative of a bad bond, then good parts removing means 72' will not be operated, to the extent that it would attempt to remove the badly soldered shank and setting from the particular tray or trays carrying the unsoldered shank or the defectively soldered ring. On the other hand, the signal from defect signal means 634' will have an effect on bad parts ejecting means 74' so as to remove shanks and/or settings in a fashion to be subsequently set forth.

After completion of the tensile testing operation the fluid motors 628' are appropriately energized to return the jaw members to their non-testing position. In addition, the fluid motor 616' is activated to return sliding block 614' to the inoperative position. Upon return, the index limit switch 620' is contacted and serves to indicate the bond testing means is in the inoperative position and permits the turret wheel 92' to be again indexed. Thus, the trays are carried to the operating station F. From the foregoing, it is believed there is a clear understanding of the operation of bond testing means 70'.

GOOD PARTS REMOVING MEANS

Good parts removing means 72' can, likewise, be best viewed in FIGS. 38 to 40. Essentially, it is the structural counterpart of good parts removing means 72. Therefore, it will only, where necessary, be briefly described below. Similarly good parts removing means 72' operates in the fashion indicated above for good parts removing means 72', that is, to selectively remove satisfactorily soldered rings from the nests.

The complete operation of good parts removing means 72' will be somewhat modified in view of the fact that there have been the several above changes to ring assembly apparatus 50'. The following description will, therefore, highlight operation of good parts removing means, particularly from the standpoint of describing its operation.

In the brief description to follow, reference is also made to drawings of FIGS. 29 and 30 since both good parts removing means are structurally similar.

Referring, in particular, to FIGS. 38 to 40, good parts removing means 72' includes translating means 700' with mounting block 702'. Such block 702' is continuously movable between a forward pick-up position P—P and a rearward, releasing position R—R, see FIG. 40. Additionally, good parts removing means 72' includes transporting means 704' which is rigidly connected to mounting block 702' for conjoint movement therewith. Transporting means 704' comprises supporting means 706', grasping means 708', and grasping actuating means 710' having a pair of energizable fluid motor 744' which actuate grasping means 708' for grasping selective ones of the successfully soldered rings. Translating means 700' further includes translating driving or pick and place mechanism 712', which is similar to the pick and place mechanisms 228 and 712. Therefore, translating means 700' serves to displace the mounting block 702' in a fashion to basically follow the same pattern of movement of the mounting block 392 illustrated in FIGS. 6 and 15. Accordingly, mounting block 702' vertically rises from the pick-up position P—P, after the good rings are grasped by transporting means 704', to a predetermined vertical height above the turret wheel 92', then retracted longitudinally rearwardly away from turret wheel 92' until positioned over the conveyor means 714', and finally descends towards conveyor means 714' until it reaches the rearward and lowermost releasing position R—R. Transporting means 704' whenever in the releasing position R—R will be operated so that the good or completed rings 52 will drop onto conveying means 714' to be subsequently carried away.

At this particular junction, it is apparent that conveying means 714' functions to convey the good rings 52 from beneath the release point R—R at good parts removing station G to a receptable 754'. Of course, the invention envisions that other alternate conveying embodiments may be realized for the purpose of serving to convey the good rings from beneath the good parts removing means 72'. Although not shown, such invention encompasses within its purview the utilization of the same or other similar conveying devices for removing bad parts from the bad parts removing station H.

It will be realized that the operation of good parts removing means 72' is similar to that of good parts removing means 72 with the exception that it operates in response to different input signals. Accordingly, selective energization of fluid motors 744' by valve control means 950' is achieved as a result of signals having been transmitted thereto, in known fashion, from monitoring means 900'. Motors 744' will be operated only in the event good signals are transmitted by bond testing means 70'. The so-called bad signals, of course, will not actuate the motors 744', but, rather, will actuate bad parts ejecting means as will be later described more fully. Whenever the motors 744' are appropriately actuated they will sequentially pick up the unitary soldered ring 52 from the nest 106' at position P—P and, thereafter, deposit the same at position R—R onto conveying means 714'. It should, of course, be once again realized that the individual bad or good signals associated with the respective nests 106' and generated by bond testing means 70' will be correspondingly transmitted to the appropriate fluid motor 744' so as to be correctly associated with the nests carrying the good or defectively bonded shanks and settings.

It is, of course, also realized that in the present embodiment the only bad signals transmitted to good parts removing means come from bond testing means 70' insofar as bad signals are no longer generated by bonding means 68'.

After completion of the picking up and release of the good rings, if any, from the trays 96', situated at good parts removing station G, the turret wheel 92' is indexed so that the nests located at good parts removing station G are suitably advanced to bad parts ejecting station H.

BAD PARTS EJECTING MEANS

Bad parts ejecting means 74' is shown in FIGS. 38 to 40 and correspond structurally and operationally to bad parts ejecting means 74. Since both embodiments are structurally the same, reference may also be had to FIGS. 32 to 36 to supplement the following brief description. Likewise, both ejecting means 74 and 74' operate in the same fashion depending, of course, on whether or not good or bad type signals are transmitted to the bad parts ejecting means 74' for selectively removing unbonded or defectively bonded ring settings and/or shanks. It is understood that, in certain circumstances, shanks may possibly be picked up.

As depicted, ejecting means 74' comprises framing means 766', motion producing means 768', motion transmitting means 770', pair of lifting means 772', ejecting means 773', and switch sensing means 774'. Should good signals be transmitted to bad parts ejecting means from the bond testing means 70', then lifting means 772' will not be actuated, since there are no unbonded shanks and/or settings in the nests 106'. Alternatively, should bad signals be transmitted from bond testing means 70' to the bad parts ejecting means 74', representative of the unbonded or defectively bonded shanks and/or settings, then the lifting means 772' will be actuated. The operation of bad parts ejecting means 74' including lifting means 772' is the same as with bad parts ejecting means 74. Hence, the operation of such components is believed evident from the foregoing description in the other embodiment.

The differences which do, however, exist in the operation of bad parts ejecting means 74' are primarily a result of the signals which serve to selectively energize lifting means 772'. In the earlier embodiment, the lifting means 772 may have been energized by bad signals emanating from bonding means 68 and bond testing means 70, whereas, in this embodiment, the energization of lifting means 772' results from bad signals originating from bond testing means 70'. The switch means 774' is operated in a manner to be described.

OPERATION

The preceding description of ring assembly apparatus 50' taken in conjunction with the general description of ring assembly apparatus 50 is believed to make evident the operation thereof. To further such understanding, reference is also made to FIG. 41 together with FIGS. 38 to 40 and 42 to 46. In FIG. 41, there is presented in block diagram form, a diagrammatic showing of the interrelationship between several operating components of this embodiment.

It should be pointed out that the pressurized fluids used in each of the respective operating stations B, C and E to H are from a suitable source, not shown but well known. Additionally, in well known fashion, the double-acting fluid motors used throughout the embodiment are operatively interconnected to control means 950' and the cam timer (not shown) of the latter operates the valves of the various fluid motors. Also the cam timer operates the monitoring means 454'. Control means 950' is the same conventional and suitable type device as control means 950. Therefore, a detailed description as to its construction and operation is believed to be evident. Monitoring means 900', as monitoring means 900, may be defined by the same suitable and conventional form of electronic memory system including electronic shift registers. Hence, a detailed description of its operation is believed to be unnecessary in view of the foregoing description of monitoring means 900.

Generally briefly, the sequence of operation of ring assembly apparatus 50' will be in the following manner. At the loading station A an operator or perhaps an automatic ring setting placing unit which is envisioned within the broader aspects of this invention can be utilized to place ring settings 56 in the individual nests 106'. Upon incremental rotation of turret wheel 92', in step-by-step fashion, the pair of nests 106' are advanced from loading station A to bonding agent applicating station B.

At this particular station, the valve control means 950' functions to energize fluid motor 1184 so that the solder applicating needles 1160 are downwardly displaced to their operative positions. During such downward displacement, the switch 1168 is actuated to correspondingly actuate bonding agent dispensing means 1110 to apply to the settings a measured amount of solder material necessary to ensure a strong and satisfactory joint of the type indicated above. In this embodiment, bonding agent applicating means 1100 does not provide any signals indicative of whether or not a particular nest 106' is lacking a ring setting 56 such as did ring setting testing means 62. Accordingly, there will be an absence of either good or bad signals from station B which would otherwise serve to cooperate, in a manner to be mentioned, with ring shank placing means 64'. Thus, after the solder has been applied and the applicating needles 1160 returned to their normal inoperative position, the turret wheel 92' is once again indexed to move nests 106' to the shank placing station C.

Whenever the nests 106' are positioned at shank placing station C the shank placing means 64' will be operated to place a pair of ring shanks on the settings. It will be appreciated, however, that, while in the previous embodiment placement of the shank was selectively dependent uponr the existence of a present and properly aligned setting, there is no such requirement in the instant embodiment. In this regard, it will be recalled that bonding agent applicating means 1100 does not transmit signals indicative of the presence or absence of good settings. Thus, it will not affect the operation of shank placing means 64'. Accordingly, the control means 950' will energize the fluid motors 310' and 376' associated with ring shank placing means 64'. As a consequence thereof, the shanks 54 will always be raised to the grasping position and grasped by shank carriage means 226' to be later properly placed on the settings 56 so that the open ends contact solder. Should the shanks 54 not contact the settings 56 and, therefore, not be aligned or present, as in the situation, for example, where settings are absent or where the shanks are not being properly fed, then such situation will be only detected at bond testing station F. As recalled in the earlier described embodiment, such shank and/or setting absence of misalignment testing would occur at setting testing means 62, shank testing means 66, bonding means 68 and bond testing means 70. Upon completion of the shank placing operation at station C, turret wheel 92' is once again indexed to station D. At this particular station, no operations are performed on the shanks and/or settings. As recalled, a ring shank testing means is not employed, although conceivably such could be utilized.

At the conclusion of the preceding operational indexing step, the turret wheel 92' is again indexed, such that the pair of nests 106' at station D is consecutively advanced to bonding station E. As indicated, bonding means 68' applies appropriate heat to solder together the shanks and settings to form a unitary ring. Towards this end, the control means 950' energizes motor 474'. As a result thereof, the pair of electrodes 1018 are displaced to their lowermost position and function to securely and snugly accommodate and apply heat to the ring shanks. During the foregoing operation, besides motor 474' being energized by the control means 950', the monitoring apparatus 454' is actuated to serve the purpose of energizing electrodes 1018. Consequently, the electric current is transferred for a predetermined duration to the shanks 54 to effectuate the soldering operation. Such electric current will be supplied to the electrodes 1018 during each indexing step of turret wheel 92' regardless of the absence or misalignment of ring shanks. As noted, the electrodes 1018 contact the shanks 54 and the heat generated thereby brings about the desired soldering action. After the soldering is accomplished, the motor 474', in preselected fashion, is again operated to raise electrodes 1018 to their inoperative position. During such movement, the index safety switch 580' is activated to forward a signal to the advancing means 960' to permit the index wheel 92' to rotate. Thereafter, the turret 92' successively indexes the nests 106' to the bond testing station F.

At bond testing station F, the control means 950' is operable to actuate the fluid motor 616' to move the jaw members 640' to their operative position, whereby individual fluid motors 626' are then actuated. Since there are no bad signals to be transferred by welding control apparatus 454' the fluid motors 626' will always operate for each indexing step notwithstanding the possibility of the absence of shanks and/or settings at a particular nest 106'. As mentioned, the jaw members serve to apply tensile forces to those shanks 54 which should have been soldered. If the soldered joints between shanks and setting fail or there is no setting and/or shank in the nests 106' then the jaw members will move sufficiently to actuate one or both of the defect sensing means 634'. In this manner, there is transferred to monitoring means 900' signals representative of bad or no bonds. If the bond is good, of course, defect sensing means 634' are not actuated and good signals are passed to monitoring means 900'. As mentioned, such signals keep track with the respective nests 106' as the latter are indexed to the next position. As will be explained presently, the good and bad signals will appropriately and respectively activate the good parts removing means 72' and bad parts ejecting means 74'. At the conclusion of the tensile testing operation by the jaw members fluid motor 616' is operated so that block 614' and the jaw members return to their non-operating position, whereby switch 620' is actuated. Switch 620' signifies to advancing means 60' that the slide block 614' and jaw members are returned to thereby enable the turret wheel 92' to be indexed.

The turret wheel 92' successively advances the nests 106' to good parts removing station G, whereat the good parts removing means 72' will, whenever appropriately energized, remove the good rings 52. To this end, the fluid motor 744' associated with respective ones of grasping means 708' will be actuated in accordance with a good signal transferred thereto from the monitoring means 900'. Such signal, as noted, originates from bond testing means 70'. Each grasping means 708' grasps the successfully bonded shank and setting from the nests 106'. The translating means 700' serves to carry the rings 52 to releasing position R—R over the conveying means 714'. At this point, fluid motors 744', associated with the nests 106' carrying the good rings, are operated by the control means 950' in known fashion to release rings 52 onto the conveying means 714 for subsequent conveyance.

It will be recognized that whenever a bad signal is entered into monitoring means 900' at bond testing means 70' indicative of a bad bond or no bond for a particular nest 106' the motor 744' associated with the nest 106' carrying the defectively bonded or unbonded shank and/or setting will not be actuated. Hence, the appropriate grasping means 708' are not operated.

At the cessation of the preceding removing operation, the turret 92' is again incrementally rotated in step-by-step fashion to situate the nests 106' at the bad parts ejecting station H. In regard to bad parts ejecting station H, the bad parts ejecting means 74' is appropriately operated to remove the unsuccessfully soldered settings and/or shanks. To this particular end, respective ones of the fluid motors 809' will be operated in response to the noted bad signals from bond testing means 70'. As a consequence, motion transmitting means and lifting means 770' and 772' will be moved to their operative lifting position whereby the lifting means 772' cooperates with the non-bonded setting or defectively bonded setting from the corresponding nest 106'. Once in the operating position, the selected motors 809' are operated to retract the lifting means 772' to the inoperative position. During this return operation the ejecting means 773' comes into contact with the lifted defective settings and shanks to cause the latter to be removed from such lifting means. Also during this return movement the index limit switch associated with each motor 809' and which cooperates with the advancing means 60' is operated to give an indication as to the fact that lifting means 772' has returned to the inoperative position. Consequently, the turret wheel 92' is indexed to displace the nests 106' to the loading station. The good and bad signals will be appropriately erased. As is believed evident the nests 106' should be empty of any settings and ready for placement of new settings. Thus, an entire cycle of operation is complete.

It will be understood that if a good signal has been generated by bond testing means 70' it is transferred to monitoring means 900'. Monitoring means 900', as noted, controls the control means 950' to prevent energization of the individual fluid motor 809' corresponding to the nest with which the good signal is associated. Consequently, the ring and unbonded or partially bonded shanks 54 will only be removed from the nests in response to actuation of motors 809' by bad signals.

From the foregoing considerations, it will be readily appreciated that ring apparatus 50' enables the automatic, continuous, reliable and simple high speed assembly of jewelry type rings especially of the relatively smaller and more delicate type. As indicated above, the solder forms part of the joint and does not result in a bonded joint having bonding imperfections. Moreover, this latter described preferred embodiment is even more simplified in construction and operation. Although smaller and delicate rings may be successfully bonded, certainly other relatively larger and heavier ring components may be joined together.

Although the preceding descriptions were primarily concerned with joining ring shanks to ring settings, it will, of course, be appreciated that other joinable members may be bonded or otherwise joined together in a unitary type member without departing from the spirit of this invneiton.

While the invention has been described in connection with the foregoing embodiments, it is not intended to limit the invention to the particular forms set forth above, but, on the contrary, it is intended to cover such alternatives, modifications, and equivalents as may be included within the spirit and scope of the invention as defined by the appended claims.

What is claimed is:

1. An apparatus for automatically assembling seriatim a ring from a ring shank and ring setting comprising:

apparatus supporting means;

advancing means operatively connected to said supporting means for supporting at least one work holding means which includes a nest member adapted for releasably holding said ring setting, and for successively and incrementally advancing said work holding means from a loading station to and through a plurality of discrete working stations, including ring shank placing station, bonding station, and bond testing station;

ring shank placing means located at said ring shank placing station for selectively placing said ring shank on the ring setting, said ring shank placing means including ring shank feeder means including a vibrating parts feeder having an exit ramp for receiving one after another a continuous succession of ring shanks discharged from said vibrating parts feeder and supporting said ring shanks throughout an elongated length of said exit ramp, track means connected to and supported by said apparatus supporting means, said track means being arranged to cooperate with said exit ramp for enabling said ring shanks to pass thereon from said track means, ring shank control means including indicating means operatively connected across said track means for indicating when a predetermined quantity of ring shanks has been received by said track means and arresting means being actuatable by said indicating means for directing a stream of fluid pressure onto said exit ramp to prevent the passage of ring shanks to said track means, ring shank lifting means operatively connected to said apparatus supporting means for selectively lifting an individual one of said ring shanks from said track means and locating each said ring shank to a position to be grasped, and ring shank carriage means movable from said position at which it grasps said ring shank to a position at which said ring shank is adapted to be placed in said ring setting;

bonding means situated at said bonding station for selectively bonding the ring shank to the ring setting to form said ring; and bond testing means situated at said bonding station for indicating good and bad bonds.

2. An apparatus for automatically assembling a ring from a ring shank and ring setting comprising:

apparatus supporting means;

advancing means operatively connected to said supporting means for supporting at least one work holding means which includes a nest member adapted for releaseably holding said ring setting, and for successively and incrementally advancing said work holding means from a loading station to a plurality of discrete working stations, including ring shank placing station, bonding station, bond testing station, and good parts removing station;

ring shank placing means located at said ring shank placing station for selectively placing said ring shank on the ring setting, said ring shank placing means including ring shank feeder means including a vibrating parts feeder having an exit ramp for receiving one after another a continuous succession of ring shanks discharged from said vibrating parts feeder and supporting said ring shanks throughout an elongated length of said exit ramp, track means connected to and supported by said apparatus supporting means, said track means being arranged to cooperate with said exit ramp for enabling said ring shanks to pass thereon from said track means, ring shank control means including indicating means operatively connected across said track means for indicating when a predetermined quantity of ring shanks has been received by said track means and arresting means being actuatable by said indicating means for directing a stream of fluid pressure onto said exit ramp to prevent the passage of ring shanks to said track means, ring shank lifting means operatively connected to said apparatus supporting means for selectively lifting an individual one of said ring shanks from said track means and locating each said ring shank to a position to be grasped, and ring shank carriage means movable from said position at which it grasps said ring shank to a position at which said ring shank is adapted to be placed in said ring setting;

bonding means situated at said bonding station for automatically bonding the ring shank to the ring setting to form said ring;

bond testing means situated at said bonding station for indicating good and bad bonds; and good parts removing means situated at said good parts removing station for selectively removing each ring satisfactorily tested by said bond testing means.

3. An apparatus for automatically assembling rings from ring shanks and ring settings comprising:

apparatus supporting means;

advancing means operatively connected to said supporting means for supporting at least one work holding means which includes a nest member adapted for releasably holding said ring setting, and for successively and incrementally advancing said work holding means from a loading station to a plurality of discrete working stations, including ring shank placing station, ring shank testing station, bonding station, bond testing station, good parts removing station, and bad parts ejecting station;

ring shank placing means located at said ring shank placing station for selectively placing said ring shank on the ring setting, said ring shank placing means including ring shank feeder means including a vibrating parts feeder having an exit ramp for receiving one after another a continuous succession of ring shanks discharged from said vibrating parts feeder and supporting said ring shanks throughout an elongated length of said exit ramp, track means connected to and supported by said apparatus supporting means, said track means being arranged to cooperate with said exit ramp for enabling said ring shanks to pass thereon from said track means, ring shank control means including indicating means operatively connected across said track means for indicating when a predetermined quantity of ring shanks has been received by said track means and arresting means being actuatable by said indicating means for directing a stream of fluid pressure onto said exit ramp to prevent the passage of ring shanks to said track means, ring shank lifting means operatively connected to said apparatus supporting means for selectively lifting an individual one of said ring shanks from said track means and locating each said ring shank to a position to be grasped, and ring shank carriage means movable from said position at which it grasps said ring shank to a position at which said ring shank is adapted to be placed in said ring setting;

ring shank testing means located at said ring shank testing station for testing the presence and proper alignment of the ring shank with respect to the ring setting;

bonding means situated at said bonding station for automatically bonding the ring shank to the ring setting to form said ring;

bond testing means situated at said bonding station for indicating good and bad bonds;

good parts removing means situated at said good parts removing station for selectively removing each ring satisfactorily tested by said bond testing means; and bad parts ejecting means situated at said bad parts ejecting station for selectively ejecting each ring and/or components indicated as not being satisfactorily bonded by said bonding means.

4. An apparatus for automatically assembling seriatim a ring from a ring shank and ring setting comprising:
apparatus supporting means;
advancing means operatively connected to said supporting means for supporting at least one work holding means which includes a nest member adapted for releasably holding said ring setting, and for successively and incrementally advancing said work holding means from a loading station to a plurality of discrete working stations, including a ring setting testing station, ring shank placing station, ring shank testing station, bonding station, bond testing station, good parts removing station, and bad parts ejecting station;

ring setting testing means located at said ring setting testing station for testing the presence and proper alignment of the ring setting with respect to the nest member;

ring shank placing means located at said ring shank placing station for selectively placing said ring shank on the ring setting, said ring shank placing means including ring shank feeder means including a vibrating parts feeder having an exit ramp for receiving one after another a continuous succession of ring shanks discharged from said vibrating parts feeder and supporting said ring shanks throughout an elongated length such that an open end of each ring shank straddles said exit ramp, track means connected to and supported by said apparatus supporting means, said track means being arranged to cooperate with said exit ramp for enabling said ring shanks to pass thereon such that said open end also straddles said track means, ring shank control means including indicating means operatively connected across said track means for indicating when a predetermined quantity of ring shanks has been received by said track means and arresting means being actuatable by said indicating means for directing a stream of fluid pressure onto said exit ramp to prevent the passage of ring shanks to said track means, ring shank lifting means operatively connected to said apparatus supporting means for selectively lifting an individual one of said ring shanks from said track means and locating each said ring shank to a position to be grasped, and ring shank carriage means movable from said position at which it grasps said ring shank to a position at which said ring shank is adapted to be placed in said ring setting;

ring shank testing means located at said ring shank testing station for testing the presence and proper alignment of the ring shank with respect to the ring setting;

bonding means situated at said bonding station for automatically bonding the ring shank to the ring setting to form said ring;

bond testing means situated at said bonding station for indicating good and bad bonds;

good parts removing means situated at said good parts removing station for selectively removing each ring satisfactorily tested by said bond testing means; and, bad parts ejecting means situated at said bad parts ejecting station for selectively ejecting each ring and/or components indicated as not being satisfactorily bonded by said bonding means.

5. An apparatus as set forth in claim 4 in which said advancing means includes movable turret means incrementally movable to said plurality of discrete working stations.

6. An apparatus as set forth in claim 5 wherein said work holding means includes at least one tray member having a recess and being affixed to said turret means for conjoint rotation therewith and for releasably holding the nest member in said recess, said nest member having a ring setting cavity precisely conforming to the configuration of the ring setting so as to avoid dislodgement of the ring shank.

7. An apparatus as set forth in claim 6 in which said work holding means further includes electrical insulation connected between it and said turret means.

8. An apparatus as set forth in claim 5 wherein said ring shank holding means includes bracket means fastened to said turret means for movement in unison therewith, pivotal arm means pivotally connected to said bracket means about a pivot axis and movable between a first position whereat a ring shank is held in a vertical position and a second position whereat said pivotal arm means is spaced from the ring shank for enabling the ring shank to be removed, and biasing means interconnected between said pivotal arm means and said bracket means such that said biasing means will yieldably maintain said pivotal arm means in either said first or second position.

9. An apparatus as set forth in claim 8 wherein biasing means includes a first pin attached to said pivotal arm means, a second pin connected to said bracket means, and a spring member connected to and between said first and second pins such that whenever said first pin passes a vertical axis of said pivot axis in one direction said spring member urges said pivotal means to said first position, and whenever said first pin passes said vertical axis in the opposite direction said spring member urges said pivotal means to said second position.

10. An apparatus as set forth in claim 9 wherein said pivotal arm means includes a pair of generally spaced apart pivotal arms being connected together for enabling simultaneous motion thereof, first cam means connected to and between forward portions of said pivotal arms for enabling said pivot arms to move from said second shank releasing position to said first shank holding position, and second cam means connected to said pivotal arm means for enabling said pivot arms to move from said first shank holding position to said second shank releasing position.

11. An apparatus as set forth in claim 10 in which each of said pivotal arms includes a ring shank engaging member secured to the forward end thereof, said ring shank engaging member including an arcuate recess which accommodates a top surface of a ring shank so as to more firmly hold the shank.

12. An apparatus as set forth in claim 11 in which said ring shank engaging member is made from electrically insulating material.

13. An apparatus as set forth in claim 10 in which said bonding means includes tilting means for controlling said second cam whenever said shank holding means advances from said bonding station to said bond testing station such that said pivot arm means move from said shank holding position to said shank releasing position.

14. An apparatus as set forth in claim 8 in which said ring shank holding means includes pivotal adjustment means operatively connected to said bracket means for adjusting the pivotal movement of said pivotal arm means such that ring shanks of varying size can be accommodated on the nest member.

15. An apparatus as set forth in claim 4 in which said ring setting testing means includes first supporting means affixed to said apparatus supporting means, probe holding means operatively connected to said first supporting means and being movable between an upper rest or inoperative position and a lower test or operative position, probe means connected to said movable holding means for conjoint movement therewith between said rest and test positions, such that whenever said probe means is in said test position it serves to test for the presence of and alignment of the ring setting with respect to said nest member and test actuation means connected to said holding means and being selectively actuatable to advance said holding means and said sensing means between said rest and test positions.

16. An apparatus as set forth in claim 15 in which said probe means includes at least a pair of separate electrical probe devices, each having a probe finger with ends separate from the other probe finger and being so arranged to contact a portion of the ring setting whenever said probe means is in said test position for passing a current such that a ring setting, if present and properly positioned in said nest member, completes one electrical circuit for transmitting a good signal, said probe means also being able to transmit a bad signal indicating that a ring setting is absent or improperly aligned.

17. An apparatus as set forth in claim 16 in which said first supporting means includes an upright support member having one end affixed to said apparatus supporting means, said test actuating means including first fluid motor means associated with said upright support member and said holding means for moving said holding means in response to energization of said first fluid motor between said rest and test positions.

18. An apparatus as set forth in claim 16 which further comprises separating means interconnecting said probe fingers for ensuring proper positioning of said probe fingers and for minimizing uncontrolled vibrations of said probe fingers.

19. An apparatus as set forth in claim 18 in which said separating means includes a pair of insulation blocks, and a connecting device which interconnects said pair of blocks such that said probe fingers are held in proper position.

20. An apparatus as set forth in claim 4 in which said track means includes a pair of spaced apart and generally parallel inclined track members, each of which is adapted to carry a plurality of ring shanks.

21. An apparatus as set forth in claim 4 in which said ring shank lifting means includes housing means being connected to said apparatus supporting means adjacent said end of said track means and being spaced therefrom by a predetermined distance, pushing means located in said space between said housing means such that only a single ring shank may be accommodated by said pushing means, said pushing means being generally vertically positionable between a neutral position and an operative position for lifting individual ring shanks to said grasping position, and pusher actuating means operatively connected to said pushing means and being selectively actuatable to raise and lower said pushing means between said neutral and operative positions.

22. An apparatus as set forth in claim 4 in which said placing means includes first translating means connected to said ring shank carriage means and driven by said advancing means for selectively advancing said ring shank carriage means between said pick-up position and said depositing position.

23. An apparatus as set forth in claim 22 in which said ring shank carriage means includes jaw means for selective movement between grasping and depositing positions and jaw actuating means.

24. An apparatus as set forth in claim 23 in which said jaw means includes a pair of jaw members movable between a first position for grasping the ring shank and a second position for depositing the ring shank, each of said jaw members being formed with a groove having a configuration which facilitates accommodation of a ring shank whenever the ring shank is between said jaw members, said jaw actuating means being energizable for moving said jaw members between the first and second positions.

25. An apparatus as set forth in claim 24 which further includes stripper means operatively connected to said jaw means for relatively urging a ring shank from between said pair of jaw members whenever said ring shank carriage means is moved from said depositing position to said grasping position to thereby ensure proper disengagement and release of the ring shank onto the ring setting at said depositing station.

26. An apparatus as set forth in claim 25 which further includes jaw adjusting means for adjusting the space between said jaw members to accommodate various sized ring shanks.

27. An apparatus as set forth in claim 25 in which said stripper means comprises a stripper member, biasing means connected to said stripper member and at least one of said jaw members for urging the stripper member downwardly into engagement with the ring shank to thereby relatively force the ring shank from the jaw means at said depositing position.

28. An apparatus as set forth in claim 27 in which said stripper member includes a notch for enabling movement of said work holding means to a ring shank holding position.

29. An apparatus as set forth in claim 4 in which said ring shank carriage means includes a camming means for camming said work holding means into a position whereby a ring shank is held onto the ring setting in response to movement of ring shank carriage means to the depositing position.

30. An apparatus as set forth in claim 4 in which said ring shank placing means includes flux applying means being stationed at said ring shank placing station for applying flux material to the open ends of each of the ring shanks carried by said ring shank carriage means moves from said grasping position to said depositing position.

31. An apparatus as set forth in claim 4 in which said ring shank testing means includes first supporting means affixed to said apparatus supporting means, probe holding means operatively connected to said first supporting means and being movable between an upper rest or inoperative position and a lower test or operative position, probe means connected to said movable holding means for conjoint movement therewith between said rest and test positions, such that whenever said probe means is in said test position it serves to test for the presence of and alignment of the ring shank with respect to said ring setting, and test actuating means connected to said holding means and being selectively actuatable to advance said holding means and said sensing means between said rest and test positions, said probe means including at least a pair of separate electrical probe devices, each having a probe finger with ends separate from the other probe finger and being so arranged to contact a portion of the ring shank whenever said probe means is in said test position for passing a current such that a ring shank, if present and properly positioned on the setting completes one electrical circuit for transmitting a good signal, said probe means also being able to transmit a bad signal indicating that a ring shank is absent or improperly aligned.

32. An apparatus as set forth in claim 31 which further comprises separating means interconnecting said probe fingers for ensuring proper positioning of said probe fingers and for minimizing uncontrolled vibrations of said probe fingers.

33. An apparatus as set forth in claim 4 in which said bonding means includes stationary means operatively connected to said apparatus supporting means for positioning said bonding means at the bonding station, movable bonding means operatively connected to said stationary means for selective movement between a rest position and a bonding position whereat said movable bonding means effectuates a bonding of the ring shank to the ring setting, and bonding actuating means connected to said movable bonding means and being selectively actuatable to move between said inoperative and bonding positions in response to actuating by said first means.

34. An apparatus as set forth in claim 33 in which said movable bonding means comprises carrying means connected to said actuating means for movement between said bonding and inoperative positions in response to actuation of said actuating means, and biased electrode means movable with said carrying means for contacting and bonding together the ring shank to the ring setting whenever said movable means is in said bonding position.

35. An apparatus as set forth in claim 34 in which said electrode means includes a pair of electrical bus bars being spaced apart so as to contact opposite sides of the ring shank so that heat may be applied to corresponding joints between the ring shank and setting.

36. An apparatus as set forth in claim 35 in which each of said bus bars is formed with a generally inclined groove which is adapted to slidably fit with respect to the shank, each of said grooves being arranged with respect to each other so as to cooperate with and apply downward forces to the ring shank.

37. An apparatus as set forth in claim 4 in which said bond testing means includes testing support means operatively connected to apparatus supporting means, testing carriage means operatively connected to said testing support means and being operable to move between operative and inoperative positions, force applicating means connected to and movable with said carriage means, said force applicating means being operable to apply tensile forces to the shank whenever said carriage means is at the operative position to test for the mechanical strength of the bond between the shank and setting and defect sensing means being operatively connected to said carriage means for sensing if the bond at least partially fails.

38. An apparatus as set forth in claim 37 which further includes ring shank adjustment means operatively associated with said force applicating means for enabling efficient testing of various sized articles which are to be tested.

39. An apparatus as set forth in claim 38 in which said force applicating means includes jaw means connected to said carriage means having a pair of jaw members, each of said jaw members being adapted to be inserted between the shank and setting whenever said means is in the operative position.

40. An apparatus as set forth in claim 39 in which one of said jaw members is relatively pivotally movable to the other of said jaw members and is actuatable for pivotal movement between a rest position and a test position, such that whenever in the test position it applies upward forces to the ring shank to be tested and said other jaw member contacts the setting such that the ring setting and shank will at least partially separate if the bonded joints are defective.

41. An apparatus as set forth in claim 38 in which said ring adjustment means includes a selectively positionable block member being mounted on said one pivotal jaw member for contacting a ring shank, said block member having a plurality of surfaces, each one of which is adapted to accommodate a different sized ring to thereby enable different sized rings to be tensile tested.

42. An apparatus as set forth in claim 41 in which said defect sensing means is operatively associated with said one pivotal jaw member such that should a defective article be tested said pivotal jaw member will actuate said defect sensing means for providing a signal.

43. An apparatus as set forth in claim 4 in which said good parts removing means includes a first means movable between ring pick-up and ring releasing positions, and second means operatively connected to said first means for conjoint movement therewith, and for grasping successfully tested or completely formed rings from the nest member at the ring pick-up position whenever said first means is in said pick-up position and for releasing the rings whenever said first means is in the releasing position.

44. An apparatus as set forth in claim 43 in which said first means includes a translating means and said second means includes transporting means connected to said translating means for conjoint movement therewith, said transporting means includes supporting means, grasping means connected to said supporting means and being operable for selectively grasping the good ring at said pick-up position and releasing the good ring at the releasing position, and grasping actuating means operatively connected to said grasping means and being energizable for correspondingly operating said grasping means.

45. The apparatus as set forth in claim 44 in which said grasping means includes a relatively stationary finger member connected to said supporting means, and a relatively movable finger member pivotally connected to said supporting means and operatively connected to said grasping actuating means for movement between first and second operating positions such that whenever said pivotal finger member is in the first operating position it abuttingly cooperates with said stationary finger to enable lifting and carrying of a completed ring, and whenever in the second operating position is spaced from the stationary finger member to enable the ring to be released at the releasing position.

46. The apparatus of claim 45 in which grasping actuating means includes an energizable motor having a reciprocal connecting rod affixed to one end of said pivotal finger member to cause said movable finger member to pivot between said first and second operative positions in response to selective energization of said energizable motor.

47. The apparatus as set forth in claim 45 in which said movable finger member includes a stub member which laterally protrudes therefrom and is adapted to contact said stationary finger to thereby lift and carry the ring.

48. The apparatus as set forth in claim 47 in which said good parts removing means includes adjustment means for adjusting the height of said finger means relative to the nest member such that said finger means can lift and carry various sized successfully tested rings.

49. The apparatus as set forth in claim 48 in which said adjustment means includes a series of calibrations formed on a surface of said supporting means such that each of said calibrations can be selectively placed relative to a predetermined position on said translating means, and at least one elongated slot on said supporting means for enabling vertical positioning of said grasping means.

50. An apparatus as set forth in claim 4 in which said bed ports ejecting means includes frame means connected to said apparatus supporting means, motion producing means supported by and connected to said frame means, motion transmitting means operatively connected to said motion producing means and lifting means operatively connected to said transmitting means for movement between operative and inoperative positions whereby whenever in the operative position the defective ring setting and/or ring shank are lifted from the nest member and whenever returning to the inoperative position the ring shank and setting are automatically removed therefrom into a receptable or the like.

51. An apparatus as set forth in claim 50 in which said motion producing means is comprised of at least one energizable motor having an actuating rod which is selectively reciprocally movable between the operative and inoperative positions in response to selective energization of said energizable motor.

52. An apparatus as set forth in claim 51 which further includes tilting means connected to said carriage means for selectively tilting between the operative and inoperative positions such that whenever in the operative position it is generally horizontal for purposes of enabling the picking up of the defective ring setting from said work holding means and whenever moved from the operative position to the inoperative position tilts upwardly to raise the ring setting from the work holding means.

53. An apparatus as set forth in claim 52 in which said tilting means includes a pivotal assembly interconnected between said motion transmitting and producing means and being pivotal in response to the motion producing means reciprocally moving from the operative to the inoperative position.

54. An apparatus as set forth in claim 53 in which said ejecting means further includes an ejecting member operatively affixed to said frame means and being appropriately positioned relative to said tilting means to strike a ring setting carried by said lifting means whenever the latter is tilted generally upwardly and being moved from the operative position to the inoperative position.

55. An apparatus as set forth in claim 54 which further includes tilting limit means operatively connected to said transmitting means for limiting the pivotal movement of said lifting means.

56. In an apparatus for assembling a ring from a ring shank and a ring setting comprising:
apparatus supporting means;
advancing means supported for movement by said apparatus supporting means, said advancing means mounting at least one work holding means including a nest member;
loading means for positioning said ring setting in said nest member; and,
ring shank placing means for placing said ring shank on said ring setting, said ring shank placing means including ring shank feeder means including a vibrating parts feeder having an exit ramp for receiving one after another a continuous succession of ring shanks discharged from said vibrating parts feeder and supporting said ring shanks throughout an elongated length of said exit ramp, track means connected to and supported by said apparatus supporting means, said track means being arranged to cooperate with said exit ramp for enabling said ring shanks to pass thereon from said track means, ring shank control means including indicating means operatively connected across said track means for indicating when a predetermined quantity of ring shanks has been received by said track means and arresting means being actuatable by said indicating means for directing a stream of fluid pressure onto said exit ramp to prevent the passage of ring shanks to said track means, ring shank lifting means operatively connected to said apparatus supporting means for selectively lifting an individual one of said ring shanks from said track means and locating each said ring shank to a position to be grasped, and ring shank carriage means movable from said position at which it grasps said ring shank to a position at which said ring shank is adapted to be placed in said ring setting.

57. An apparatus as set forth in claim 56 in which said ring shank carriage means includes jaw means having a pair of jaw members movable between a first position for grasping the ring shank and a second position for depositing the ring shank, each of said jaw members being formed with a groove having a configuration which facilitates accommodating of a ring shank whenever the ring shank is between said jaw members, and jaw actuating means connected to said jaw member and being energizable for moving said jaw members between the first and second positions.

* * * * *